United States Patent
Taguchi

(10) Patent No.: US 7,211,133 B2
(45) Date of Patent: *May 1, 2007

(54) INKJET BLACK INK

(75) Inventor: Toshiki Taguchi, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 10/714,945

(22) Filed: Nov. 18, 2003

(65) Prior Publication Data

US 2004/0154496 A1    Aug. 12, 2004

(30) Foreign Application Priority Data

Nov. 18, 2002    (JP)    ............ P. 2002-333790

(51) Int. Cl.
C09D 11/02    (2006.01)

(52) U.S. Cl. ............... 106/31.48; 106/31.49; 106/31.5; 106/31.52

(58) Field of Classification Search ............ 106/31.48, 106/31.49, 31.5, 31.52
See application file for complete search history.

(56) References Cited

U.S. PATENT DOCUMENTS

| | | | |
|---|---|---|---|
| 6,548,649 B2 * | 4/2003 | Mikoshiba et al. | 534/755 |
| 7,029,523 B2 * | 4/2006 | Taguchi et al. | 106/31.46 |
| 7,037,365 B2 * | 5/2006 | Taguchi et al. | 106/31.46 |
| 7,048,790 B2 * | 5/2006 | Taguchi et al. | 106/31.46 |
| 2004/0053988 A1 * | 3/2004 | Taguchi et al. | 514/419 |
| 2004/0070654 A1 * | 4/2004 | Taguchi et al. | 347/100 |
| 2004/0080596 A1 * | 4/2004 | Taguchi et al. | 347/100 |
| 2004/0094064 A1 * | 5/2004 | Taguchi et al. | 106/31.3 |
| 2004/0187738 A1 * | 9/2004 | Taguchi et al. | 106/31.48 |

* cited by examiner

Primary Examiner—Helene Klemanski
(74) Attorney, Agent, or Firm—Sughrue Mion, PLLC

(57) ABSTRACT

The invention provides an inkjet black ink ensuring excellent image durability capable of satisfactorily maintaining the image quality such as non-loosening of black and gradation even when the image is stored for a long period of time, which is a inkjet black ink having a discoloration rate constant ($k_{vis}$) of $5.0 \times 10^{-2}$ [hour$^{-1}$] or less, which is measured by using an ozone gas, the ink comprising an aqueous medium having dissolved or dispersed therein at least one dye selected from (1) an azo dye having a specific structure where a heterocyclic group is bonded to both of two N atoms, (2) a phthalocyanine dye having a specific structure, (3) an azo dye having a specific structure where a 5-membered heterocyclic group is bonded to one of two N atoms and a 6-membered 2-amino heterocyclic group is bonded to the other, and (4) a bisazo dye constituted by a specific aromatic or heterocyclic group and an azo group.

12 Claims, No Drawings

INKJET BLACK INK

FIELD OF THE INVENTION

The present invention relates to an inkjet black ink capable of giving an image having excellent durability.

BACKGROUND OF THE INVENTION

Accompanying recent popularization of computers, an inkjet printer is widely used for printing letters or an image on paper, film, cloth or the like not only in offices but also at homes.

The inkjet recording method includes a system of jetting out a liquid droplet by applying a pressure using a piezoelectric element, a system of jetting out a liquid droplet by generating bubbles in an ink under heat, a system using an ultrasonic wave, and a system of jetting out a liquid droplet by suction using an electrostatic force. With respect to the ink composition for such inkjet recording, an aqueous ink, an oily ink or a solid (fusion-type) ink is used. Among these inks, an aqueous ink is predominating in view of production, handleability, odor, safety and the like.

The coloring agent used in such an ink for inkjet recording is required that the solubility in a solvent is high, high-density recording can be performed, good color and excellent fastness to light, heat, air, water and chemicals are exhibited, good fixing on an image-receiving material and less bleeding are ensured, an ink having excellent storability is provided, and the coloring agent has high purity and no toxicity and is available at a low cost. However, it is very difficult to find out a coloring agent satisfying these requirements in a high level. Various dyes and pigments for inkjet use have been already proposed and actually used, however, a coloring agent satisfying all requirements is not yet found at present. Conventionally well-known dyes and pigments having a color index (C.I.) number can hardly satisfy both color hue and fastness required of the ink for inkjet recording.

As the inkjet black dye, food black-type dyes, naphthol-base direct azo dyes, acid azo dyes and the like are heretofore widely known.

Representative examples of the food black-type dye include C.I. Food Black 1 and C.I. Food Black 2 and techniques of using these dyes for inkjet black ink are described in JP-A-2-36276 (the term "JP-A" as used herein means an "unexamined published Japanese patent application"), JP-A-2-233782 and JP-A-2-233783.

As for the acid azo dye, techniques of using C.I. Acid Black 2, C.I. Acid Black 31, C.I. Acid Black 52, C.I. Acid Black 140, C.I. Acid Black 187 or the like for inkjet black ink are described in JP-A-60-108481, JP-A-2-36277 and JP-A-2-36278. Also, as for the direct azo dye, techniques of using C.I. Direct Black 9, C.I. Direct Black 17, C.I. Direct Black 38, C.I. Direct Black 51, C.I. Direct Black 60, C.I. Direct Black 102, C.I. Direct Black 107, C.I. Direct Black 122, C.I. Direct Black 142, C.I. Direct Black 154, C.I. Direct Black 168 or the like for the inkjet black ink are described in JP-A-56-139568, JP-A-61-285275 and JP-A-3-106974.

Usually, the black color can be hardly covered by a sole dye and a short-wave dye is preferably used in combination.

As the short-wave dye, similarly, direct azo dyes, acid azo dyes and the like are widely known and techniques of using C.I. Acid Yellow 17, C.I. Acid Yellow 23, C.I. Acid Yellow 49, C.I. Acid Yellow 194 or the like or using C.I. Direct Yellow 86, C.I. Direct Yellow 120, C.I. Direct Yellow 132, C.I. Direct Yellow 144 or the like for inkjet black ink are described in JP-A-7-97541, WO97/16496, JP-A-10-158560 and JP-A-11-12514. In these related arts, the above-described properties required of the inkjet ink are not yet fully satisfied and more improvements are demanded. Particularly, the aqueous black ink is demanded to be improved in the color hue, namely, non-loosening of black, and the fastness.

The present inventors have made studies on the inkjet ink using a dye and found the followings. The aqueous black ink has a problem in that the image durability is low. Also, unlike carbon black, a black dye capable of giving by itself a black image such as letter having high printing quality is not known and as described above, a plurality of dyes differing in the absorption spectrum should be used in combination. However, if a plurality of dyes differing in the absorption spectrum are used, the discoloration rate differs depending on the dye mixed and when a dye having a broad absorption property is changed in the absorption waveform due to discoloration, the quality of image including black is seriously impaired.

Furthermore, although the spectrum must be supplemented by various dyes so as to cover the broad region of black and obtain a good black ink, unless all dyes have high weather resistance, the balance of black is lost in aging.

When the inkjet recorded image has fastness and the image quality can be maintained during the long-term storage of image, the utility value of inkjet recording system is enhanced and therefore, it is keenly demanded to solve the above-described problems.

SUMMARY OF THE INVENTION

An object of the present invention is to provide an inkjet black ink ensuring excellent image durability capable of satisfactorily maintaining the image quality even when the image is stored for a long period of time.

The object of the present invention can be attained by the inkjet black ink described in the followings.

1. An inkjet black ink comprising an aqueous medium dissolved or dispersed therein two or more kind of dyes, wherein the inkjet black ink has an enforced discoloration rate constant ($k_{vis}$) of $5.0 \times 10^{-2}$ [hour$^{-1}$] or less, in which, when a visual reflection density ($D_{vis}$) in the printed part on printing by using said black ink is defined as an initial density, and the printed matter is enforcedly discolored by using an ozone discoloration tester capable of constantly generating 5 ppm of ozone, the enforced discoloration rate constant ($k_{vis}$) is defined as a reciprocal of the time necessary for the visual reflection density ($D_{vis}$) to reach 80% of the initial density, and the inkjet black ink contains at least one dye of an azo dye having a heterocyclic group and a phthalocyanine dye.

2. The inkjet black ink as described in 1, wherein the printing by using the inkjet black ink is a printing of a black square symbol of JIS Code 2223 in a 48-point size, and the inkjet black ink contains at least one dye represented by the following formulae (1) to (4):

Formula (1):

Formula (2):

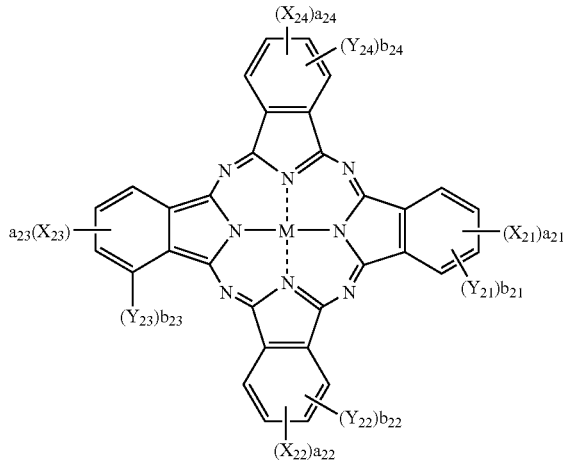

Formula (3):

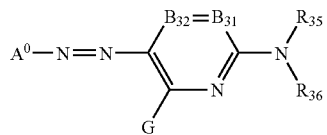

Formula (4):

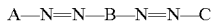

wherein in formula (1), $A^{11}$ and $B^{11}$ each independently represents a heterocyclic group which may be substituted;

in formula (2), $X_{21}$, $X_{22}$, $X_{23}$ and $X_{24}$ each independently represents —SO—Z, —SO$_2$—Z, —SO$_2$NR$_{21}$R$_{22}$, a sulfo group, —CONR$_{21}$R$_{22}$ or —COOR$_{21}$; each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $Y_{21}$, $Y_{22}$, $Y_{23}$ and $Y_{24}$ each independently represents a monovalent substituent; $a_{21}$ to $a_{24}$ and $b_{21}$ to $b_{24}$ represent the number of substituents $X_{21}$ to $X_{24}$ and $Y_{21}$ to $Y_{24}$, respectively; $a_{21}$ to $a_{24}$ each independently represents an integar of 0 to 4 but all are not 0 at the same time and $b_{21}$ to $b_{24}$ each independently represents an integar of 0 to 4, provided that when $a_{21}$ to $a_{24}$ and $b_{21}$ to $b_{24}$ each represents a number of 2 or more, the plurality of $X_{21}$s, $X_{22}$s, $X_{23}$s, $X_{24}$s, $Y_{21}$s, $Y_{22}$s, $Y_{23}$s or $Y_{24}$s may be the same or different; and M represents a hydrogen atom, a metal atom, or an oxide, hydroxide or halide thereof;

in formula (3), $A^0$ represents a 5-membered hetero-cyclic group; $B_{31}$ and $B_{32}$ each represents a nitrogen atom, =CR$_{31}$— or —CR$_{32}$=, and when either one of $B_{31}$ and $B_{32}$ represents a nitrogen atom, the other represents =CR$_{31}$— or —CR$_{32}$=; $R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; G, $R_{31}$ and $R_{32}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an arylsulfinyl group, a heterocyclic sulfinyl group, a sulfamoyl group, a sulfo group or a heterocyclic thio group, and each group may be further substituted; and $R_{31}$ and $R_{35}$, or $R_{35}$ and $R_{36}$ may combine to form a 5- or 6-membered ring; and in formula (4), A, B and C each independently represents an aromatic group or a heterocyclic group which may be substituted.

3. The inkjet black ink as described in 2, wherein the dye represented by formula (2) is a dye represented by the following formula (5):

Formula (5):

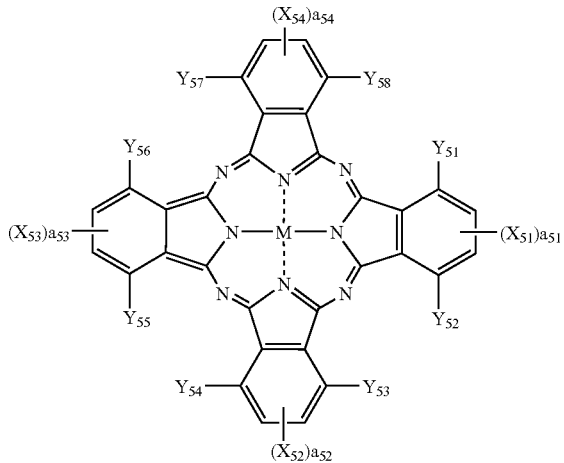

wherein $X_{51}$ to $X_{54}$, $Y_{51}$ to $Y_{54}$ and M have the same meanings as $X_{21}$ to $X_{24}$, $Y_{21}$ to $Y_{24}$ and M, respectively, and $a_{51}$ to $a_{53}$ each independently represents an integer of 1 or 2.

4. The inkjet black ink as described in any one of 1 to 3, wherein a ratio (R) of the maximum value to the minimum value of three enforced discoloration rate constants ($k_R$, $k_G$, $k_B$) is 1.2 or less, in which, when reflection densities ($D_R$, $D_G$, $D_B$) of three colors of C, M and Y obtained by measuring the printed part through a status A filter on printing a black square symbol of JIS Code 2223 in a 48-point size are defined as initial densities, and the printed matter is enforcedly discolored by using an ozone discoloration tester capable of constantly generating 5 ppm of ozone, each of the enforced discoloration rate constants ($k_R$, $k_G$, $k_B$) is defined as a reciprocal of the time necessary for each of the reflection densities ($D_R$, $D_G$, $D_B$) to reach 80% of respective initial densities.

5. The inkjet black ink as described in any one of 1 to 4, wherein each of the two or more kind of dyes has an oxidation potential of 1.0 V (vs SCE) or nobler.

6. The inkjet black ink as described in any one of 1 to 5, wherein the two or more kind of dyes includes a dye (L) having: a λmax of 500 to 700 nm; and a half-value width of 100 nm or more in the absorption spectrum of a dilute solution standardized to an absorbance of 1.0.

7. The inkjet black ink as described in any one of 1 to 6, wherein the two or more kind of dyes includes a dye (S) having: a λmax of 350 to 500 nm.

8. The inkjet black ink as described in 2, wherein the dye represented by formula (4) is a dye represented by the following formula (6):

Formula (6):

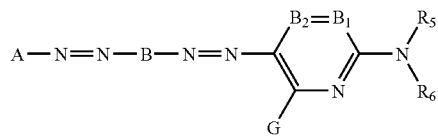

wherein $B_1$ and $B_2$ each represents a nitrogen atom, =$CR_1$— or —$CR_2$= and when either one of $B_1$ and $B_2$ represents a nitrogen atom, the other represents =$CR_1$— or —$CR_2$=, G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted, $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_5$ and $R_6$ are not a hydrogen atom at the same time, and $R_1$ and $R_5$, or $R_5$ and $R_6$ may combine to form a 5- or 6-membered ring.

9. The inkjet black ink as described in any one of 1 to 8, which contains the two or more dyes in an amount of 0.2 to 25 weight %, based on the entire ink.

10. The inkjet black ink as described in any one of 1 to 9, which the enforced discoloration rate constant ($k_{vis}$) is $3.0 \times 10^{-2}$ [hour$^{-1}$] or less.

11. The inkjet-black ink as described in 2, wherein the two or more kind of dyes include two or more dyes represented by the formulae (1), (3) and (4).

DETAILED DESCRIPTION OF THE INVENTION

The present invention is described in detail below.

In the inkjet black ink of the present invention, a dye (L) having a λmax of 500 to 700 nm and a half-value width of 100 nm or more (preferably from 120 to 500 nm, more preferably from 120 to 350 nm) in the absorption spectrum of a dilute solution standardized to an absorbance of 1.0 is preferably used.

In the case where the dye (L) by itself can realize black having high image quality and good non-loosening (that is, black which is not dependent on the light source at the observation and at the same time, unsusceptible to stress of any one color tone of B, G and R), this dye may be used alone as the dye for black ink, however, in general, a dye for covering the region where the dye (L) has low absorption is usually used in combination. A dye (S) having main absorption in the blue light region (forming a yellow color) is preferably used in combination. The black ink may also be produced by using other dyes in combination.

In the present invention, the above-described dye alone or in combination with other dyes is dissolved or dispersed in an aqueous medium to prepare the black ink and in order to satisfy the performances preferred as the inkjet black ink, namely, 1) the weather resistance is excellent and 2) the balance of black (color tone) is not lost even after discoloration, an ink satisfying the following conditions is demanded.

The printing is carried out by using the black ink, preferably a black square symbol of JIS code 2223 is printed in a 48-point size by using the black ink and the visual reflection density ($D_{vis}$) thereof is defined as the initial density. Examples of the reflection densitometer having mounted thereon a visual spectral distribution modulation filter capable of measuring the visual density include X-Rite Densitometer. Here, in the case of measuring the density of "black", the measured value of visual reflection density ($D_{vis}$) is used as the standard observed reflection density. This printed matter is enforcedly discolored by using an ozone discoloration tester capable of constantly generating 5 ppm of ozone and the enforced discoloration rate constant ($k_{vis}$) is determined according the formula "$0.8=\exp(-k_{vis} \cdot t)$" as a reciprocal of the time (t) until the reflection density ($D_{vis}$) decreases to 80% of the initial reflection density value. In the present invention, an ink of giving a rate constant ($k_{vis}$) of $5.0 \times 10^{-2}$ [hour$^{-1}$] or less, preferably $3.0 \times 10^{-2}$ [hour$^{-1}$] or less, more preferably $1.0 \times 10^{-2}$ [hour$^{-1}$] or less, is produced (condition 1).

Also, a black square symbol of JIS code 2223 is printed in a 48-point size by using the black ink and the reflection densities ($D_R$, $D_G$, $D_B$) which are not $D_{vis}$ but density values obtained by measuring the printed part through a status A filter are defined as the initial densities. This printed matter is enforcedly discolored by using an ozone discoloration tester capable of constantly generating 5 ppm of ozone according to the above-described method and the enforced discoloration rate constants ($k_R$, $k_G$, $k_B$) are determined similarly from the time necessary for the reflections densities ($D_R$, $D_G$, $D_B$) to decrease to 80% of respective initial density values. When the ratio (R) of the maximum value to the minimum value out of those three rate constants is determined (for example, when $k_R$ is a maximum value and kG is minimum value, $R=k_R/k_G$), an ink of giving a ratio (R) of 1.2 or less, preferably 1.1 or less, more preferably 1.05 or less, is produced (condition 2).

Incidentally, the "printed matter obtained by printing a black square symbol of JIS code 2223 in a 48-point size" used above represents an image printed in a size large enough that the printed line covers the aperture of the densitometer and thereby give a sufficiently large size for the measurement of density.

At least one dye used in the black ink has an oxidation potential of 1.00 V (vs SCE) or nobler, preferably 1.10 V (vs SCE) or nobler, more preferably 1.20 V (vs SCE) or nobler, and most preferably 1.25 V (vs SCE) or nobler, and at least one dye preferably has a λmax of 500 nm or more (condition 3).

For measuring the oxidation potential as used herein, various measuring methods can be used, such as dropping mercury electrode method using an aqueous solution or water mixed solvent system having dissolved therein the dye (polarography), cyclic voltammetry method (CV), rotating ring-disk electrode method and comb electrode method. The measurement of oxidation potential is specifically described below. A test sample ($1\times10^{-4}$ to $1\times10^{-6}$ mol·dm$^{-3}$) is dissolved in a solvent such as dimethylformamide or acetonitrile, containing a supporting electrolyte such as sodium perchlorate or tetrapropylammonium perchlorate, and the oxidation potential is measured as a value against SCE (saturated calomel electrode) by using the above-described method. The supporting electrolyte and solvent used can be appropriately selected according to the oxidation potential or solubility of test sample. The supporting electrolyte and solvent which can be used are described in Akira Fujishima et al., *Denkikagaku Sokutei Ho (Electrochemical Measuring Method)*, pp. 101–118, Gihodo Shuppan Sha (1984).

The oxidation potential value sometimes deviates on the order of tens of millivolt due to the effect of liquid junction potential, liquid resistance of sample solution, or the like, however, the reproducibility of measured potential value can be guaranteed by the calibration using a standard sample (for example, hydroquinone) and the same measured value can be obtained by any of those potential measuring methods.

The oxidation potential used in the present invention is a value measured according to d.c. polarography in N,N-dimethylformamide (concentration of compound: $1\times10^{-3}$ mol·dm$^{-3}$) containing 0.1 mol·dm$^{-3}$ of tetrapropylammonium perchlorate as the supporting electrolyte by using SCE (saturated calomel electrode) as the reference electrode, a graphite electrode as the working electrode and a platinum electrode as the counter electrode. In the case of a water-soluble dye, the dye is sometimes hardly dissolved directly in N,N-dimethylformamide. In such a case, the oxidation potential is measured after dissolving the dye by using water in an amount as small as possible and then diluting it with N,N-dimethylformamide to have a water content of 2% or less.

The black ink of the present invention includes an ink produced by using an azo dye represented by formula (1), (3) or (4) and a phthalocyanine dye represented by formula (2). The azo dyes represented by formulae (1), (3) and (4) particularly, formulae (3) and (4), include a dye coming under the dye (L) having a λmax of 500 to 700 nm and a half-value width of 100 nm or more in the absorption spectrum of a dilute solution standardized to an absorbance of 1.0. Other than this, a dye (S) having a λmax of 350 to 500 nm comes under the dye represented by formula (1) or (2). It is preferred that at least one dye (L) is the dye of formula (1), (3) or (4), more preferred that at least one dye (L) and at least one dye (S) are the dye of formula (1), (3) or (4), and still more preferred that 90 weight % of all dyes in the ink is occupied by the dye of formula (3) and/or (4) (condition 4).

The black ink for use in the present invention is a black ink satisfying at least the condition 1 out of those conditions 1 to 4, preferably an ink further satisfying at least one of the conditions 2 to 4. An ink satisfying a larger number of conditions out of those four conditions is more preferred.

The conditions for the inkjet ink having excellent image durability which is the object of the present invention are described below. The condition 1 that the ozone enforced discoloration constant ($K_{vis}$) based on the visual reflection density ($D_{vis}$) is $5.0\times10^{-2}$ [hour$^{-1}$] or less is the constituent feature of the invention of claim 1. The fact that the ink satisfying this condition is ensured with image fastness is an empirical rule found by the present inventors. It is also found that many dyes satisfying this empirical rule fall in the group of dyes represented by formulae (1) to (4).

In order to keep the enforced discoloration rate constant at the specified low value, it is considered necessary that the dye is a compound unsusceptible to chemical oxidation with ozone or the dye exerts its association/aggregation activity to form a state unsusceptible to oxidation. The condition 3 that the oxidation potential is noble is the condition for the former requirement, that is, the dye must be a compound unsusceptible to chemical oxidation, and this property of compound is a constituent feature of the invention of claim 3. Also, when the condition 4 that the half-value width in the spectral absorption of ink is wide is satisfied, this reveals that the dye is in the latter state, that is, the association/aggregation activity is exerted. The resulting stabilization of dye contributes to the image fastness and additionally, this property is advantageous for maintaining the color tone of black ink.

As described above, the conditions 3 to 4 verify that the stability of dye in the ink against oxidation contributes to the formation of an inkjet recorded image having fastness. On the other hand, when the discoloration rates based on the densities of three primary color components of the black ink, namely, measured with C, M and Y filter lights of status A are approximated each other, the color tone balance less changes during the progress of discoloration and the discoloration can be visually inconspicuous for the discoloration size shown by the reflection density value. The actual discoloration degree is determined by the visual evaluation and therefore, when three primary color components of the black ink in the recorded image are discolored at uniform rates and the ratio of these rates is small, excellent image fastness is substantially obtained. This is the property meant by the condition 2.

Incidentally, the color tone balance as used herein means a color tone in the neutral color region from deep shadow to highlight of the black ink in an image and does not mean a color balance in the color image region of a color image.

Among the dyes represented by formulae (1), (3) and (4), the dyes coming under the dye (L) are described in detail below.

In formulae (3), $A^0$ represents a 5-membered heterocyclic group which may be substituted, in formula (4), A, B and C each independently represents an aromatic group which may be substituted or a heterocyclic group which may be substituted (A and C each is a monovalent group and B is a divalent group).

Particularly, the compounds where at least two or more of A, B and C are preferably an unsaturated heterocyclic group which may be substituted. Among these, more preferred are the compounds where at least B and C are an unsaturated heterocyclic group.

In formula (1), $A^{11}$ and $B^{11}$ each independently represents a heterocyclic group which may be substituted. In the following description of each formula, $A^{11}$ and $B^{11}$ in the formula (1) and $A^0$ in the formula (3) have the same meanings as A and C when A and C in formulae (3) and (4) each represents a heterocyclic group which may be substituted (provided that $A^0$ represents a 5-membered heterocyclic group), and therefore, these are inclusively described by the heterocyclic group represented by A and C, which may be substituted.

The azo dye represented by formula (4) is preferably a dye represented by the following formula (6):

Formula (6):

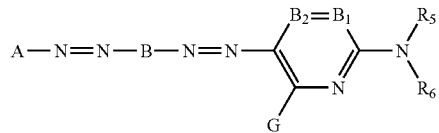

wherein $B_1$ and $B_2$ each represents a nitrogen atom, $=CR_1-$ or $-CR_2=$, and when either one of $B_1$ and $B_2$ represents a nitrogen atom, the other represents $=CR_1-$ or $-CR_2=$, G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted, $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_5$ and $R_6$ are not a hydrogen atom at the same time, and $R_1$ and $R_5$, or $R_5$ and $R_6$ may combine to form a 5- or 6-membered ring.

Furthermore, the azo dye represented by formula (6) is preferably a dye represented by the following formula (7):

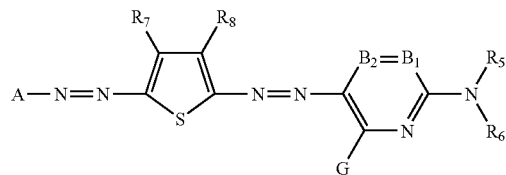

wherein $R_7$ and $R_8$ have the same meaning as $R_1$ in formula (6).

G, $R_1$, $R_2$, $R_7$ and $R_8$ in formulae (6) and (7) are described in detail below. The halogen atom includes a fluorine atom, a chlorine atom and a bromine atom. The aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The monovalent aromatic group means an aryl group and a substituted aryl group. The aryl group is preferably a phenyl group or a naphthyl group, more preferably a phenyl group. The number of carbon atoms in the monovalent aromatic group is preferably from 6 to 20, more preferably from 6 to 16. Examples of the monovalent aromatic group include a phenyl group, a p-tolyl group, a p-methoxyphenyl group, an o-chlorophenyl group and an m-(3-sulfopropylamino)phenyl group. The divalent aromatic group is a divalent form of these monovalent aromatic groups and examples thereof include a phenylene group, a p-tolylene group, a p-methoxyphenylene group, an o-chlorophenylene group, an m-(3-sulfopropylamino)phenylene group and a naphthylene group.

The heterocyclic group includes a heterocyclic group having a substituent and an unsubstituted heterocyclic group. The heterocyclic ring may be condensed with an aliphatic ring, an aromatic ring or another heterocyclic ring. The heterocyclic group is preferably a 5- or 6-membered heterocyclic group. Examples of the heteroatom in the heterocyclic ring include N, O and S. Examples of the substituent include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes an acyloxy group having a substituent and an unsubstituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyloxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted by an alkyl group, an aryl group or a heterocyclic group, and the alkyl group, the aryl group and the heterocyclic group each may further have a substituent. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes an arylamino group having a substituent, an unsubstituted arylamino group and an anilino group. The arylamino group is preferably an arylamino group having from 6 to 20 carbon atoms. Examples of the substituent include a halogen atom and an ionic hydrophilic group. Examples of the arylamino group include a phenylamino group and a 2-chlorophenylamino group.

The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group, a halogen atom and an ionic hydrophilic group.

The acylamino group includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkylsulfonylamino group and the arylsulfonylamino group include an alkylsulfonylamino group having a substituent, an arylsulfonylamino group having a substituent, an unsubstituted alkylsulfonylamino group and an unsubstituted arylsulfonylamino group. The sulfonylamino group is preferably a sulfonylamino group having from 1 to 20 carbon atoms. Examples of the substituent include an ionic hydrophilic group. Examples of these sulfonylamino groups include a methylsufonylamino group, an N-phenyl-methylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thiophene-sulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridinesulfinyl group.

The alkylthio group, the arylthio group and the heterocyclic thio group include an alkylthio group having a substituent, an arylthio group having a substituent, a heterocyclic thio group having a substituent, an unsubstituted alkylthio group, an unsubstituted arylthio group and an unsubstituted heterocyclic thio group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms. Examples of the substituent include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include an alkylsulfonyl group having a substituent, an arylsulfonyl group having a substituent, an unsubstituted alkylsulfonyl group and an unsubstituted arylsulfonyl group. Examples of the alkylsulfonyl group and arylsulfonyl group include a methylsulfonyl group and a phenylsulfonyl group.

The alkylsulfinyl group and the arylsulfinyl group include an alkylsulfinyl group having a substituent, an arylsulfinyl group having a substituent, an unsubstituted alkylsulfinyl group and an unsubstituted arylsulfinyl group. Examples of the alkylsulfinyl group and arylsulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

The constituent groups $A_{11}$, $B_{11}$, $A^0$, A, B and C in formulae (1), (3), (4), (6) and (7) are described in detail below. In the following description of constituent groups A, B and C, the constituent group and substituent have the same meaning as the group and substituent described above for respective symbols. Furthermore, the constituent groups $A_{11}$, $B_{11}$ and $A^0$ are described, similarly to the above, inclusively in the description of the case where the constituent groups A and C each is a heterocyclic group.

In the following, those described above for each group or substituent also apply.

In each of formulae (1), (3), (4), (6) and (7), A, B and C each independently represents an aromatic group (A and C are a monovalent aromatic group such as aryl group, and B is a divalent aromatic group such as arylene group) or a heterocyclic group (A and C are a monovalent heterocyclic group and B is a divalent heterocyclic group). Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

At least two of A, B and C are preferably a heterocyclic group.

The heterocyclic group represented by C is preferably an aromatic nitrogen-containing 6-membered heterocyclic group represented by the following formula (8). When C is an aromatic nitrogen-containing 6-membered heterocyclic group represented by formula (8), formula (4) corresponds to formula (6).

Formula (8):

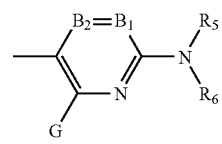

In formula (8), $B_1$ and $B_2$ each represents $=CR_1-$ or $-CR_2=$, or either one of $B_1$ and $B_2$ represents a nitrogen atom and the other represents $=CR_1-$ or $-CR_2=$. $B_1$ and $B_2$ each is preferably $=CR_1-$ or $-CR_2=$.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. The substituent represented by $R_5$ and $R_6$ is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group. Each group may further have a substituent. However, $R_5$ and $R_6$ are not a hydrogen atom at the same time.

G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted.

The substituent represented by G is preferably a hydrogen atom, a halogen atom, an aliphatic group, an aromatic group, a hydroxyl group, an alkoxy group, an aryloxy group, an acyloxy group, a heterocyclic oxy group, an amino group (including an anilino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group (including an anilino group and a heterocyclic amino group) or an acylamino group, and most preferably a hydrogen atom, an anilino group or an acylamino group. Each group may further have a substituent.

The substituents represented by $R_1$ and $R_2$ each is preferably a hydrogen atom, an alkyl group, a halogen atom, an alkoxycarbonyl group, a carboxyl group, a carbamoyl group, a hydroxy group, an alkoxy group or a cyano group. Each group may further have a substituent.

$R_1$ and $R_5$, or $R_5$ and $R_6$ may combine to form a 5- or 6-membered ring.

When the substituents represented by A, $R_1$, $R_2$, $R_5$, $R_6$ and G each further has a substituent, examples of the substituent include the substituents described above for G, $R_1$ and $R_2$. Also, an ionic hydrophilic group is preferably further present as a substituent on any one position of A, $R_1$, $R_2$, $R_5$, $R_6$ and G.

Examples of the ionic hydrophilic group as the substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium).

When B has a ring structure, preferred examples of the heterocyclic ring include a thiophene ring, a thiazole ring, an imidazole ring, a benzothiazole ring and a thienothiazole ring. Each heterocyclic ring may further have a substituent. Among these heterocyclic rings, a thiophene ring, a thiazole ring, an imidazole ring, a benzothiazole ring and a thienothiazole ring represented by the following formulae (a) to (e) are preferred. When B is a thiophene ring represented by formula (a) and C is a structure represented by formula (8), formula (6) corresponds to formula (7).

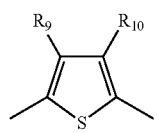

(a)

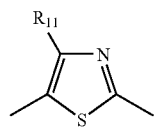

(b)

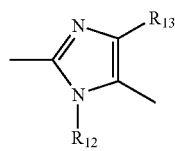

(c)

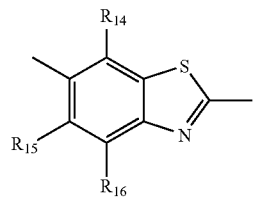

(d)

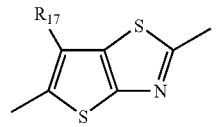

(e)

wherein $R_9$ to $R_{17}$ each represents a substituent having the same meaning as G, $R_1$ and $R_2$ in formula (6).

In the present invention, the structure represented by the following formula (9) is particularly preferred:

Formula (9):

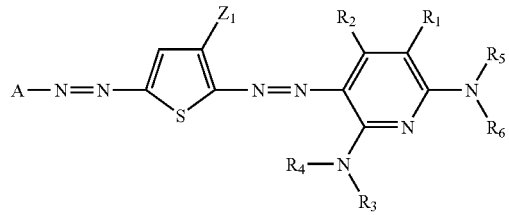

In formula (9), $Z_1$ represents an electron-withdrawing group having a Hammett's substituent constant σp value of 0.20 or more. $Z_1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$R_1$, $R_2$, $R_5$ and $R_6$ have the same meanings as in formula (6). $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, preferably a hydrogen atom, an aromatic group, a heterocyclic group, an acyl group, an alkylsulfonyl group or an arylsulfonyl group, more preferably a hydrogen atom, an aromatic group or a heterocyclic group.

The groups described in regard to formula (9) each may further have a substituent. When these groups each further has a substituent, examples of the substituent include the substituents described in regard to formula (6), the groups described as examples for G, $R_1$ and $R_2$, and an ionic hydrophilic group.

Here, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979). In the present invention, each substituent is limited or described using the Hammett's substituent constant $\sigma_p$ but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formulae (1), (3), (4), (6), (7) and (9) of the present invention include those which are not a benzene derivative, the $\sigma_p$ value is used as a measure for showing the electron effect of the substituent irrespective of the substitution site. In the present invention, the $\sigma_p$ value is used in this meaning.

Examples of the electron-withdrawing group having a Hammett's substituent constant $\sigma_p$ value of 0.60 or more include a cyano group, a nitro group, an alkylsulfonyl group (e.g., methylsulfonyl) and an arylsulfonyl group (e.g., phenylsulfonyl).

Examples of the electron-withdrawing group having a Hammett's $\sigma_p$ value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant $\sigma_p$ value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a $\sigma_p$ value of 0.20 or more include, in addition to those described above, a halogen atom.

In the azo dye represented by formulae (1), (3), (4) and (6), the preferred combination of substituents is described below. $R_5$ and $R_6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R_5$ and $R_6$ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably an aromatic group, a pyridine ring, a pyrazole ring, an imidazole ring, an isothiazole ring, a benzisothiazole ring, a thiadiazole ring, a thiadiazole ring, a thiazole ring, a benzothiazole ring or a triazole ring, more preferably an aromatic group, a pyridine ring, an isothiazole ring, a benzisothiazole ring, a thiadiazole ring or a benzothiazole ring, and most preferably an aromatic group, a pyridine ring or a benzothiazole ring.

$B_1$ and $B_2$ each is =CR$_1$— or —CR$_2$=, and $R_1$ and $R_2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in each of the compounds represented by formulae (1), (3), (4) and (6), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (1) are set forth below, however, the azo dye for use in the present invention is not limited to those set forth below. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium).

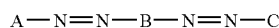

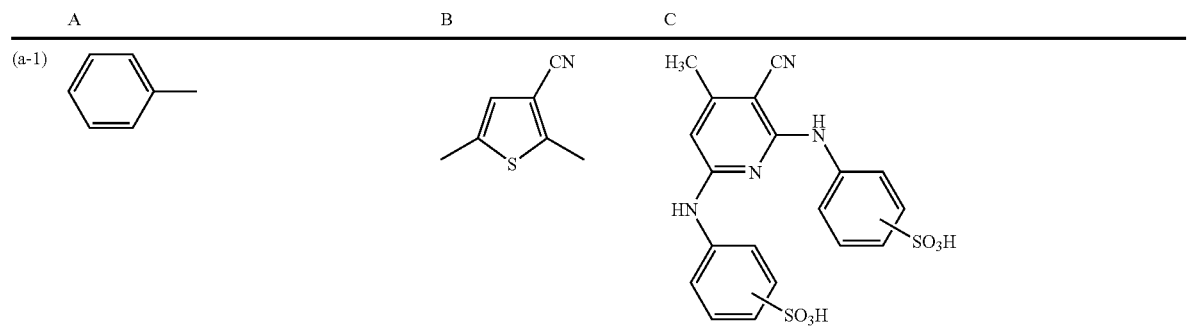

-continued
A—N=N—B—N=N—C
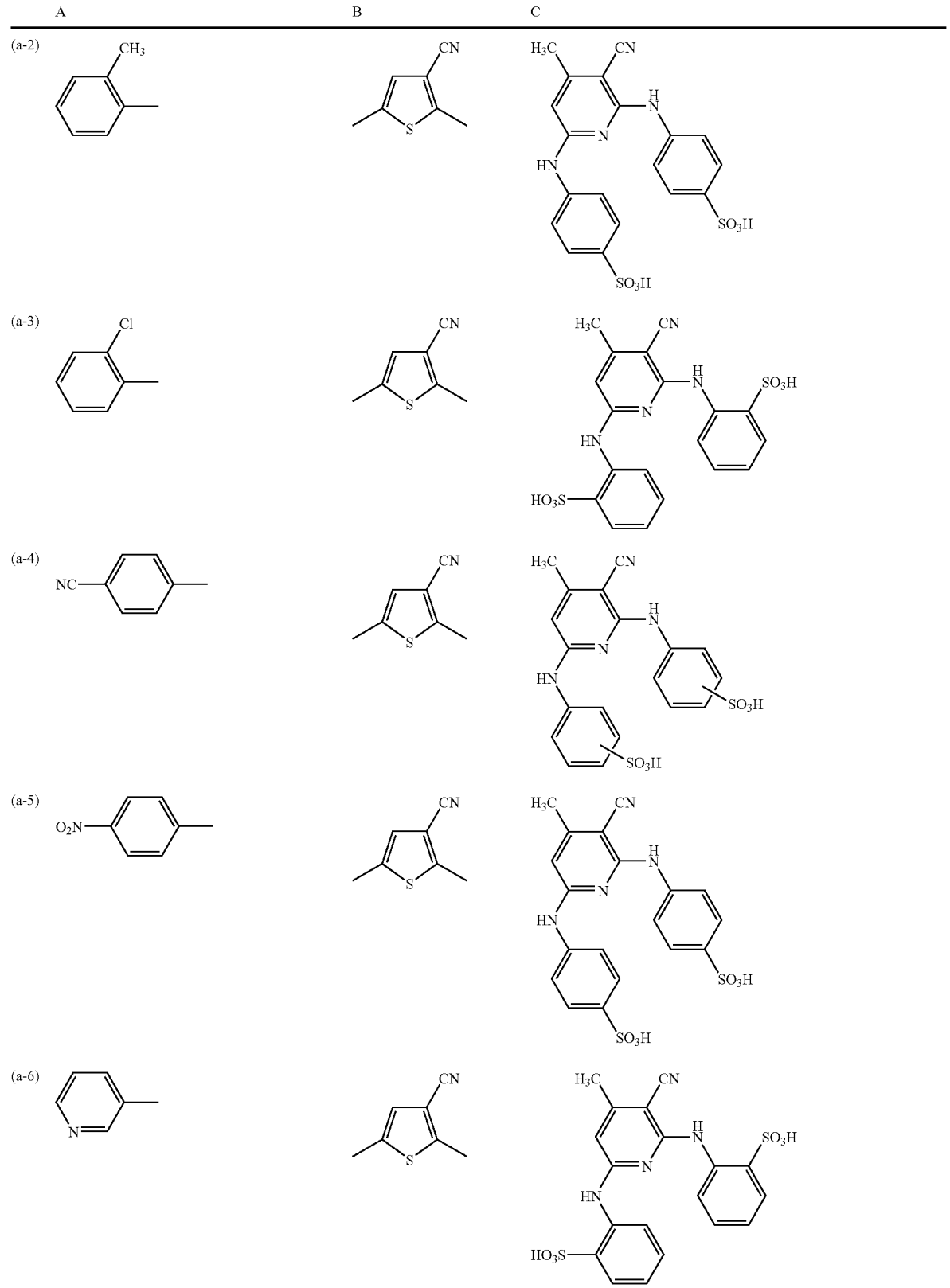

-continued
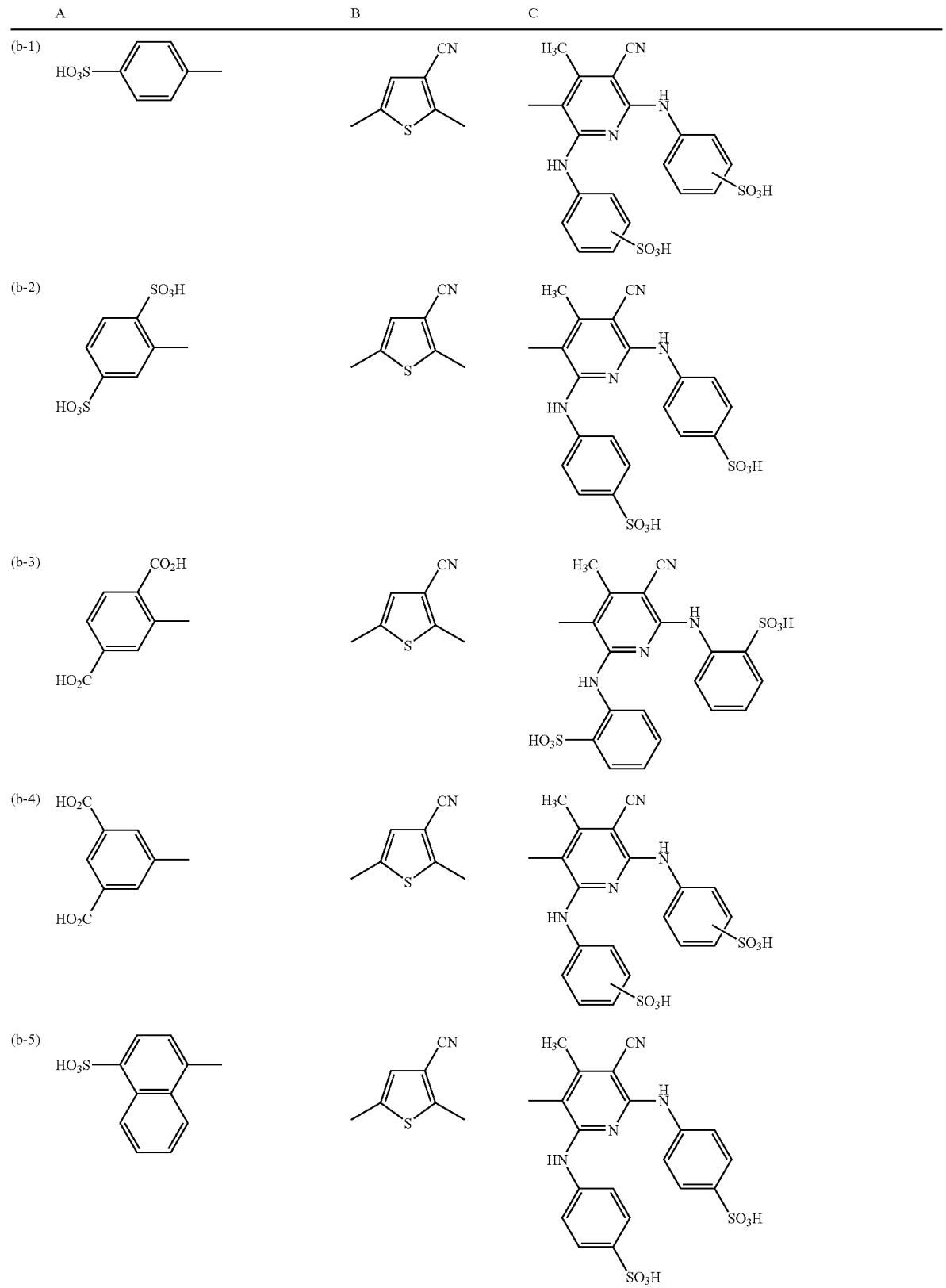

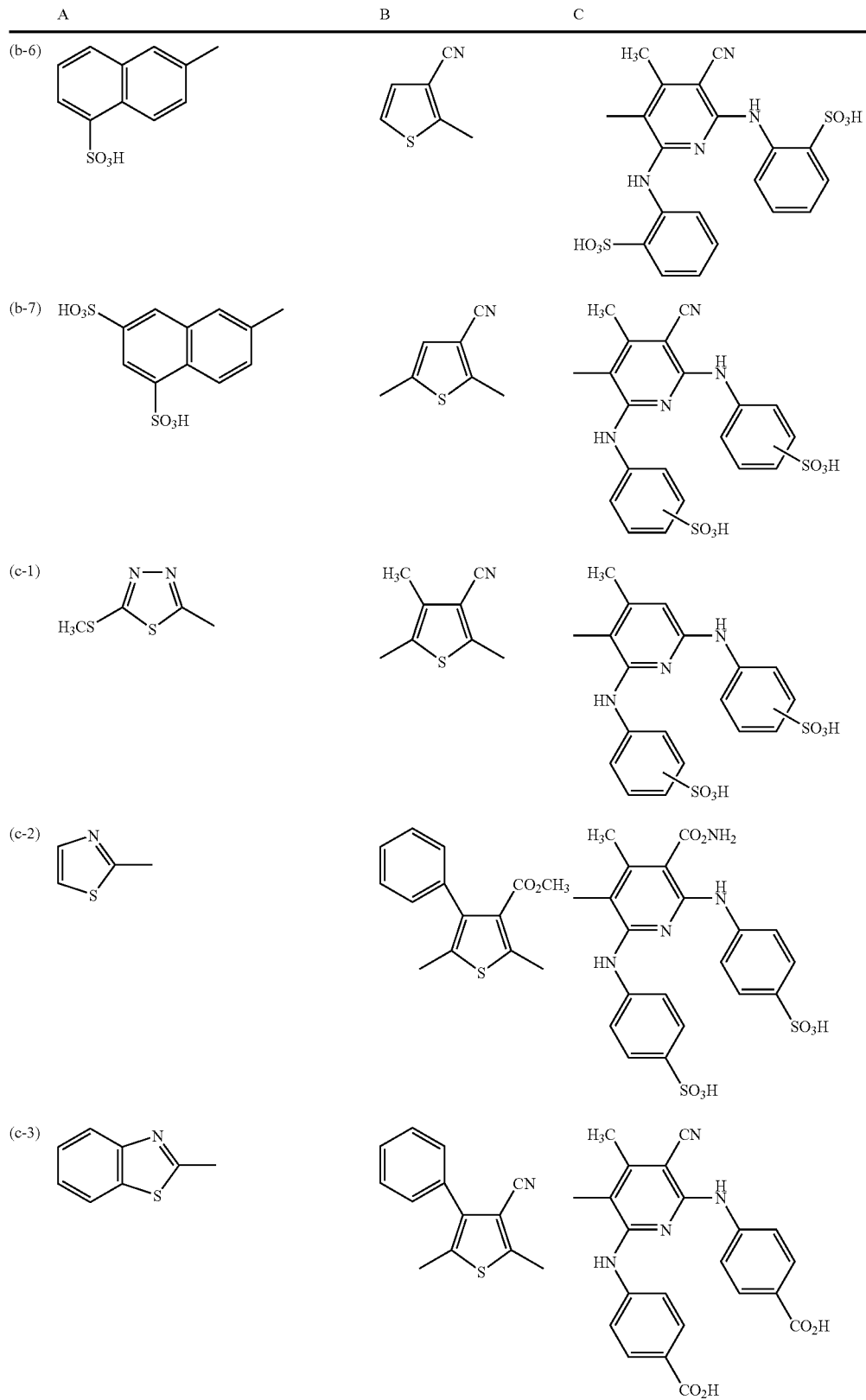

-continued
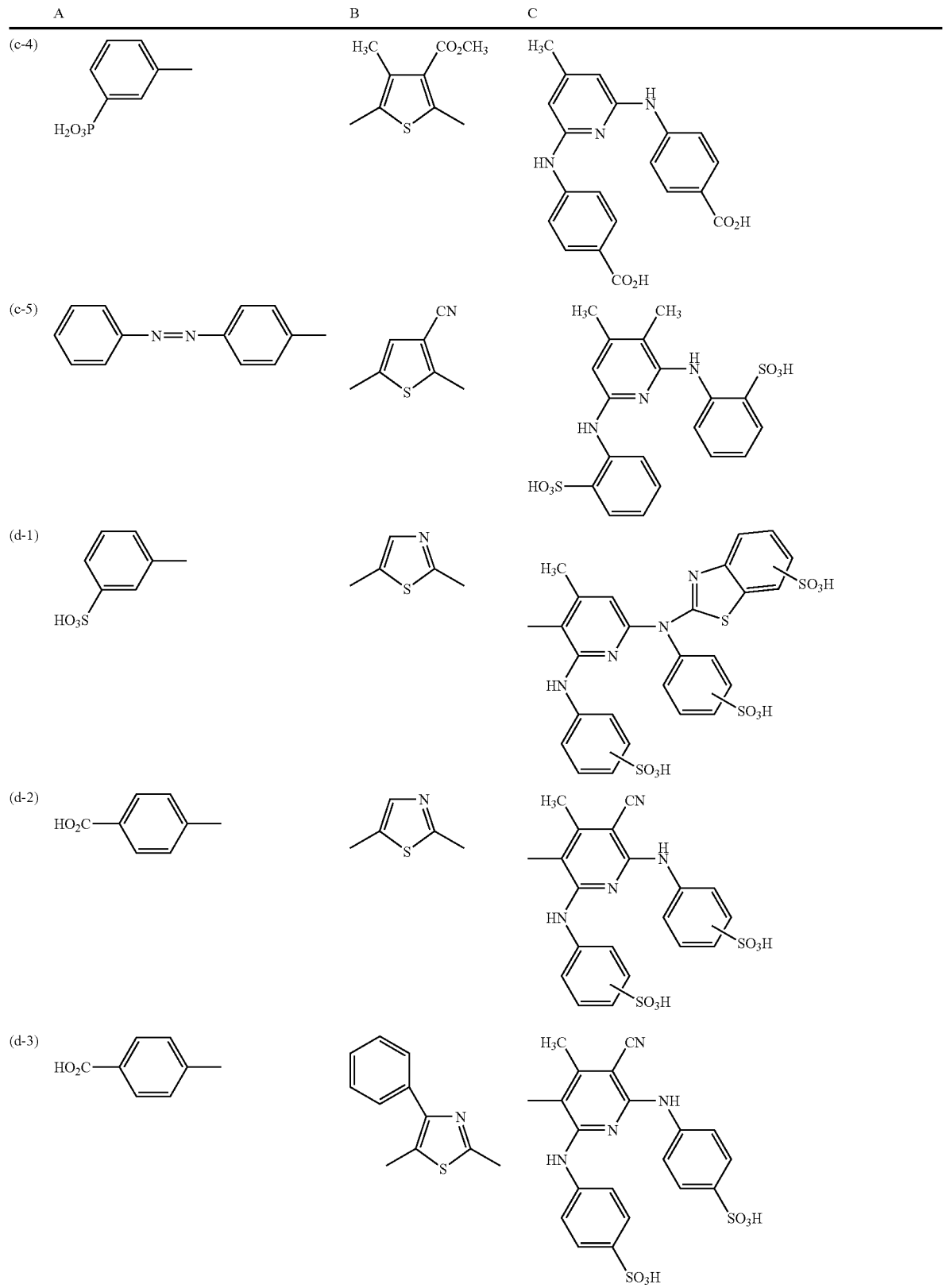

-continued
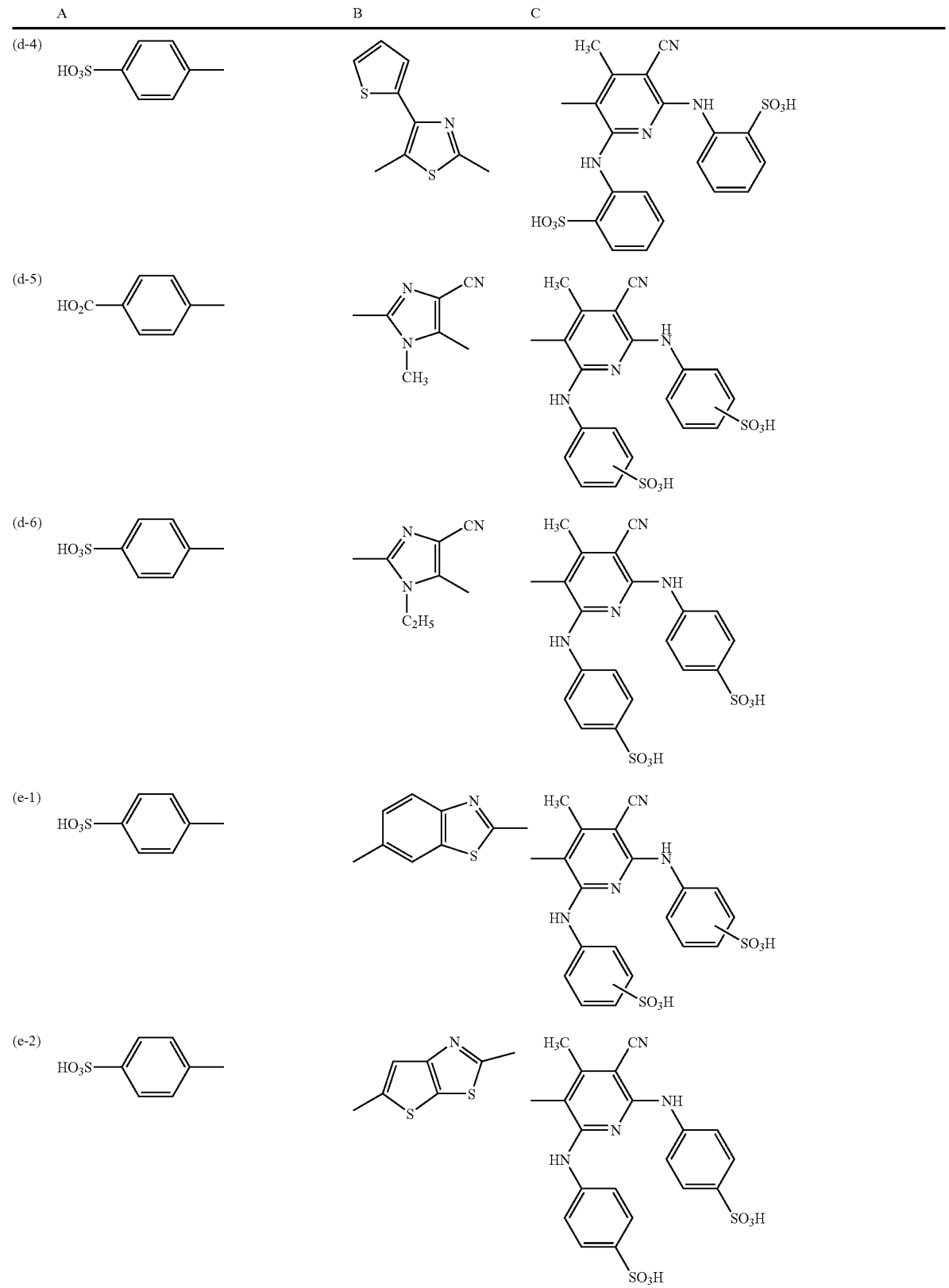

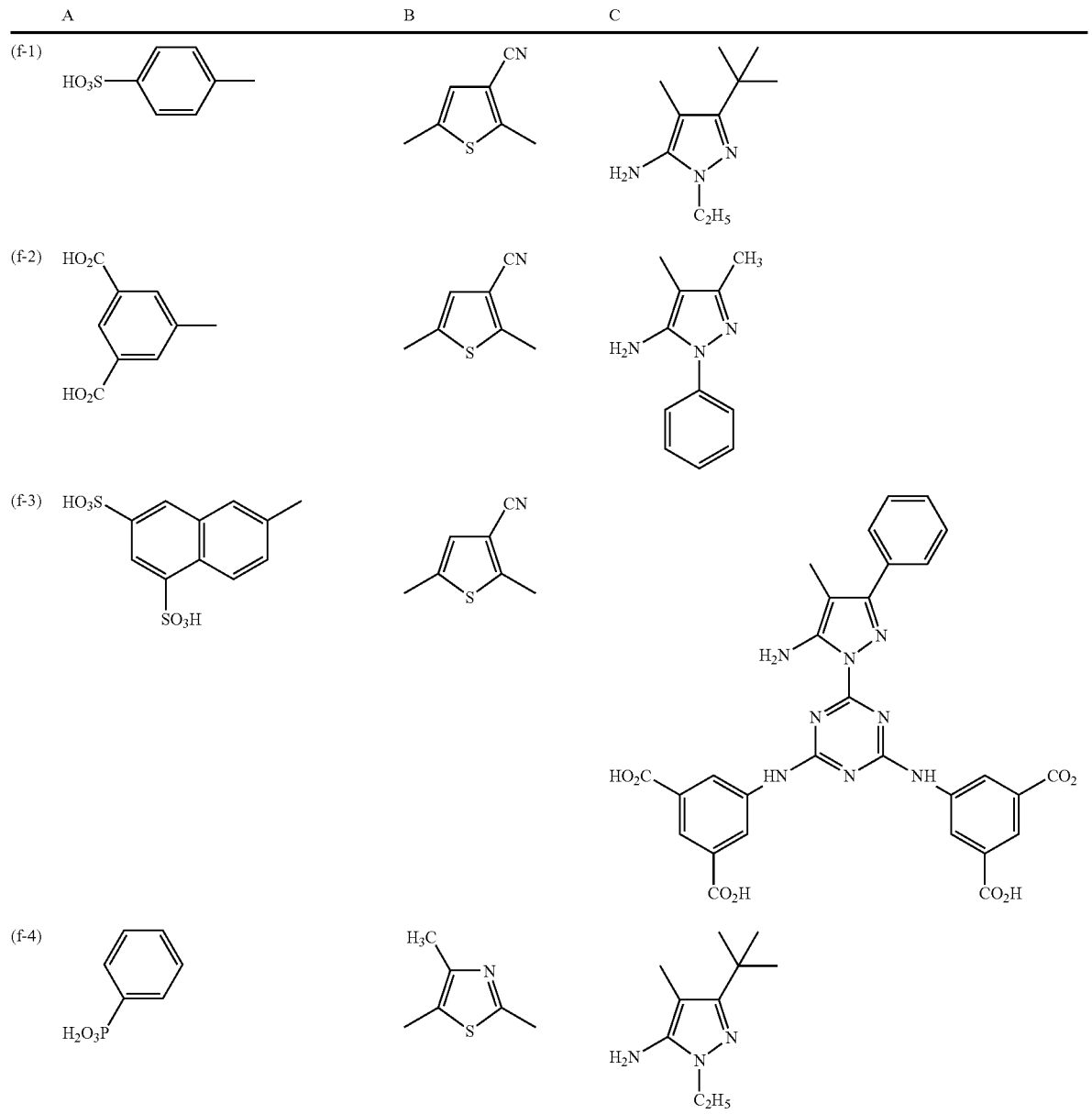

The dyes represented by formulae (1), (3), (4) and (6) can be synthesized by a coupling reaction of a diazo component and a coupler. As the main synthesis method, the method described in Japanese Patent Application No. 2002-113460 can be used.

In the case where the dye (L) by itself can realize black having high image quality and good non-loosening (that is, black which is not dependent on light at the observation and unsusceptible to stress of any one color tone of B, G and R), this dye may be used alone as the dye for black ink, however, in general, a dye for covering the region where the dye (L) has low absorption is usually used in combination. A dye or pigment having main absorption in the yellow region is usually used in combination to realize the preferred black.

As the yellow dye, commonly employed direct dyes, acid dyes and the like, representatively azo dyes and azomethine dyes, can be used. As the pigment, an aqueous dispersion of a general pigment having a pigment number can be used in combination. In particular, a dye represented by formula (1), (3), (4) or (6) is preferably used as the short-wave dye (S) described above.

Among the dyes represented by formula (1), an azo dye where m=n=0 is preferred as the short-wave dye (S). At this time, A and C each is preferably a heteroaromatic ring. An azo dye where m=n=1 is next preferred.

In either case, the dye preferably has an oxidation potential (Eox) of 1.0 V (vs SCE), more preferably 1.2 V (vs SCE).

The black ink can also be produced by using other dyes in combination.

The inkjet black ink of the present invention contains the dye in an amount of 0.2 to 25 weight %, preferably from 0.5 to 15 weight %, based on the entire ink.

Other than the dye represented by formula (1), the compound represented by formula (2) is preferred as the short-wave dye (S). This compound is described below.

Formula (2):

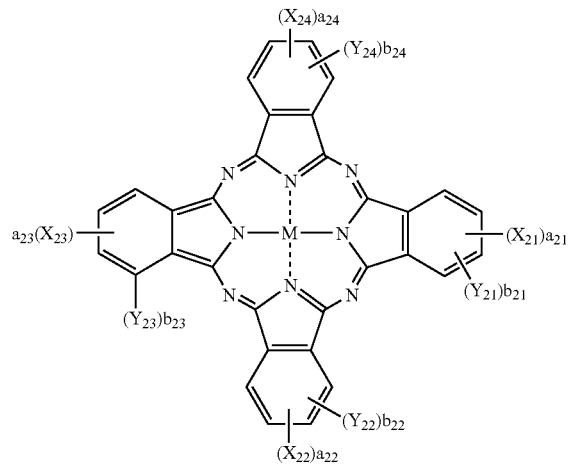

wherein $X_{21}$, $X_{22}$, $X_{23}$ and $X_{24}$ each independently represents —SO—Z, —SO$_2$—Z, —SO$_2$NR$_{21}$R$_{22}$, a sulfo group, —CONR$_{21}$R$_{22}$ or —COOR$_{21}$;

each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $Y_{21}$, $Y_{22}$, $Y_{23}$ and $Y_{24}$ each independently represents a monovalent substituent;

$a_{21}$ to $a_{24}$ and $b_{21}$ to $b_{24}$ represent the number of substituents $X_{21}$ to $X_{24}$ and $Y_{21}$ to $Y_{24}$, respectively; $a_{21}$ to $a_{24}$ each independently represents an integar of 0 to 4 but all are not 0 at the same time and $b_{21}$ to $b_{24}$ each independently represents an integar of 0 to 4, provided that when $a_{21}$ to $a_{24}$ and $b_{21}$ to $b_{24}$ each represents a number of 2 or more, the plurality of $X_{21}$s, $X_{22}$s, $X_{23}$s, $X_{24}$s, $Y_{21}$s, $Y_{22}$s, $Y_{23}$s or $Y_{24}$s may be the same or different; and M represents a hydrogen atom, a metal atom or an oxide, hydroxide or halide thereof.

The compound of formula (2) for use in the present invention is described in detail below.

In formula (2), $X_{21}$, $X_{22}$, $X_{23}$ and $X_{24}$ each independently represents —SO—Z, —SO$_2$—Z, —SO$_2$NR$_{21}$R$_{22}$, a sulfo group, —CONR$_{21}$R$_{22}$ or —CO$_2$R$_{21}$. Among these substituents, preferred are —SO—Z, —SO$_2$—Z, —SO$_2$NR$_{21}$R$_{22}$ and —CONR$_{21}$R$_{22}$, more preferred are —SO$_2$—Z and —SO$_2$NR$_{21}$R$_{22}$, and most preferred is —SO$_2$—Z. In the case where any one of $a_{21}$ to $a_{24}$ each showing the number of substituent represents a number of 2 or more, the plurality of $X_{21}$s, $X_{22}$s, $X_{23}$s or $X_{24}$s may be the same or different and each independently represents any one of the above-described groups. $X_{21}$, $X_{22}$, $X_{23}$ and $X_{24}$ may be completely the same substituents, may be substituents of the same kind but partially different, for example, as in the case where $X_{21}$, $X_{22}$, $X_{23}$ and $X_{24}$ all are —SO$_2$—Z and Zs are different from each other, or may include substituents different from each other, for example, —SO$_2$—Z and —SO$_2$NR$_{21}$R$_{22}$.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, more preferably a hydrogen atom, a substituted alkyl group, a substituted aryl group or a substituted heterocyclic group. However, it is not preferred that $R_{21}$ and $R_{22}$ both are a hydrogen atom.

The substituted or unsubstituted alkyl group represented by $R_{21}$, $R_{22}$ and Z is preferably an alkyl group having from 1 to 30 carbon atoms, more preferably a branched alkyl group because the solubility of dye and the stability of ink are improved, and still more preferably an alkyl group having an asymmetric carbon (use in the racemic form). Examples of the substituent include those described later as the substituent when Z, $R_{21}$, $R_{22}$, $Y_{21}$, $Y_{22}$, $Y_{23}$ and $Y_{24}$ can further have a substituent. In particular, a hydroxyl group, an ether group, an ester group, a cyano group, an amido group and a sulfonamido group are preferred because the aggregating property and fastness of dye are enhanced. Other than these, the alkyl group may be substituted by a halogen atom or an ionic hydrophilic group. Incidentally, the number of carbon atoms in the alkyl group does not contain carbon atoms of substituents and this applies to other groups.

The substituted or unsubstituted cycloalkyl group represented by $R_{21}$, $R_{22}$ and Z is preferably a cycloalkyl group having from 5 to 30 carbon atoms, more preferably a cycloalkyl group having an asymmetric carbon (use in the racemic form) because the solubility of dye and the stability of ink are improved. Examples of the substituent include those described later as the substituent when Z, $R_{21}$, $R_{22}$, $Y_{21}$, $Y_{22}$, $Y_{23}$ and $Y_{24}$ can further have a substituent. In particular, a hydroxyl group, an ether group, an ester group, a cyano group, an amido group and a sulfonamido group are preferred because the aggregating property and fastness of dye are enhanced. Other than these, the cycloalkyl group may be substituted by a halogen atom or an ionic hydrophilic group.

The substituted or unsubstituted alkenyl group represented by $R_{21}$, $R_{22}$ and Z is preferably an alkenyl group having from 2 to 30 carbon atoms, more preferably a branched alkenyl group because the solubility of dye and the stability of ink are improved, and still more preferably an alkenyl group having an asymmetric carbon (use in the racemic form) . Examples of the substituent include those described later as the substituent when Z, $R_{21}$, $R_{22}$, $Y_{21}$, $Y_{22}$, $Y_{23}$ and $Y_{24}$ can further have a substituent. In particular, a hydroxyl group, an ether group, an ester group, a cyano group, an amido group and a sulfonamido group are preferred because the aggregating property and fastness of dye are enhanced. Other than these, the alkenyl group may be substituted by a halogen atom or an ionic hydrophilic group.

The substituted or unsubstituted aralkyl group represented by $R_{21}$, $R_{22}$ and Z is preferably an aralkyl group having from 7 to 30 carbon atoms, more preferably a branched aralkyl group because the solubility of dye and the stability of ink are improved, and still more preferably an aralkyl group having an asymmetric carbon (use in the racemic form). Examples of the substituent include those described later as the substituent when Z, $R_{21}$, $R_{22}$, $Y_{21}$, $Y_{22}$, $Y_{23}$ and $Y_{24}$ can further have a substituent. In particular, a hydroxyl group, an ether group, an ester group, a cyano group, an amido group and a sulfonamido group are preferred because the aggregating property and fastness of dye are enhanced. Other than these, the aralkyl group may be substituted by a halogen atom or an ionic hydrophilic group.

The substituted or unsubstituted aryl group represented by $R_{21}$, $R_{22}$ and Z is preferably an aryl group having from 6 to 30 carbon atoms. Examples of the substituent include those described later as the substituent when Z, $R_{21}$, $R_{22}$, $Y_{21}$, $Y_{22}$, $Y_{23}$ and $Y_{24}$ can further have a substituent. In particular, an electron-withdrawing group is preferred because the dye can be noble in the oxidation potential and improved in the fastness. Examples of the electron-withdrawing group include those having a positive Hammett's substituent constant σp value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by $R_{21}$, $R_{22}$ and Z is preferably a 5- or 6-membered ring and the ring may be further condensed. Also, the ring may be an aromatic heterocyclic ring or a non-aromatic heterocyclic ring. Examples of the heterocyclic group represented by $R_{21}$, $R_{22}$ and Z are shown below in the form of a heterocyclic ring by omitting the substitution site. The substitution site is not limited and for example, pyridine may be substituted at the 2-position, 3-position and 4-position. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent and examples of the substituent include those described later as the substituent when Z, $R_1$, $R_2$, $Y_{21}$, $Y_{22}$, $Y_{23}$ and $Y_{24}$ can further have a substituent. Preferred substituents are the same as the above-described substituents of the aryl group and more preferred substituents are the same as the above-described more preferred substituents of the aryl group.

$Y_{21}$, $Y_{22}$, $Y_{23}$ and $Y_{24}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. These groups each may further have a substituent.

Among these, preferred are a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group and a sulfo group, more preferred are a hydrogen atom, a halogen atom, a cyano group, a carboxyl group and a sulfo group, and most preferred is a hydrogen atom.

When Z, $R_{21}$, $R_{22}$, $Y_{21}$, $Y_{22}$, $Y_{23}$ and $Y_{24}$ each is a group which can further have a substituent, the group may further have the following substituent.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each is preferably a group having a branched chain because the solubility of dye and the stability of ink are improved, more preferably a group having an asymmetric carbon; specific examples of the groups include a methyl group, an ethyl group, a propyl group, an isopropyl group, a sec-butyl group, a tert-butyl group, a 2-ethylhexyl group, a 2-methylsulfonylethyl group, a 3-phenoxypropyl group, a trifluoromethyl group and a cyclopentyl group), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoyl-phenoxy, 3-methoxycarbamoyl), an acylamino group (e.g., acetamido, benzamido, 4-(3-tert-butyl-4-hydroxyphenoxy)-butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropyl-sulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the case where the phthalocyanine dye represented by formula (2) is water-soluble, the dye preferably has an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium). Among these counter ions, an alkali metal salt is preferred and a lithium salt is more preferred because the solubility of dye and the stability of ink are improved.

As for the number of ionic hydrophilic groups, the phthalocyanine dye preferably has at least two ionic hydrophilic groups, more preferably at least two sulfo groups and/or carboxyl groups, within one molecule.

$a_{21}$ to $a_{24}$ and $b_{21}$ to $b_{24}$ represent the number of substituents $X_{21}$, $X_{22}$, $X_{23}$, $X_{24}$, $Y_{21}$, $Y_{22}$, $Y_{23}$ and $Y_{24}$, respectively. $a_{21}$ to $a_{24}$ each independently represents an integer of 0 to 4 but all are not 0 at the same time. $b_{21}$ to $b_{24}$ each independently represents an integer of 0 to 4. When any one of $a_{21}$ to $a_{24}$ and $b_{21}$ to $b_{24}$ represents an integer of 2 or more, a plural number of $X_{21}$s, $X_{22}$s, $X_{23}$s, $X_{24}$s, $Y_{21}$s, $Y_{22}$s, $Y_{23}$s or $Y_{24}$s are present and the plurality of $X_{21}$s, $X_{22}$s, $X_{23}$s, $X_{24}$s, $Y_{21}$s, $Y_{22}$s, $Y_{23}$s or $Y_{24}$s may be the same or different.

$a_{21}$ and $b_{21}$ satisfy the relationship of $a_{21}+b_{21}=4$. In particular, a combination that $a_{21}$ represents 1 or 2 and $b_{21}$ represents 3 or 2 is preferred, and a combination that $a_{21}$ represents 1 and $b_{21}$ represents 3 is most preferred.

The same relationship as that between $a_{21}$ and $b_{21}$ is present in each of the pairs $a_{22}$ and $b_{22}$, $a_{23}$ and $b_{23}$, and $a_{24}$ and $b_{24}$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as Si(OH)$_2$, Cr(OH)$_2$ and Sn(OH)$_2$, or a halide such as AlCl, SiCl$_2$, VCl, VCl$_2$, VOCl, FeCl, GaCl and ZrCl. Among these, more preferred are Cu, Ni, Zn and Al, and most preferred is Cu.

Also, Pc (phthalocyanine ring) may form a dimer (for example, Pc-M-L-M-Pc) or a trimer through L (divalent linking group). At this time, Ms may be the same or different.

The divalent linking group represented by L is preferably an oxy group —O—, a thio group —S—, a carbonyl group —CO—, a sulfonyl group —SO$_2$—, an imino group —NH—, a methylene group —CH$_2$— or a group formed by combining two or more of these groups.

As for the preferred combination of substituents in the compound represented by formula (2), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (2), a phthalocyanine dye having a structure represented by formula (5) is preferred. The phthalocyanine dye represented by formula (5), which is particularly suitable for the present invention, is described in detail below.

Formula (5):

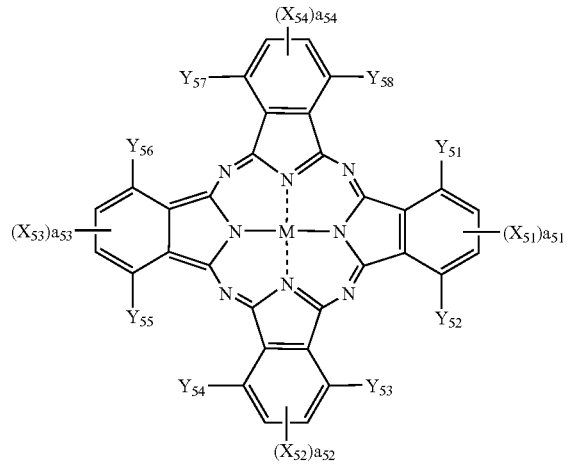

In formula (5), $X_{31}$ to $X_{34}$, $Y_{31}$ to $Y_{34}$ have the same meanings as $X_{21}$, $X_{22}$, $X_{23}$, $X_{24}$, $Y_{21}$, $Y_{22}$, $Y_{23}$ and $Y_{24}$, respectively, and preferred examples are also the same. M has the same meaning as M in formula (2) and preferred examples are also the same.

In formula (5), $a_{31}$ to $a_{34}$ each independently represents an integer of 1 or 2. $a_{31}+a_{32}+a_{33}+a_{34}$ is preferably from 4 to 6 and $a_{31}=a_{32}=a_{33}=a_{34}=1$ is more preferred.

$X_{31}$ to $X_{34}$ may be completely the same substituents, may be substituents of the same kind but partially different, for example, as in the case where $X_{31}$ to $X_{34}$ all are —SO$_2$—Z and Zs are different from each other, or may include substituents different from each other, for example, —SO$_2$—Z and —SO$_2$NR$_{21}$R$_{22}$.

In the phthalocyanine dye represented by formula (5), the following combination of substituents is particularly preferred.

$X_{31}$ to $X_{34}$ each independently represents preferably —SO—Z, —SO$_2$—Z, —SO$_2$NR$_{21}$R$_{22}$ or —CONR$_{21}$R$_{22}$, more preferably —SO$_2$Z or —SO$_2$NR$_{21}$R$_{22}$, and most preferably —SO$_2$—Z.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$R_{21}$ and $R_{22}$ each independently represents preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group. However, it is not preferred that $R_{21}$ and $R_{22}$ both are a hydrogen atom. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$Y_{21}$ to $Y_{24}$ each independently represents preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{31}$ to $a_{34}$ each independently represents preferably 1 or 2 and it is particularly preferred that all are 1.

M represents a hydrogen atom, a metal element or an oxide, hydroxide or halide thereof, more preferably Cu, Ni, Zn or Al, and most preferably Cu.

In the case where the phthalocyanine dye represented by formula (5) is water-soluble, the dye preferably has an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium). Among these counter ions, alkali metal ion is preferred and lithium ion is more preferred because the solubility of dye and the stability of ink are improved.

As for the number of ionic hydrophilic groups, the phthalocyanine-base dye preferably has at least two ionic hydrophilic groups, more preferably at least two sulfo groups and/or carboxyl groups, within one molecule.

As for the preferred combination of substituents in the compound represented by formula (5), a compound where at least one of various substituents is the preferred group is preferred, a compound where a larger number of various substituents are the preferred groups is more preferred, and a compound where all substituents are the preferred groups is most preferred.

As for the chemical structure of the phthalocyanine dye for use in the present invention, at least one electron-withdrawing group such as sulfinyl group, sulfonyl group and sulfamoyl group is preferably introduced into respective four benzene rings of phthalocyanine such that the total of σp values of the substituents in the entire phthalocyanine skeleton becomes 1.6 or more.

The Hammett's substituent constant σp value is briefly described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979).

Generally, in view of the synthesis method, the phthalocyanine derivative represented by formula (2) is inevitably a mixture of analogues differing in the site where the substituents Xn (n=21 to 24) and Ym (m=21 to 24) are introduced and in the number of the substituents introduced. Accordingly, these analogue mixtures are statistically averaged and represented by a formula in many cases. In the present invention, it has been found that when these analogue mixtures are classified into the following three types, a specific mixture is particularly preferred. The phthalocyanine-base dye analogue mixtures represented by formulae (2) and (3) are defined by classifying these into the following three types based on the substitution site.

(1) β-Position Substitution Type:

A phthalocyanine dye having specific substituents at the 2- and/or 3-position, the 6- and/or 7-position, the 10- and/or 11-position, and the 14- and/or 15-position.

(2) α-Position Substitution Type:

A phthalocyanine dye having specific substituents at the 1- and/or 4-position, the 5- and/or 8-position, the 9- and/or 12-position, and the 13- and/or 16-position.

(3) α,β-Position Mixed Substitution Type:

A phthalocyanine dye having specific substitutions at the 1- to 16-positions without any regularity.

In the present invention, phthalocyanine dye derivatives differing in the structure (particularly in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine—Kagaku to Kino—*(*Phthalocyanine—Chemistry and Function—*), pp. 1–62, IPC, and C. C. Leznoff and A. B. P. Lever, *Phthalocyanines—Properties and Applications*, pp. 1–54, VCH, or methods analogous thereto.

The phthalocyanine compound represented by formula (2) for use in the present invention can be synthesized, for example, through sulfonation, sulfonyl chloridation and amidation of an unsubstituted phthalocyanine compound as described in International Patents 00/17275, 00/08103, 00/08101 and 98/41853 and JP-A-10-36471. In this case, sulfonation may take place at any site of the phthalocyanine nucleus and the number of sites sulfonated is difficult to control. Accordingly, when a sulfo group is introduced under such reaction conditions, the site and number of sulfo groups introduced into the product cannot be specified and a mixture of those differing in the number of substituents or in the substitution site is inevitably produced. If the compound of the present invention is synthesized starting from such a product, the compound suitable for the ink set of the present invention is obtained as an α,β-position mixed substitution type mixture containing several kinds of compounds differing in the number of substituents or in the substitution site, because the number of sulfamoyl groups substituted on the heterocyclic ring or their substitution sites cannot be specified.

As described above, for example, when many electron-withdrawing groups such as sulfamoyl group are introduced into the phthalocyanine nucleus, the oxidation potential becomes nobler and the ozone resistance is increased. However, according to the above-described synthesis method, a phthalocyanine dye where the number of electron-withdrawing groups introduced is small, namely, the oxidation potential is baser, is inevitably mingled. Accordingly, in order to improve the ozone resistance, it is preferred to use a synthesis method where the production of a compound having a baser oxidation potential is suppressed.

The phthalocyanine compound represented, for example, by formulae (3) and (5) for use in the present invention can be synthesized by reacting a phthalonitrile derivative (Compound P) shown below and/or a diiminoisoindoline derivative (Compound Q) shown below with a metal derivative represented by formula (III) or can be derived from a tetrasulfophthalocyanine compound obtained by reacting a 4-sulfophthalonitrile derivative (Compound R) shown below with a metal derivative represented by formula (III) (in the chemical reaction scheme below, the obtained phthalocyanine compound represented, for example, by formulae (3) and (5) is shown by formula (A)).

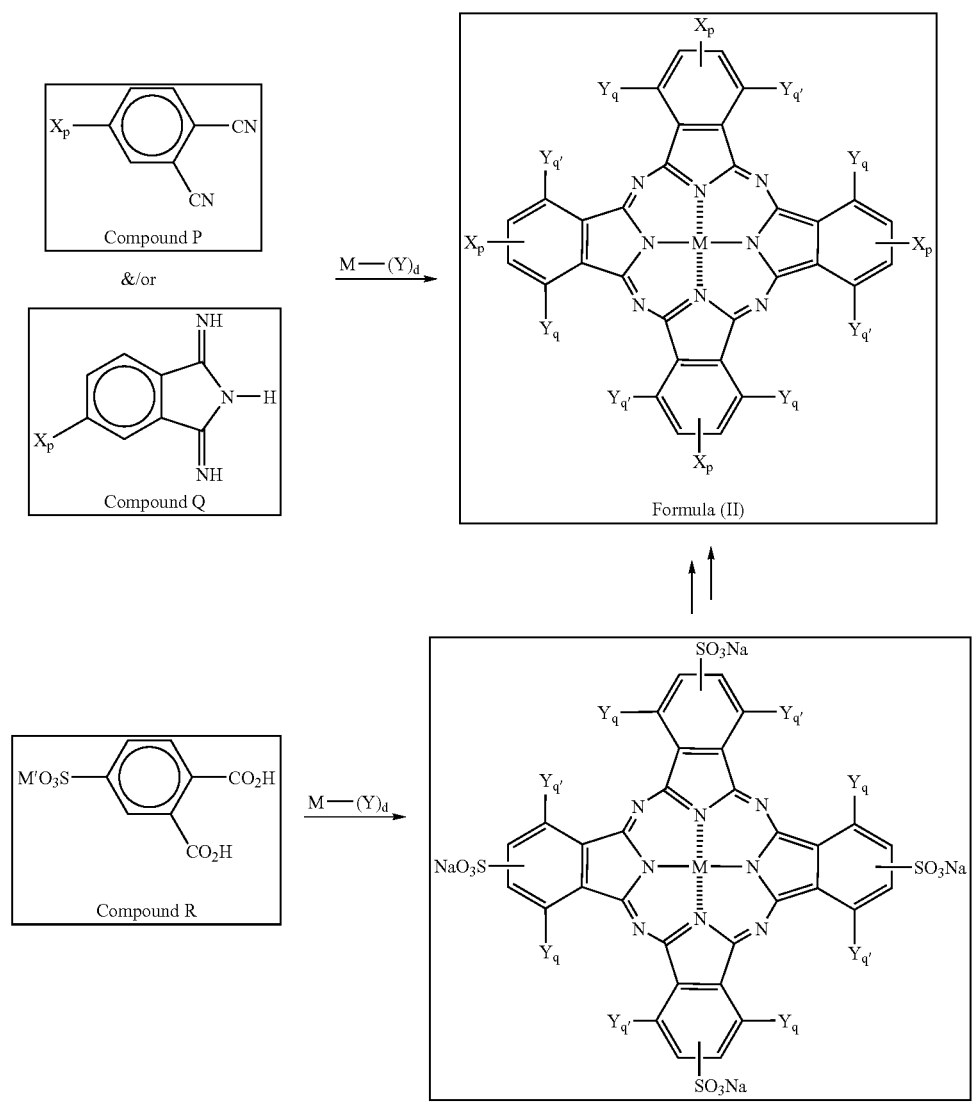

In the formulae above, $X_p$ corresponds to $X_{31}$ to $X_{34}$ in formula (5) and $Y_q$ and $Y_{q'}$ each corresponds to $Y_{21}$ to $Y_{24}$ in formula (5). In Compound R, M' represents cation.

Examples of the cation represented by M' include alkali metal ion such as Li, Na and K, and organic cation such as triethylammonium ion and pyridinium ion.

Formula (III):

wherein M has the same meaning as M in formulae (2) and (3), Y represents a monovalent or divalent ligand such as halogen atom, acetate anion, acetylacetonate and oxygen, and d represents an integer of 1 to 4.

That is, according to this synthesis method, a specific number of desired substituents can be introduced. Particularly, in the case of introducing a large number of electron-withdrawing groups so as to render the oxidation potential nobler as in the present invention, this synthesis method is very excellent as compared with the methods described above for synthesizing the phthalocyanine compound of formula (2).

The thus-obtained phthalocyanine compound represented by formulae (5) is usually a mixture of compounds represented by the following formulae (a)-1 to (a)-4 which are isomers in respect to the substitution site of each substituent $X_p$, namely, a β-position substitution type.

Formula (a)-1:

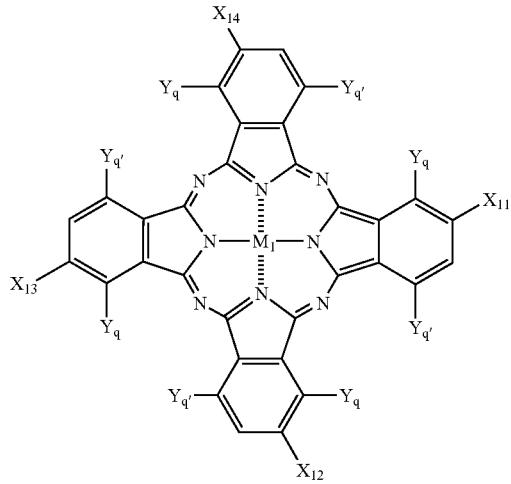

Formula (a)-2:

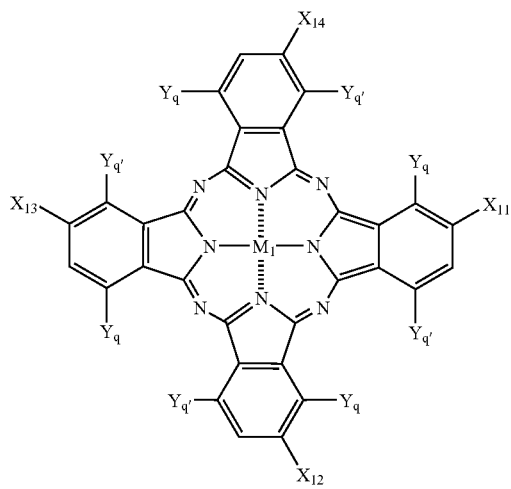

Formula (a)-3:

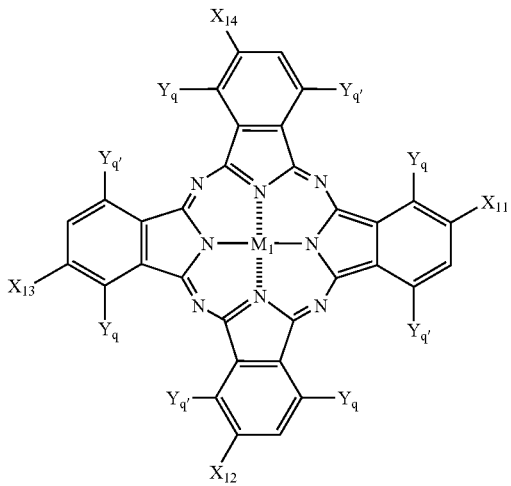

Formula (a)-4:

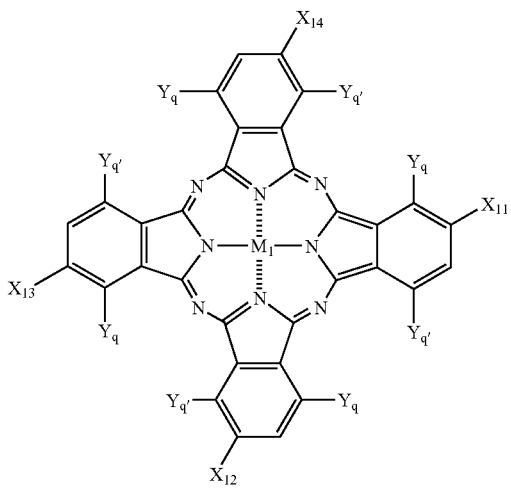

In the synthesis method above, when all $X_p$ are the same, a β-position substitution type phthalocyanine dye where $X_{31}$ to $X_{34}$ are completely the same substituents can be obtained. On the other hand, when $X_p$ are different, a dye having substituents of the same kind but partially different from each other or a dye having substituents different from each other can be synthesized. Among the dyes of formula (5), these dyes having electron-withdrawing substituents different from each other are preferred, because the solubility and aggregating property of dye and the aging stability of ink can be controlled.

In the present invention, it has been found to be very important for the improvement of fastness that in any substitution type, the oxidation potential is 1.0 V (vs SCE) or nobler. Its great effect cannot be expected at all from the above-described related techniques. Furthermore, although the cause is not particularly known, there is a tendency that the β-position substitution type is apparently more excellent in the color hue, light fastness, ozone resistance and the like than the α,β-position mixed substitution type.

Specific examples (Compounds I-1 to I-12 coming under formula (2) and Compounds 101 to 190 coming under formula (5)) of the phthalocyanine dyes represented by formulae (2) and (3) are set forth below, however, the phthalocyanine dye for use in the present invention is not limited to the following examples.

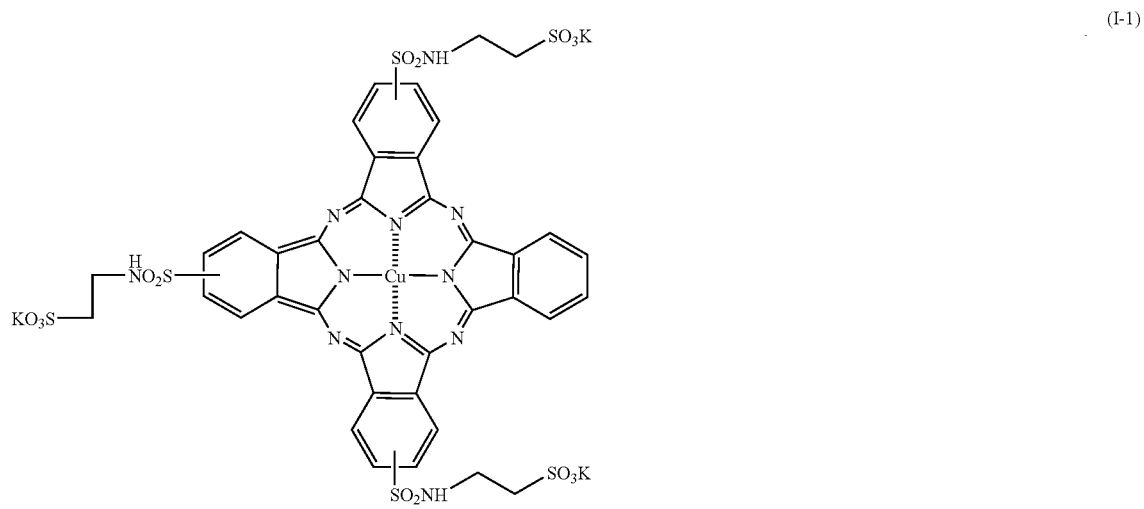
(I-1)
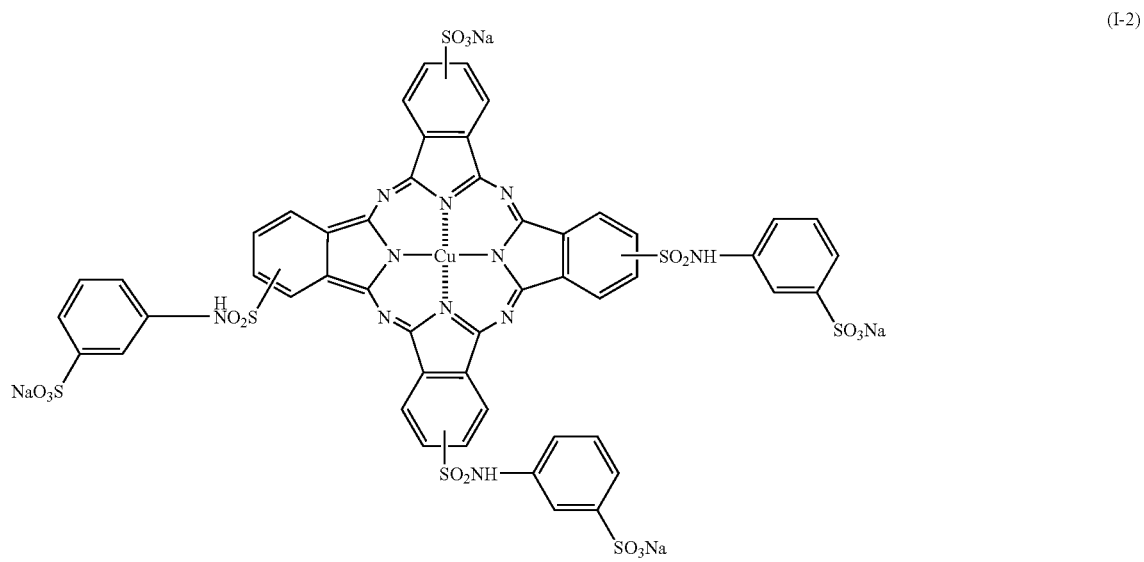
(I-2)
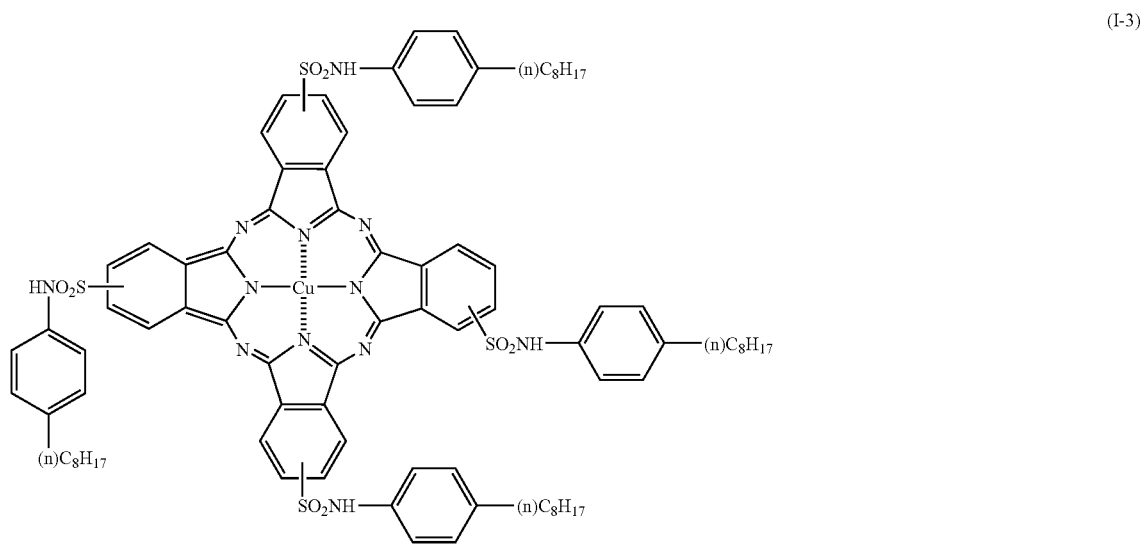
(I-3)

(I-4)
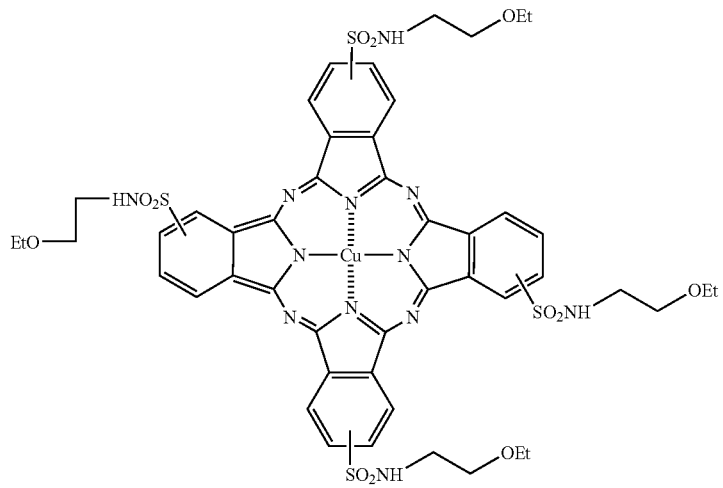
(I-5)
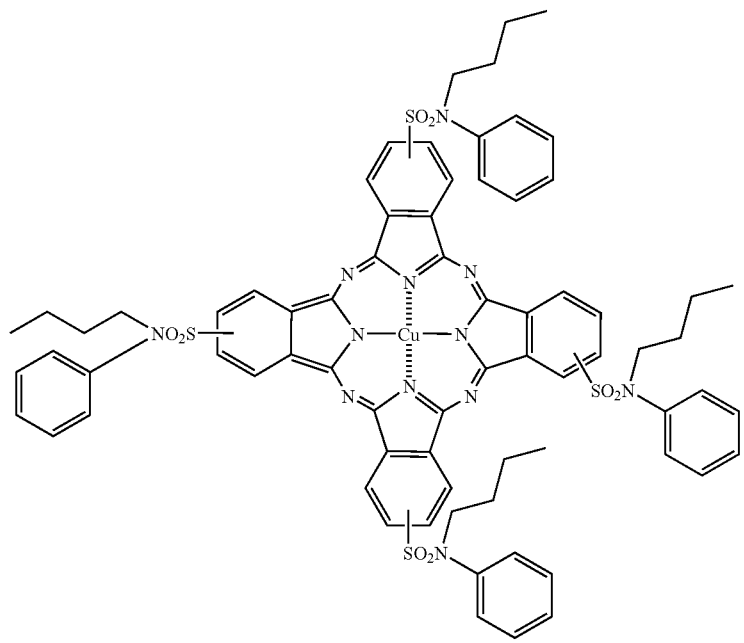
(I-6)
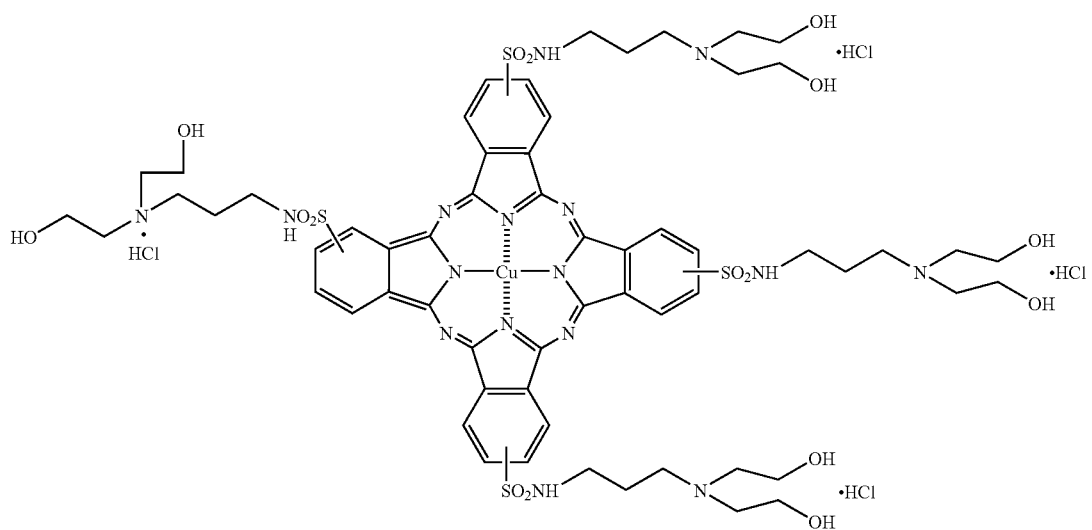

-continued
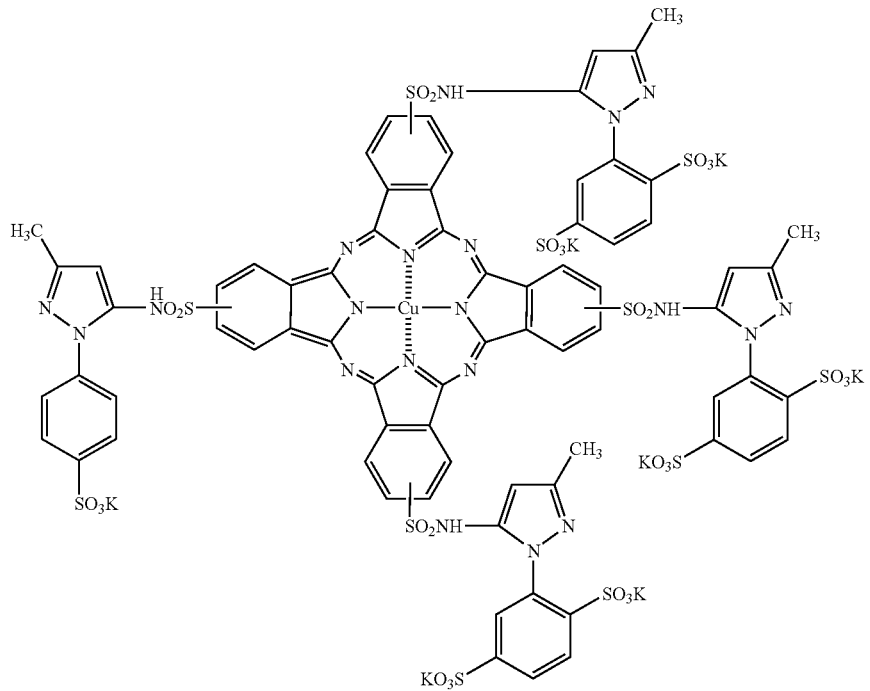
(I-7)
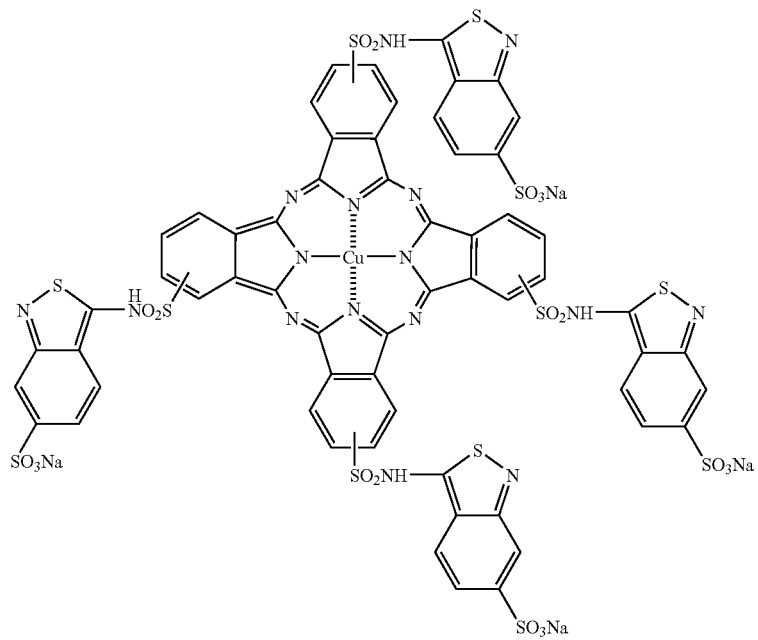
(I-8)

-continued
(I-9)
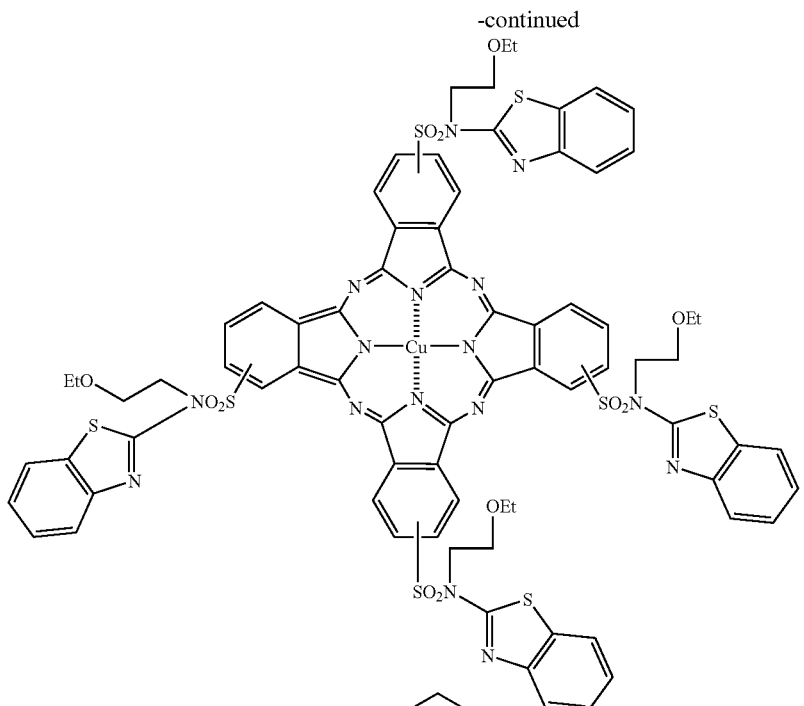
(I-10)
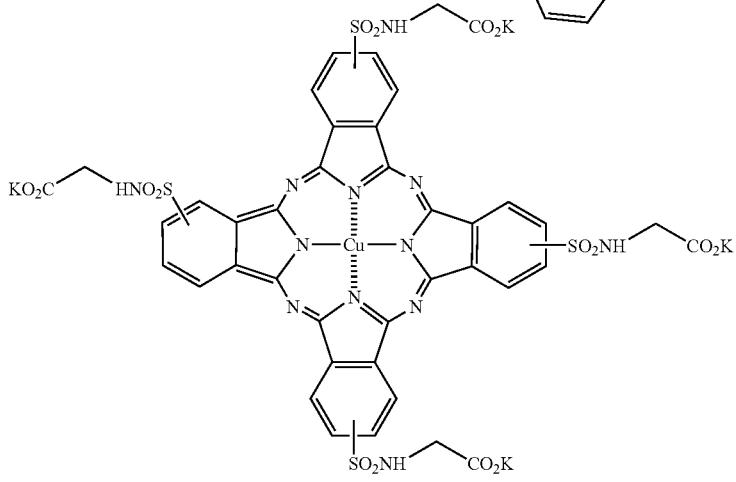
(I-11)
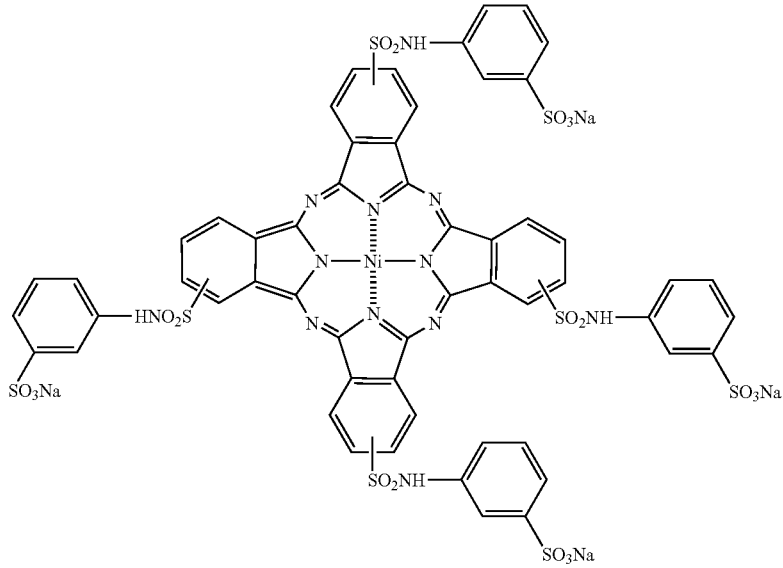

-continued

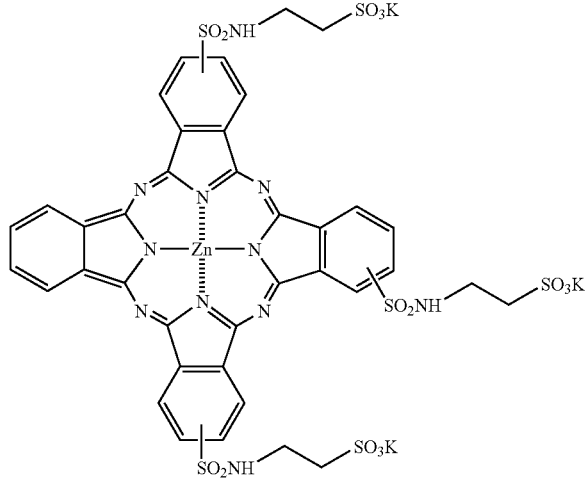

(I-12)

In the following Tables, specific examples of each pair of (X$_1$, X$_2$), (Y$_{11}$, Y$_{12}$), (Y$_{13}$, Y$_{14}$), (Y$_{15}$, Y$_{16}$) and (Y$_{17}$, Y$_{18}$) are independently in an irregular order.

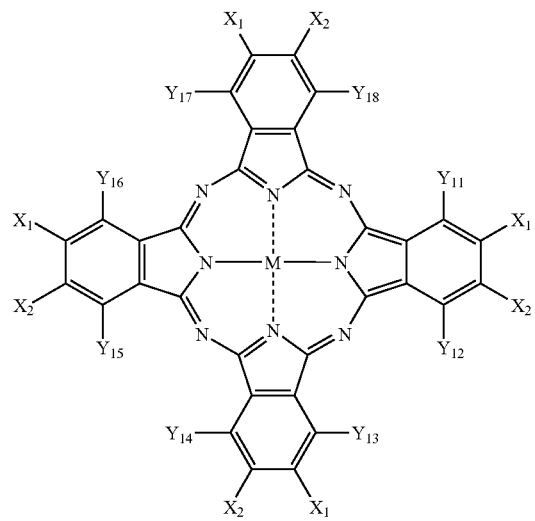

| | M | X$_1$ | X$_2$ | Y$_{11}$, Y$_{12}$ | Y$_{13}$, Y$_{14}$ | Y$_{15}$, Y$_{16}$ | Y$_{17}$, Y$_{18}$ |
|---|---|---|---|---|---|---|---|
| 101 | Cu | —SO$_2$—NH—CH$_2$—CH$_2$—SO$_2$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |

-continued

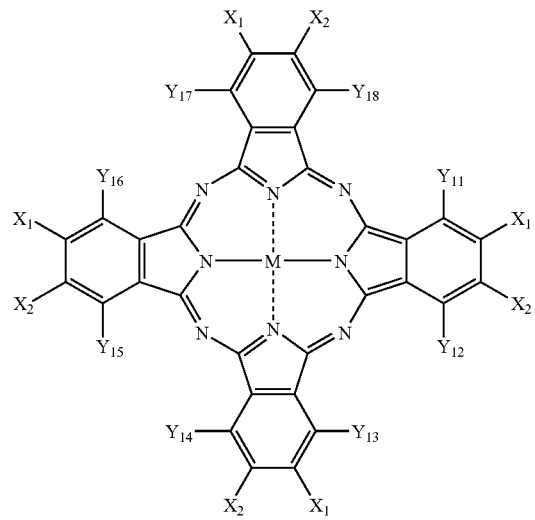

| | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 105 | Ni | —SO₂—NH—CH₂—CH₂—CO—NH—CH(CH₂—COONa)—COONa | —H | —Cl, —H | —Cl, —H | —Cl, —H | —Cl, —H |
| 106 | Cu | —SO₂—NH—CH₂—CH₂—SO₂—NH—CH₂—COONa | —CN | —H, —H | —H, —H | —H, —H | —H, —H |
| 107 | Cu | —SO₂—CH₂—CH₂—CH₂—SO₂—NH—CH(CH₂—OH)—COOLi | —H | —H, —H | —H, —H | —H, —H | —H, —H |
| 108 | Cu | —SO₂—CH₂—CH₂—CH₂—SO₃Li | —H | —H, —H | —H, —H | —H, —H | —H, —H |
| 109 | Cu | —SO₂—CH₂—CH₂—CH₂—SO₃K | —H | —H, —H | —H, —H | —H, —H | —H, —H |
| 110 | Cu | —SO₂—(CH₂)₃—CO₂K | —H | —H, —H | —H, —H | —H, —H | —H, —H |
| 111 | Cu | —SO₂—NH—CH₂—CH₂—CH₂—SO₂—NH—CH₂CH(OH)—CH₂—SO₃Li | —H | —H, —H | —H, —H | —H, —H | —H, —H |
| 112 | Cu | —SO₂—NH—CH₂—CH₂—CH₂—SO₂NH—CH₂—CH(OH)—CH₃ | —SO₃Li | —H, —H | —H, —H | —H, —H | —H, —H |
| 113 | Cu | —SO₂—CH₂—CH(OH)—CH₂SO₃K | —H | —H, —H | —H, —H | —H, —H | —H, —H |
| 114 | Cu | —SO₂—CH₂—CH(OH)—CH₃ | —SO₃Li | —H, —H | —H, —H | —H, —H | —H, —H |
| 115 | Cu | —SO₂NH(CH₂)₃N⁺(CH₃)(CH₂CH₂OH)₂·CH₃—C₆H₄—SO₃⁻ | —H | —H, —H | —H, —H | —H, —H | —H, —H |
| 116 | Cu | —CO—NH—CH₂—CH(OH)—CH₂SO₃K | —H | —H, —H | —H, —H | —H, —H | —H, —H |
| 117 | Cu | —CO—NH—CH(COOLi)—CH₂CH₂SO₃Li | —H | —H, —H | —H, —H | —H, —H | —H, —H |
| 118 | Cu | —SO₂CH₂CH₂CH(CH₃)(SO₃Li) | —H | —H, —H | —H, —H | —H, —H | —H, —H |

-continued

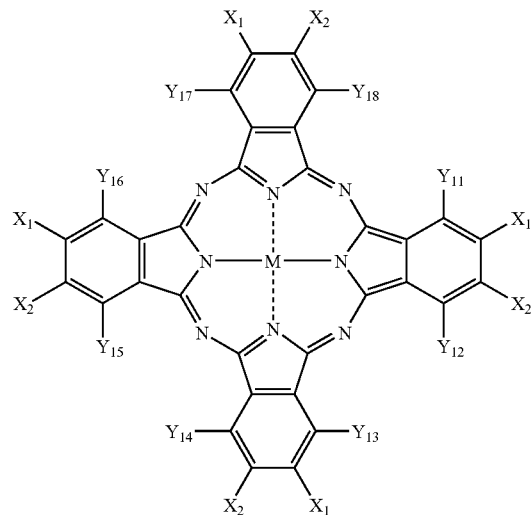

| | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 119 | Cu | —SO₂—CH₂—CH(OH)—CH₂—SO₃Na | —H | —H, —H | —H, —H | —H, —H | —H, —H |
| 120 | Cu | —SO₂—CH₂—CH₂—CH(CH₃)—COOLi | —H | —H, —H | —H, —H | —H, —H | —H, —H |
| 121 | Cu | —SO₂(CH₂)₃SO₂NHCH₂—CH(OH)—CH₂—SO₃Li | —H | —H, —H | —H, —H | —H, —H | —H, —H |
| 122 | Cu | —CO₂CH₂CH₂CH₂SO₂—NH—CH₂—CH(OH)—CH₂—SO₃Li | —H | —H, —H | —H, —H | —H, —H | —H, —H |
| 123 | Cu | —SO₂NH—C₈H₁₇(t) | —H | —H, —H | —H, —H | —H, —H | —H, —H |
| 124 | Cu | —SO₂—NH—CH₂—CH(CH₂CH₃)—CH₂CHCH₂—CH₃ | —H | —H, —H | —H, —H | —H, —H | —H, —H |
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)₂ | —H | —H, —H | —H, —H | —H, —H | —H, —H |
| 128 | Zn | —SO₂—CH₂—CH(O—CH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO—CH(CH₃)—CH₂—O—C₄H₉(t) | —H | —H, —H | —H, —H | —H, —H | —H, —H |

-continued

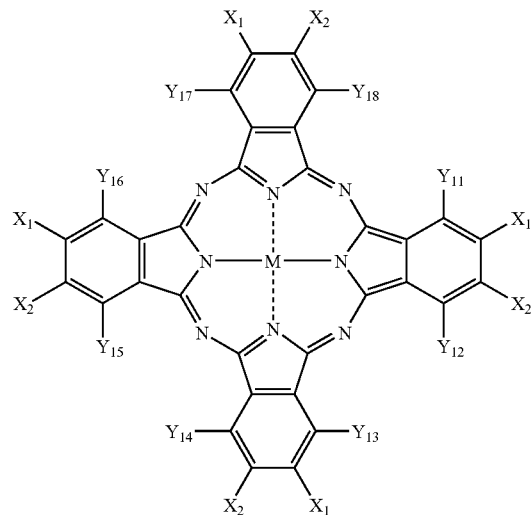

| | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 131 | Cu | —SO$_2$—CH$_2$—CH$_2$—CH(CH$_3$)—SO$_2$—NH—(2,5-(SO$_3$Li)$_2$-C$_6$H$_3$) | —H | —H, —H | —H, —H | —H, —H | —H, —H |
| 132 | Cu | —SO$_2$NH—(3,5-(CO$_2$C$_6$H$_{13}$(n))$_2$-C$_6$H$_3$) | —H | —H, —H | —H, —H | —H, —H | —H, —H |
| 133 | Cu | —SO$_2$NH—[4-OCH$_2$CH$_2$OCH$_3$-3-(SO$_2$NHCH$_2$CH(C$_2$H$_5$)(C$_4$H$_9$))-C$_6$H$_3$] | —H | —H, —H | —H, —H | —H, —H | —H, —H |
| 134 | Cu | —SO$_2$NH—C$_6$H$_4$—SO$_2$—NH—CH$_2$—CH(CH$_2$CH$_3$)—CH$_2$—CH$_2$—CH$_2$—CH$_3$ | —H | —H, —H | —H, —H | —H, —H | —H, —H |
| 135 | Cu | —SO$_2$—(3-CO$_2$Na-C$_6$H$_4$) | —H | —H, —H | —H, —H | —H, —H | —H, —H |
| 136 | Cu | —SO$_2$N(C$_4$H$_9$(n))(C$_6$H$_5$) | —H | —H, —H | —H, —H | —H, —H | —H, —H |
| 137 | Cu | —SO$_2$—(6-SO$_3$Li-benzothiazol-2-yl) | —H | —H, —H | —H, —H | —H, —H | —H, —H |

-continued

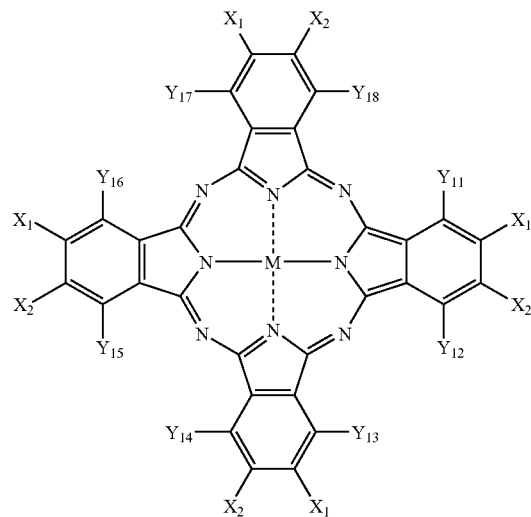

| | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 138 | Cu | —SO$_2$NH–(3-methyl-1-(2,5-disulfolithium-phenyl)pyrazol-5-yl) | —H | —H, —H | —H, —H | —H, —H | —H, —H |
| 139 | Cu | —SO$_2$(CH$_2$)$_3$—NH—CO—(3,4-di(CO$_2$Li)phenyl) | —Cl | —H, —H | —H, —H | —H, —H | —H, —H |
| 140 | Cu | —CO$_2$—CH$_2$CH$_2$CH$_2$—NH—(triazine with two NH—CH$_2$—CH(CH$_3$)—SO$_3$Li groups) | —H | —H, —H | —H, —H | —H, —H | —H, —H |
| 141 | Cu | —SO$_2$NH—CH(COONa)—CH$_2$—CO—N(CH$_2$CH$_2$OH)$_2$ | —H | —H, —H | —H, —H | —H, —H | —H, —H |
| 142 | Cu | —SO$_2$NH—(3-(NHCO-(3-SO$_3$Li-phenyl))phenyl) | —H | —H, —H | —H, —H | —H, —H | —H, —H |
| 143 | Cu | —CO—NH—CH$_2$—CH(OH)—CO—NH—CH(COOK)—CH$_2$CH$_2$—SO$_3$K | —H | —H, —H | —H, —H | —H, —H | —H, —H |

-continued

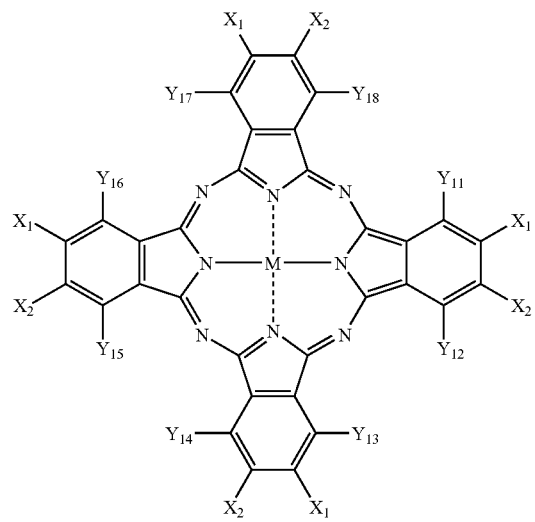

| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 144 | Cu | —SO₂—CH₂CH₂CH₂—NH—CO—C₆H₄—CO—NH—CH(COOLi)—CH₂—COOLi | —H | —H, —H | —H, —H | —H, —H | —H, —H |
| 145 | Cu | —SO₂CH₂CH₂OCH₂CH₂OCH₂CH₂SO₃Li | —H | —H, —H | —H, —H | —H, —H | —H, —H |

In the following Tables, each introduction site of substituents $(X_{p1})$ and $(X_{p2})$ is in an irregular order within the β-position substitution type.

| No. | M | Xp₁ | m |
|---|---|---|---|
| | | M-Pc(Xp₁)ₘ(Xp₂)ₙ | |
| 146 | Cu | —SO₂—NH—CH₂—CH(CH₃)—SO₃Li | 3 |
| 147 | Cu | —SO₂—NH—CH₂—CH₂SO₃Li | 3 |
| 148 | Cu | —SO₂—NH—CH₂—CH(CH₃)—SO₃Li | 3 |
| 149 | Cu | —SO₂—NH—CH₂—CH(CH₃)—SO₃Li | 2 |
| 150 | Cu | —SO₂—NH—CH₂—CH₂—SO₂—NH—CH₂CH₂—COONa | 3 |
| 151 | Cu | —SO₂—NH—C₆H₄—SO₂NH—CH₂—CH(OH)—SO₃Li | 3 |
| 152 | Cu | —SO₂—CH₂—CH₂—CH(CH₃)—SO₃Li | 2.5 |
| 153 | Cu | —SO₂—CH₂—CH₂—CH(CH₃)—SO₃Na | 2 |
| 154 | Cu | —SO₂—CH₂—CH₂—CH₂—SO₃Li | 3 |

-continued

| | | | |
|---|---|---|---|
| 155 | Cu | —SO₂—CH₂—CH₂—CH₂—COOK | 2 |
| 156 | Cu | —SO₂—CH₂—CH₂—CH₂—SO₃Li | 3 |
| 157 | Cu | —SO₂—CH₂—CH₂—O—CH₂—CH₂—SO₃Li | 2 |
| 158 | Cu | —SO₂—CH₂—CH(OH)—CH₂SO₃Li | 3 |
| 159 | Cu | —SO₂NHCH₂CH₂—SO₃Li | 3 |
| 160 | Cu | —SO₂—CH₂—CH₂—O—CH₂—CH₂—O—CH₂—CH₂—SO₃Na | 3 |
| 161 | Cu | —SO₂CH₂CH₂CH₂SO₃Li | 3 |
| 162 | Cu | —SO₂CH₂CH₂CH₂SO₃Li | 2 |
| 163 | Cu | —SO₂CH₂CH₂CH₂SO₃K | 3 |
| 164 | Cu | —SO₂CH₂CH₂CH₂SO₃Li | 2 |
| 165 | Cu | —CO—NH—CH₂—CH₂—SO₃K | 3 |
| 166 | Cu | —CO—NH—CH₂—CH₂—SO₂—NH—CH₂—CH₂—COONa | 3 |
| 167 | Cu | —SO₂(CH₂)₃SO₂NHCH₂—CH(OH)—CH₂CO₂Li | 2.5 |
| 168 | Cu | —CO₂—CH₂—CH₂—CH(CH₃)—SO₃Na | 2 |
| 169 | Cu | —CO₂—CH₂—CH₂—CH₂—SO₃Li | 3 |
| 170 | Cu | —CO₂—CH₂—CH₂—CH₂COOK | 2 |
| 171 | Cu | —CO₂—CH₂—CH₂—O—CH₂—CH₂—O—CH₂—CH₂—SO₃Na | 3 |
| 172 | Cu | —SO₂CH₂CH₂OCH₂CH₂O—CH₂CH₂SO₃K | 2 |
| 173 | Cu | —SO₂(CH₂)₃SO₂NHCH₂CH(OH)CH₂OH | 2 |
| 174 | Cu | —SO₂(CH₂)₃SO₂NHCH₂—CH(OH)—CH₂SO₃K | 3 |
| 175 | Cu | —SO₂(CH₂)₃SO₂NH(CH₂)₃N(CH₂CH₂OH)₂ | 2 |
| 176 | Cu | —SO₂—CH₂—CH₂—CH₂—SO₂—NH—CH₂—CH(OH)—CH₃ | 3 |
| 177 | Cu | —SO₂—CH₂—CH₂—O—CH₂—CH₂—O—CH₂ | 2 |
| 178 | Cu | —SO₂—CH₂—CH₂—O—CH₂—CH₂—O—CH₂—CH₂—OH | 3 |
| 179 | Cu | —SO₂—CH₂—CH(CH₂CH₃)—CH₂CH₂—CH₂CH₃ | 2 |
| 180 | Cu | —SO₂—CH₂—CH₂—CH₂—SO₂—NH—CH₂—CH(O—CH₃)—CH₃ | 3 |
| 181 | Cu | —SO₂—CH₂—CH₂—CH₂—CO₂—NH—CH(CH₃)—CH₂—CH₃ | 3 |
| 182 | Cu | —SO₂—CH₂—CH₂—CH₂—SO₂NH—CH₂—CH(OH)—CH₃ | 2.5 |
| 183 | Cu | —SO₂—CH₂—CH₂—CH₂—CO₂—NH—CH(CH₃)—CH₂—CH₃ | 2 |
| 184 | Cu | —SO₂—CH₂—CH₂—CH₂—SO₂—NH—CH₂—CH(OH)—CH₃ | 3 |
| 185 | Cu | —SO₂—CH₂—CH₂—CH₂—SO₂—NH—CH₂—CH(OH)—CH₃ | 3 |

-continued

| No. | M | | n |
|---|---|---|---|
| 186 | Cu | —SO$_2$—CH$_2$—CH$_2$—CH$_2$—CO$_2$—NH—CH(CH$_3$)—CH$_2$—CH$_3$ | 3 |
| 187 | Cu | —SO$_2$—CH$_2$—CH$_2$—CH$_2$—SO$_2$—NH—CH—(CH$_3$)$_2$ | 3 |
| 188 | Cu | —CO$_2$—CH$_2$—CH$_2$—CH$_2$—CO$_2$—NH—CH(CH$_3$)—CH$_2$—CH$_3$ | 3 |
| 189 | Cu | —CO—NH—CH$_2$—CH$_2$—SO$_2$—NH—CH—(CH$_3$)$_2$ | 3 |
| 190 | Cu | —CO$_2$—NH—CH$_2$—CH(CH$_2$CH$_3$)—CH$_2$—CH$_2$—CH$_2$CH$_3$ | 3 |

M-Pc(Xp$_1$)$_a$(Xp$_1$)$_a$

| No. | Xp$_2$ | n |
|---|---|---|
| 146 | —SO$_2$—NH—CH$_2$—CH(OH)—CH$_3$ | 1 |
| 147 | —SO$_2$—NH—CH$_2$—CH$_2$—CH$_2$—SO$_2$—NH—CH$_2$—CH(OH)—CH$_3$ | 1 |
| 148 | —SO$_2$NH—CH$_2$—CH$_2$—CH$_2$—SO$_2$—NH—CH$_2$—CH$_2$—O—CH$_2$—CH$_2$—OH | 1 |
| 149 | —SO$_2$—NH—CH$_2$—CH$_2$—CH$_2$—CO—N—(CH$_2$—CH$_2$—OH)$_2$ | 2 |
| 150 | —SO$_2$NH—CH(CH$_3$)—CH$_2$OH | 1 |
| 151 | —SO$_2$NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N—(CH$_2$—CH$_2$—OH)$_2$ | 2 |
| 154 | —SO$_2$—CH$_2$—CH$_2$—CH$_2$—SO$_2$—NH—CH$_2$—CH(OH)—CH$_3$ | 1 |
| 155 | —SO$_2$—CH$_2$—CH$_2$—CH$_2$—SO$_2$—NH—CH$_2$—CH(OH)—CH$_2$—COOK | 2 |
| 156 | —SO$_2$—CH$_2$—CH(OH)—CH$_2$—SO$_3$Li | 1 |
| 157 | —SO$_2$—CH$_2$—CH$_2$—CH$_2$—CO$_2$—CH$_2$—CH$_2$—CH(OH)—CH$_2$—COOK | 2 |
| 158 | —SO$_2$—CH$_2$—C$_6$H$_4$—SO$_2$NH—CH$_2$—CH(OH)—CH$_2$—OH | 1 |
| 159 | —SO$_2$—CH$_2$—CH$_2$—CH$_2$—SO$_2$—NH—CH$_2$—CH(OH)—CH$_3$ | 1 |
| 160 | —SO$_2$—CH$_2$—CH$_2$—CH$_2$—CO—N(CH$_2$CH$_2$COONa)—CH$_2$—COONa | 1 |
| 161 | —SO$_2$CH$_2$CH$_2$CH$_2$SO$_2$NHCH$_2$—CH(OH)—CH$_2$SO$_3$Li | 1 |
| 162 | —SO$_2$CH$_2$CH$_2$OCH$_2$OCH$_2$CH$_2$OH | 2 |
| 163 | —SO$_2$CH$_2$CH$_2$CH$_2$SO$_2$NH—CH(CH$_3$)—CH$_2$—OH | 1 |

| | | -continued | |
|---|---|---|---|
| 164 | —SO$_2$CH$_2$CH$_2$CH$_2$SO$_2$N(CH$_2$CH$_2$OH)$_2$ | | 2 |
| 165 | —CO—NH—CH$_2$—CH$_2$—O—CH$_2$—CH$_2$—OH | | 1 |
| 166 | —CO—NH—CH$_2$—CH(OH)—CH$_3$ | | 1 |
| 167 | —CO—NH—CH$_2$—CH$_2$—CH$_2$—CO—N—(CH$_2$—CH$_2$—OH)$_2$ | | 1.5 |
| 168 | —CO—CH$_2$—CH$_2$—CH$_2$—CO—N—(CH$_2$—CH$_2$—OH)$_2$ | | 2 |
| 169 | —CO$_2$—CH$_2$—CH$_2$—CH$_2$—SO$_2$—NH—CH$_2$—CH(OH)—CH$_3$ | | 1 |
| 170 | —CO$_2$—CH$_2$—CH$_2$—CH$_2$—SO$_2$—NH—CH$_2$—CH(OH)—CH$_2$—COOK | | 2 |
| 171 | —SO$_2$—CH$_2$—C$_6$H$_4$—SO$_2$NH—CH$_2$—CH(OH)—CH$_2$—OH | | 1 |
| 172 | —CO$_2$—CH$_2$—CH$_2$—CH$_2$—CO$_2$—CH$_2$—CH$_2$—CH(OH)—CH$_2$—COOK | | 2 |
| 173 | —CO$_2$—CH$_2$—CH(OH)—CH$_2$—SO$_3$Li | | 2 |
| 174 | —CO$_2$—CH$_2$—CH$_2$—CH$_2$—SO$_2$—NH—CH$_2$—CH(OH)—CH$_3$ | | 1 |
| 175 | —CO$_2$—CH$_2$—CH$_2$—CH$_2$—CH$_2$—CO—N(CH$_2$—CH$_2$—COOLi)—CH$_2$—COOLi | | 2 |
| 176 | —SO$_2$—CH$_2$—CH$_2$—SO$_2$—NH—CH$_2$—CH(CH$_2$CH$_3$)—CH$_2$CH$_2$—CH$_2$CH$_3$ | | 1 |
| 177 | —SO$_2$—CH$_2$—CH$_2$—CH$_2$—SO$_2$—NH—CH$_2$—CH(OH)—CH$_3$ | | 1 |
| 178 | —SO$_2$—CH$_2$—CH$_2$—CH$_2$—CO$_2$—CH$_2$—CH(CH$_2$CH$_3$)—CH$_2$CH$_2$—CH$_2$CH$_3$ | | 1 |
| 179 | —SO$_2$—CH$_2$—CH$_2$—CH$_2$—SO$_2$—NH—CH$_2$—CH(O—CH$_3$)—CH$_3$ | | 2 |
| 180 | —SO$_2$NH—CH$_2$—CH$_2$—SO$_2$NH—CH$_2$—CH$_2$—O—CH$_2$—CH$_2$—OH | | 1 |
| 181 | —SO$_2$—CH$_2$—CH$_2$—CH$_2$—SO$_2$—NH—CH—(CH$_3$)$_2$ | | 1 |
| 182 | —SO$_2$—CH$_2$—CH$_2$—CH$_2$—CO$_2$—NH—CH(CH$_3$)—CH$_2$—CH$_3$ | | 1.5 |
| 183 | —SO$_2$—CH$_2$—CH$_2$—CH$_2$—SO$_2$—NH—(CH$_2$)$_3$—CH$_2$—O—CH$_2$CH$_2$—OH | | 2 |
| 184 | —SO$_2$—CH$_2$—CH$_2$—O—CH$_2$—CH$_2$—O—CH$_3$ | | 1 |
| 185 | —SO$_2$—CH$_2$—CH$_2$—O—CH$_2$—CH$_2$—O—CH$_2$—O—CH$_3$ | | 1 |
| 186 | —SO$_2$—CH$_2$—CH$_2$—O—CH$_2$—CH$_2$—O—CH$_2$—CH$_2$—OH | | 1 |
| 187 | —CO$_2$—CH$_2$—CH(CH$_2$CH$_3$)—CH$_2$—CH$_2$—CH$_2$CH$_3$ | | 1 |
| 188 | —CO$_2$—CH$_2$—CH$_2$—O—CH$_2$—CH$_2$—O—CH$_3$ | | 1 |

-continued

| 189 | —SO$_2$—NH—CH$_2$—CH(CH$_2$CH$_3$)—CH$_2$—CH$_2$—CH$_2$—CH$_3$ | 1 |
| 190 | —CO—NH—CH$_2$—CH$_2$—O—CH$_2$—CH$_2$—O—CH$_3$ | 1 |

The structure of the phthalocyanine compound represented by M-Pc(X$_{p1}$)$_m$(X$_{p2}$)$_n$ in Tables 7 to 17 is shown below:

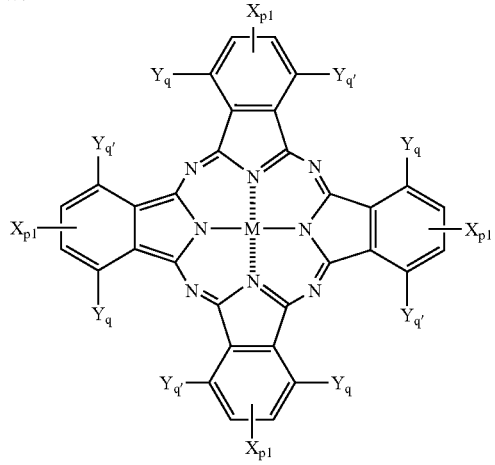

(wherein each X$_{p1}$ is independently X$_{p1}$ or X$_{p2}$).

The phthalocyanine dye represented by formula (2) can be synthesized according to the patent publications described above. Furthermore, the phthalocyanine dye represented by formula (5) can be synthesized by the methods described in JP-A-2001-226275, JP-A-2001-96610, JP-A-2001-47013 and JP-A-2001-193638, in addition to the synthesis method described above. The starting material, dye intermediate and synthesis route are not limited to those described in these patent publications.

Additional examples of the azo dye having a heterocyclic group, particularly the azo dye having two heterocyclic groups directly bonded to the azo group, which is included in the dye of formula (1) or (3) preferably used in the present invention, are set forth below. These magenta dyes are used not only in a magenta ink or a light magenta ink but also in a dark yellow ink or a black ink as one constituent dye.

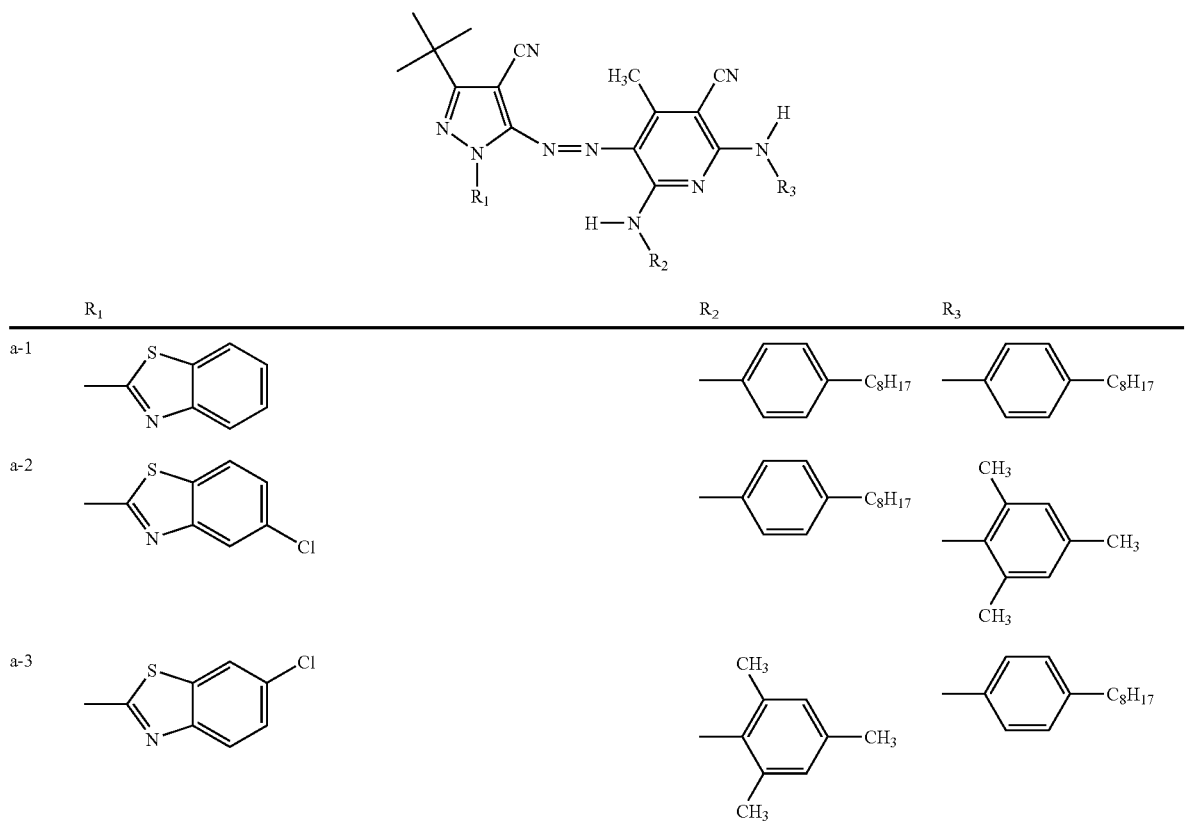

-continued

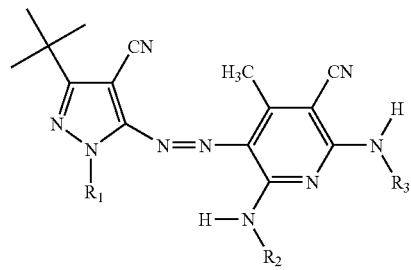

| | R₁ | R₂ | R₃ |
|---|---|---|---|
| a-4 | 2-methylbenzothiazole | 2-methylphenyl with OC₈H₁₇ ortho | 4-C₈H₁₇-phenyl |
| a-5 | 2-methyl-5-nitrobenzothiazole | 2,4-dimethylphenyl | 2,4-dimethylphenyl |
| a-6 | 2-methylbenzothiazol-6-yl-SO₂NH—(CH₂)₃—O—(2,4-di-tert-pentylphenyl) | 4-methylphenyl | 4-methylphenyl |
| a-7 | 2-methylbenzothiazol-6-yl-SO₂NH—(CH₂)₃—OCH₂CH(C₈H₁₇)(C₆H₁₃) | 2,3,4-trimethylphenyl | 4-methylphenyl |
| a-8 | 2-methylbenzothiazol-6-yl-NHCOCH(Et)—O—(2,4-di-tert-pentylphenyl) | 4-C₈H₁₇-phenyl | 4-C₈H₁₇-phenyl |
| a-9 | 2-methylbenzothiazol-6-yl-NHSO₂—(2-(n)C₈H₁₇O-5-C₈H₁₇(t)-phenyl) | 2,3,4-trimethylphenyl | C₈H₁₇(t) |
| a-10 | 2-methyl-5-chlorobenzothiazole | 2-methylphenyl with OC₁₂H₂₅ ortho | 2-methylphenyl with OC₁₂H₂₅ ortho |

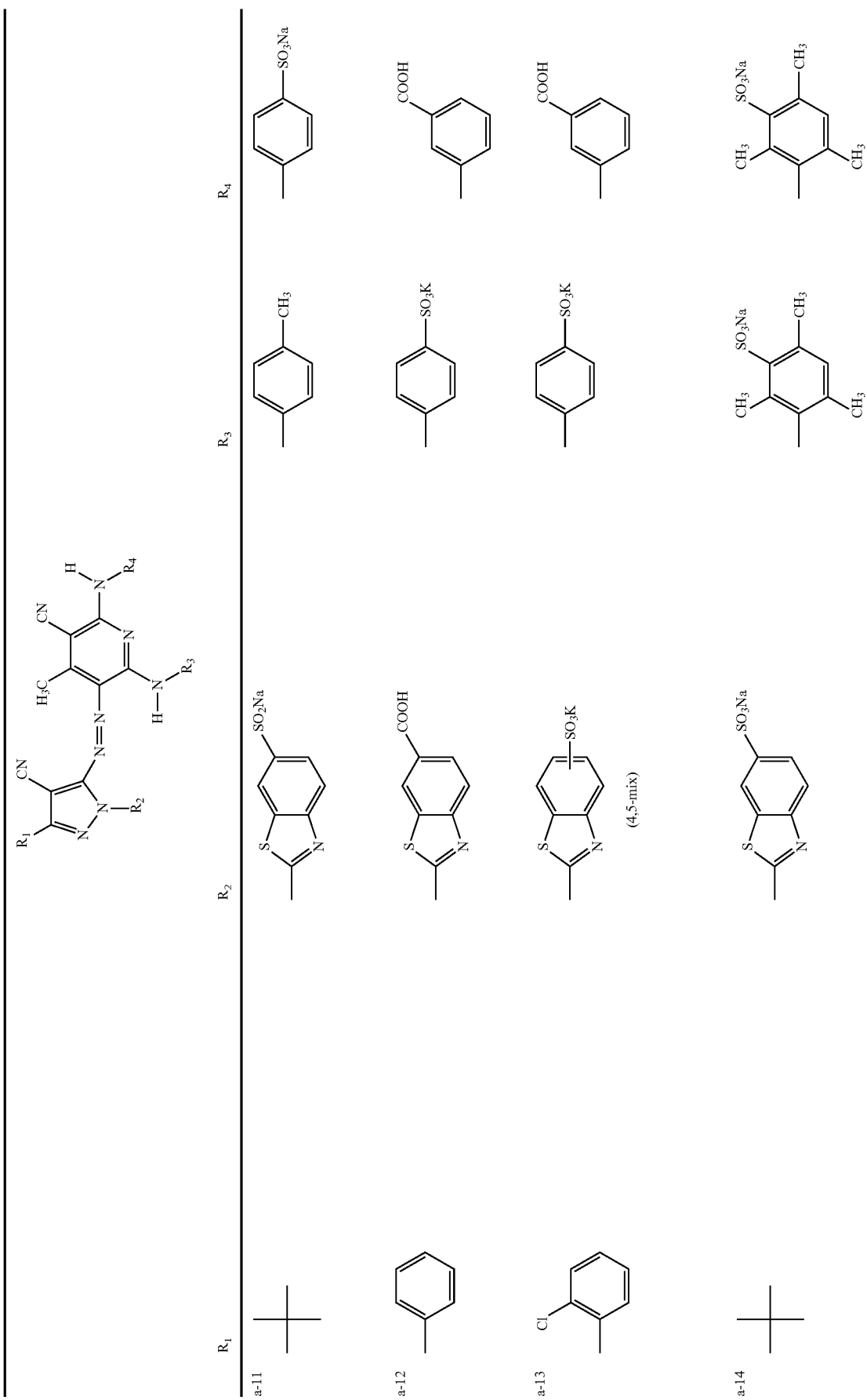

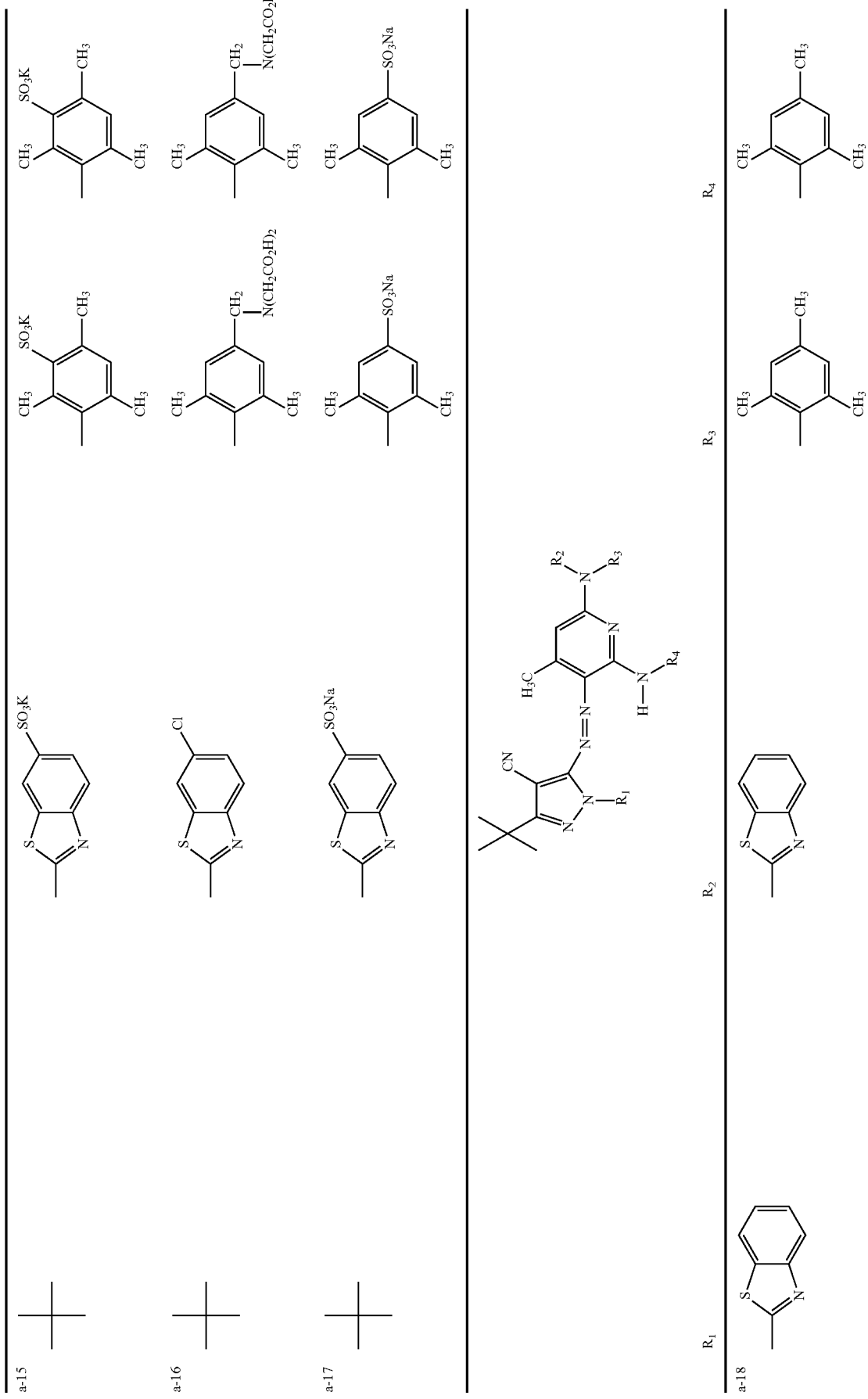

-continued
| | | | |
|---|---|---|---|
| a-19 |  | —SO$_2$CH$_3$ |  |
| a-20 |  | —COCH$_3$ |  |
| a-21 |  | —SO$_2$CH$_3$ |  |
| a-22 |  | H | 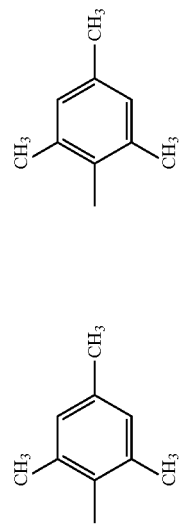 |
| a-23 |  | H |  |
| a-24 |  | H | 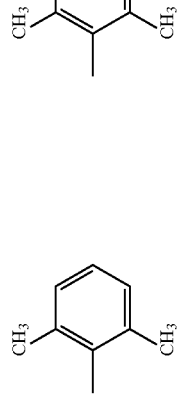 |

-continued
| | | | | | |
|---|---|---|---|---|---|
| a-25 | 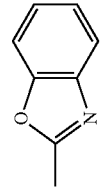 | 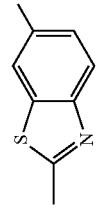 | 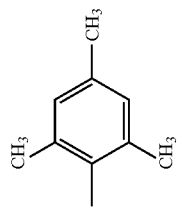 | 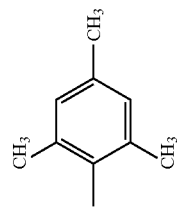 | |
| a-26 | | | | | |
| a-27 | | 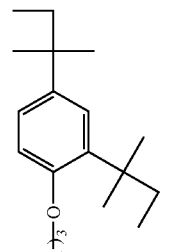 | 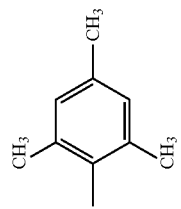 | | |
| a-28 | | | | 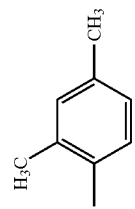 | 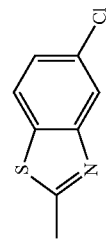 |
| a-29 | 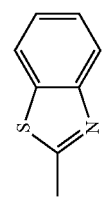 | 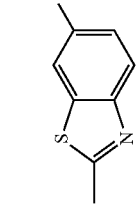 | | 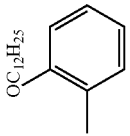 | 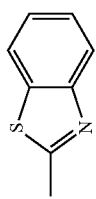 |

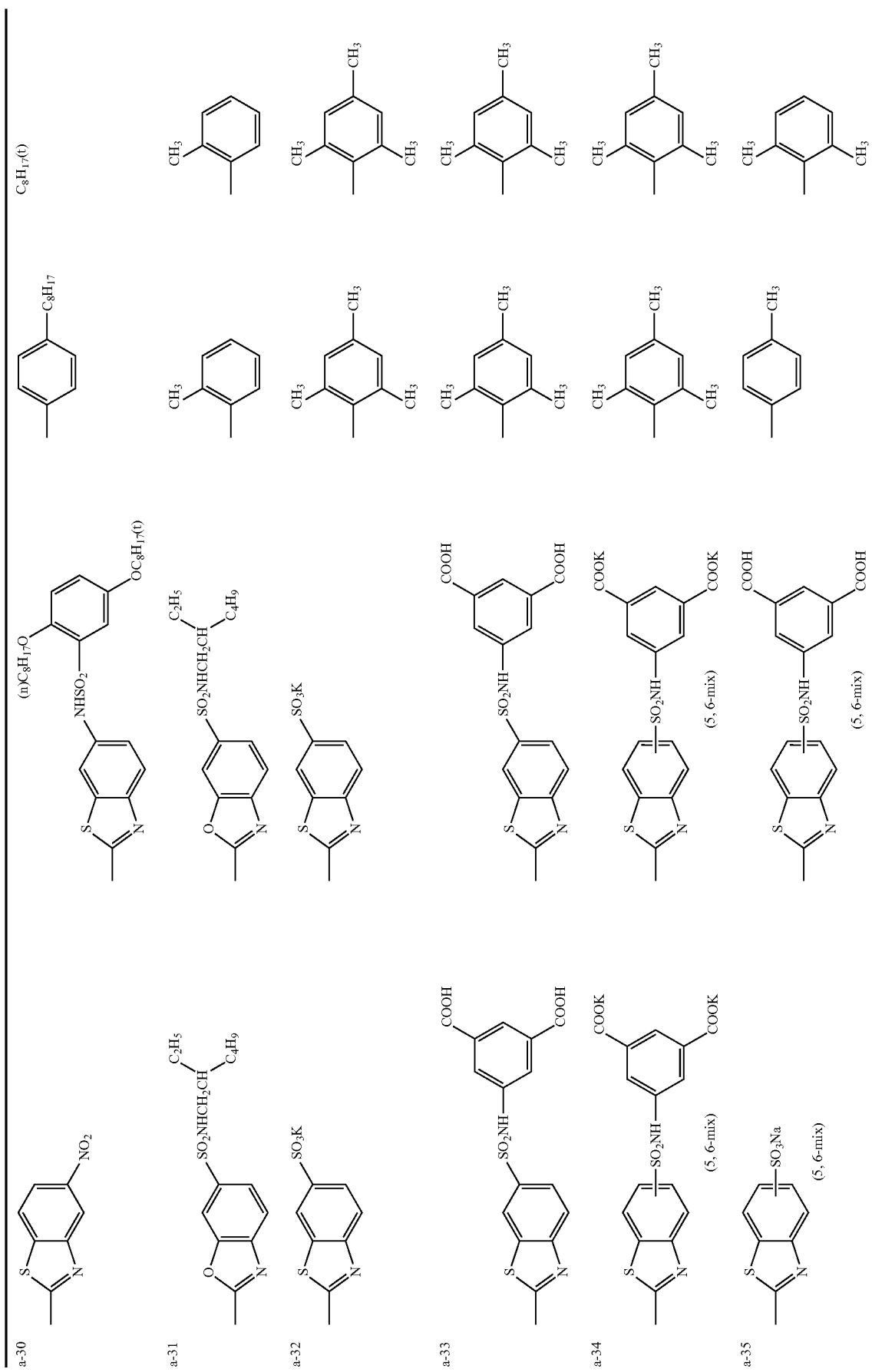

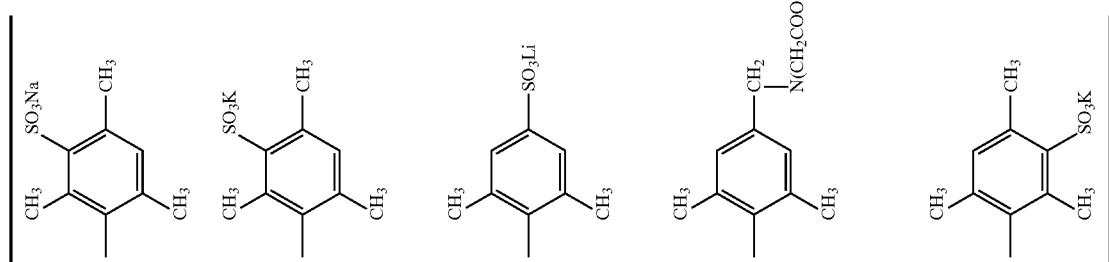
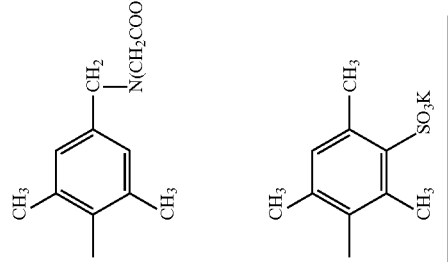
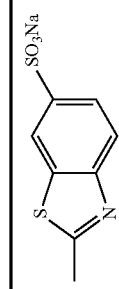
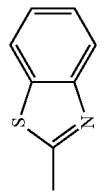
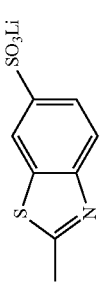
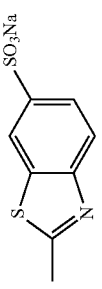
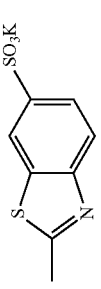
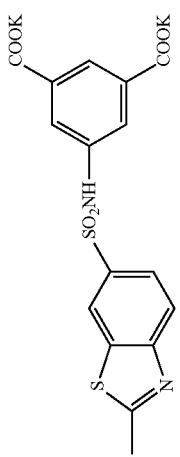
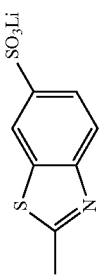
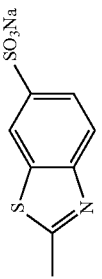
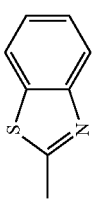
a-36
a-37
a-38
a-39
a-40

| | $R_1$ | $R_2$ | $R_3$ | $R_4$ | $R_5$ | $R_6$ | $R_7$ | $R_8$ |
|---|---|---|---|---|---|---|---|---|
| a-41 | o-tolyl | CN | 2-pyridyl | H | CONH$_2$ | SO$_2$CH$_3$ | o-cresyl (OC$_8$H$_{17}$-o-tolyl) | o-tolyl |
| a-42 | t-Bu | Br | 2-pyridyl | COOEt | H | 2-methylbenzothiazol-2-yl | C$_8$H$_{17}$(t) | COCH$_3$ |
| a-43 | 2-pyridyl | SO$_2$CH$_3$ | 4,6-bis(NHCH$_3$)-1,3,5-triazin-2-yl | CONH$_2$ | H | 6-chloro-2-methylbenzothiazol-2-yl | p-tolyl-CH$_2$- | t-Bu-CO- |

-continued
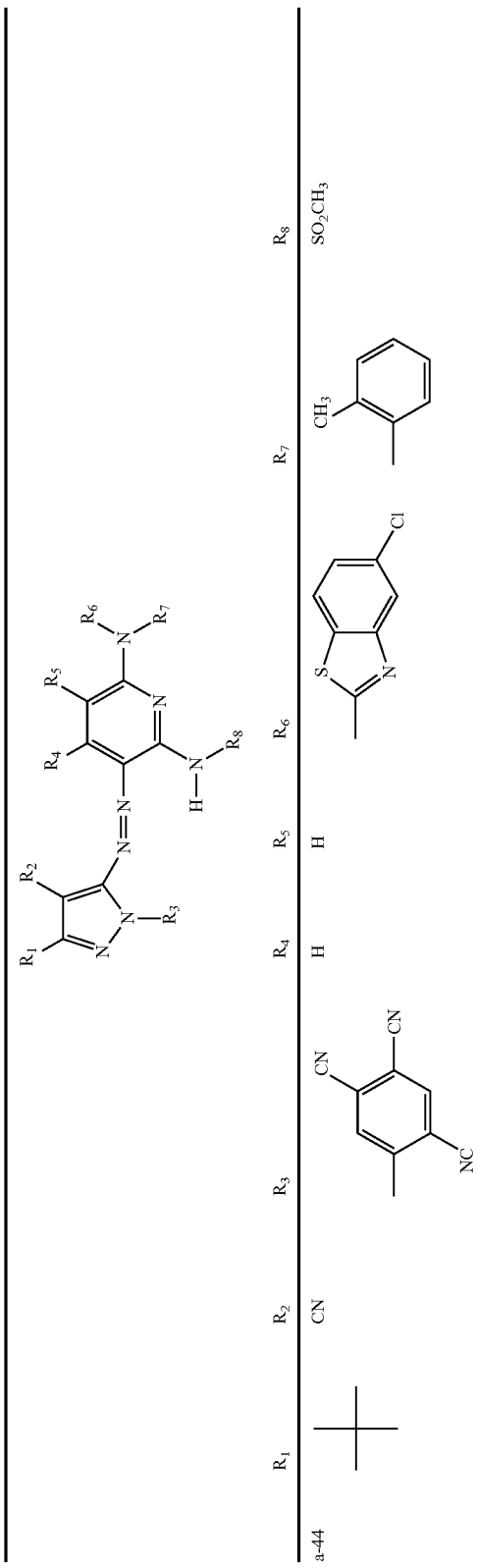
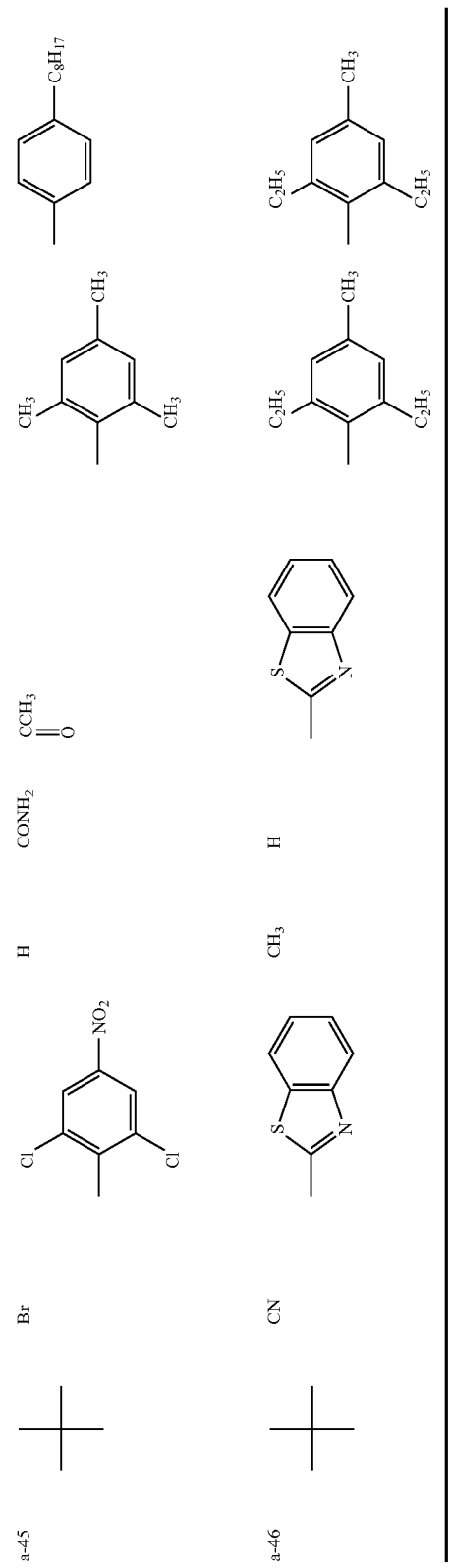

| | $R_1$ | $R_2$ | $R_3$ | $R_4$ | $R_5$ | $R_6$ |
|---|---|---|---|---|---|---|
| b-1 | CH₃ | CH₃ | CN | H | 4-octylphenyl | 4-octylphenyl |
| b-2 | CH₃ | CH₃ | CN | H | 2,4,6-trimethylphenyl | 2,4,6-trimethylphenyl |
| b-3 | CH₃ | CH₃ | CONH₂ | H | 4-octylphenyl | 2,4,6-trimethylphenyl |
| b-4 | CH₃ | CH₃ | H | H | 2,4,6-trimethyl-3-SO₃Li-phenyl | 2,4,6-trimethyl-3-SO₃Li-phenyl |
| b-5 | CH₃ | H | CN | H | 4-SO₃Na-phenyl | 4-SO₃Na-phenyl |

-continued

| | | | | |
|---|---|---|---|---|
| b-6 | CH$_3$ | CH$_3$ | H | 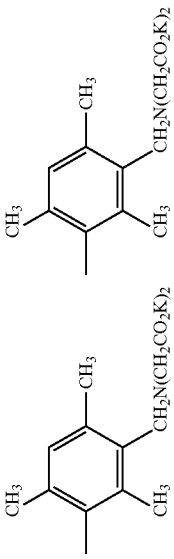 benzothiazole-2-yl | 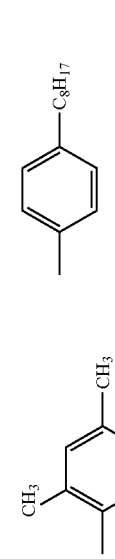 2,4,6-trimethyl-3-CH$_2$N(CH$_2$CO$_2$K)$_2$-phenyl | 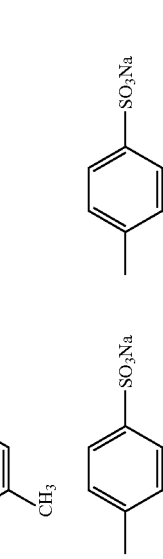 2,4,6-trimethyl-3-CH$_2$N(CH$_2$CO$_2$K)$_2$-phenyl |
| b-7 | CH$_3$ | CH$_3$ | H | 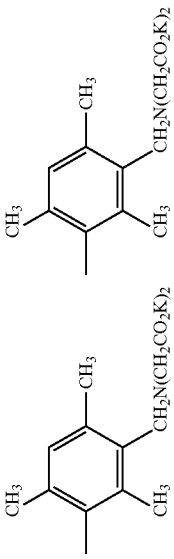 benzothiazole-2-yl | 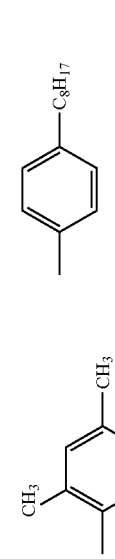 2,4,6-trimethylphenyl | 4-C$_8$H$_{17}$-phenyl |
| b-8 | CH$_3$ | H | SO$_2$CH$_3$ | | 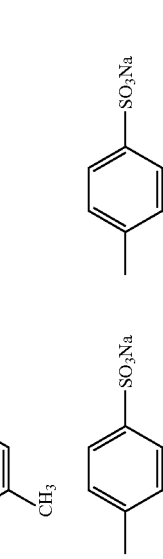 3-SO$_3$Na-4-methylphenyl | 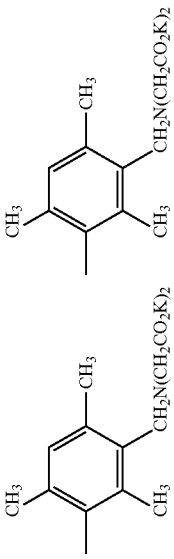 3-SO$_3$Na-4-methylphenyl |
| c-1 | —SCH$_3$ | CH$_3$ | CN | H | | 4-C$_8$H$_{17}$(t)-phenyl |
| c-2 | 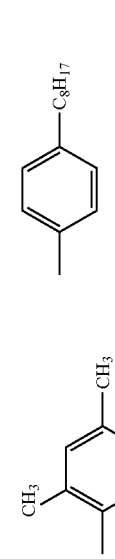 4-SO$_3$K-phenyl | H | CONH$_2$ | H | 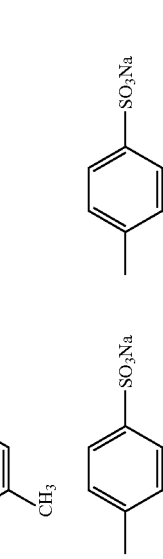 4-SO$_3$K-3-methylphenyl | 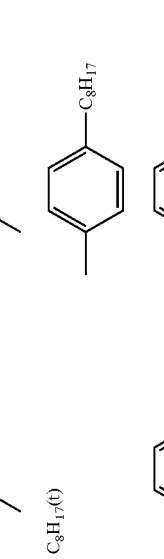 4-SO$_3$K-3-methylphenyl |
| c-3 | 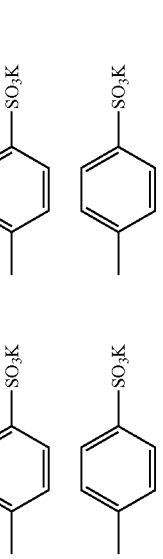 —CH$_2$CH$_2$SO$_3$K via S | CH$_3$ | H | 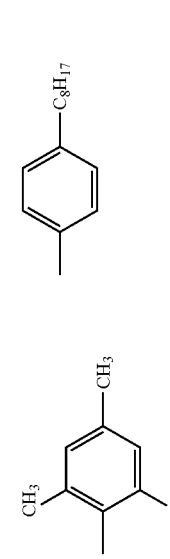 SO$_3$K-benzothiazole-2-yl |  4-SO$_3$K-3-methylphenyl | 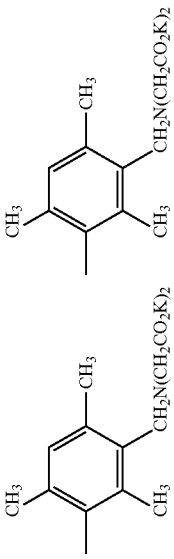 4-SO$_3$K-3-methylphenyl |
| c-4 | —CH$_3$ | CH$_3$ | H | 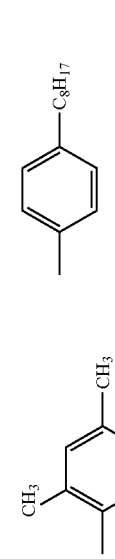 SO$_2$NH(CH$_2$)$_3$O-2,4-di-tert-amylphenyl benzothiazole | 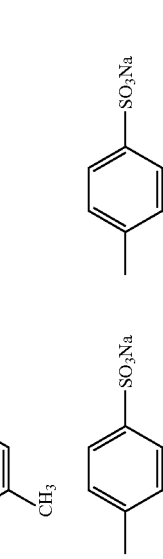 2,4,6-trimethylphenyl | 4-C$_8$H$_{17}$-phenyl |

-continued

| | | |
|---|---|---|
| c-5 | ![benzothiazole with NHSO2 substituent structure] H H | mesityl C8H17(t) |

General structure:

R², R³ on pyridine ring with R⁴R⁵N- and -NHR⁶ groups, connected via N=N azo linkage to thiadiazole bearing R¹.

| | R₁ | R₂ | R₃ | R₄ | R₅ | R₆ |
|---|---|---|---|---|---|---|
| d-1 | Me | CH₃ | CN | H | 4-(SO₃K)-phenyl | 4-(SO₃K)-phenyl |
| d-2 | Me | CH₃ | CN | H | 2,4-(C₂H₅)₂-mesityl | 2,4-(C₂H₅)₂-mesityl |
| d-3 | Me | H | H | 2-methylbenzothiazol-6-yl | 2,3,5-trimethyl-4-SO₃K-phenyl | 2,3,5-trimethyl-4-SO₃K-phenyl |
| d-4 | Ph | CH₃ | CONH₂ | H | 4-C₈H₁₇-phenyl | 4-C₈H₁₇-phenyl |

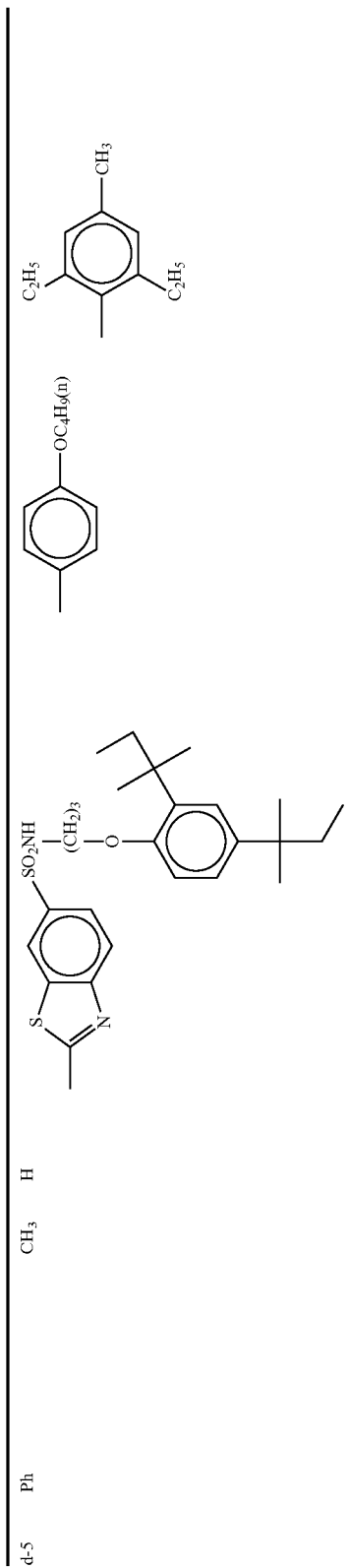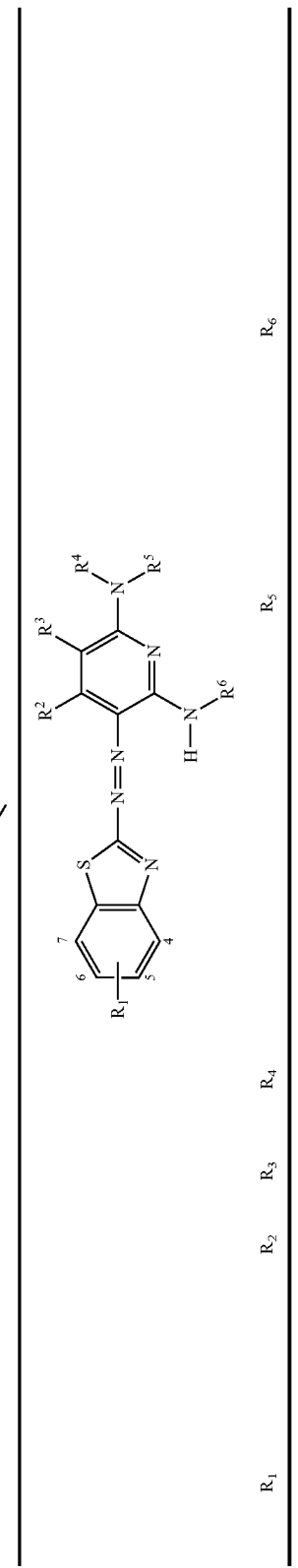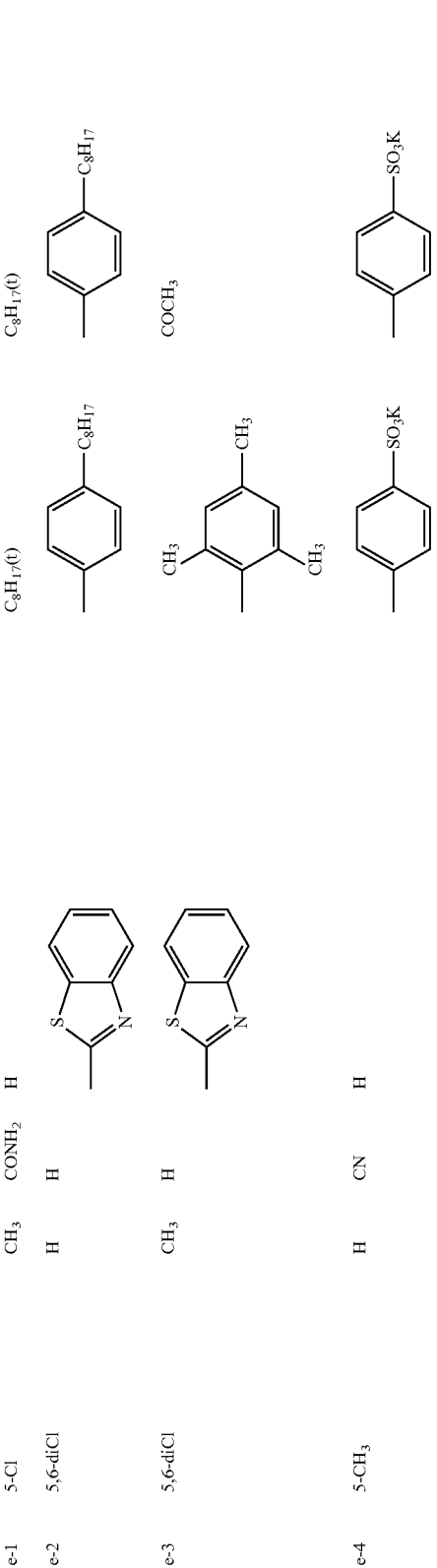

| | | | | | |
|---|---|---|---|---|---|
| e-5 | 5-NO$_2$ | CH$_3$ | H | SO$_2$CH$_3$ | 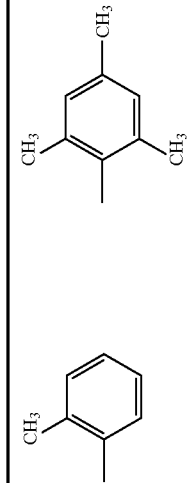 |
f-1 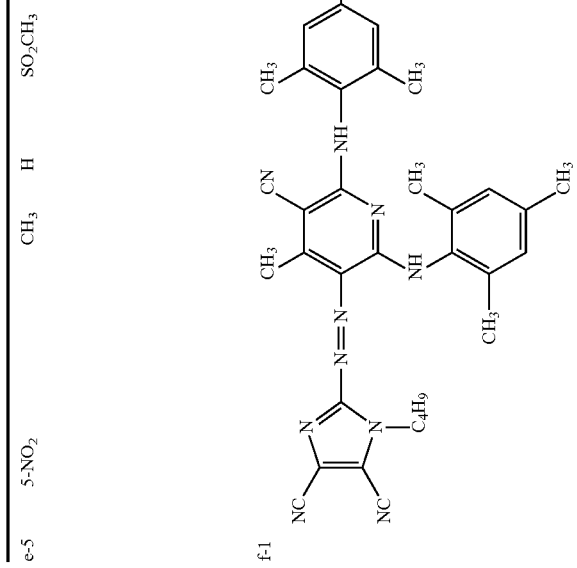
f-2 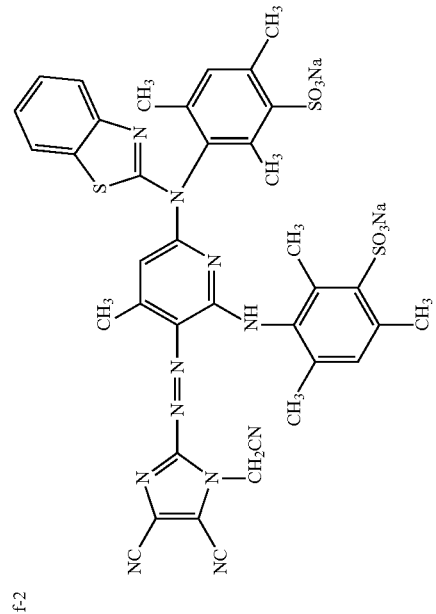

The dye represented by formula (1) is preferred as a yellow dye or a black short-wave dye (S). The preferred heteroaromatic group represented by $A_{11}$ and $B_{11}$ is selected from the substituents shown as substituents A and C in Tables 1 to 6.

The dyes of those formulae all are preferably a dye having an oxidation potential (Eox) of 1.0 V (vs SCE), more preferably 1.2 V (vs SCE).

In the ink of the present invention, other dyes may be used in combination with the black dye represented by formulae (1) to (7) for use in the present invention so as to adjust the color tone and gradation of a full color image. Examples of the dyes which can be used in combination include the following dyes. The dyes described below can also be used for each color ink combined with the black ink.

Examples of the yellow dye include aryl- or heteryl-azo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-base dyes such as naphthoquinone dye and anthraquinone dye. Other examples of the dye species include quinophthalone dye, nitro•nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Examples of the magenta dye include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo•thioindigo dyes. These dyes may be a dye which provides a cyan color for the first time when a part of the chromophore is dissociated. In this case, the counter cation may be an inorganic cation such as-alkali metal and ammonium, an organic cation such as pyridinium and quaternary ammonium salt, or a polymer cation having such a cation in a partial structure.

Black dyes such as polyazo dye may also be used.

Also, a water-soluble dye such as direct dye, acid dye, food dye, basic dye and reactive dye may be used in combination. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

A pigment may be also used in combination.

As the pigment which can be used in the ink of the present invention, commercially available pigments and known pigments described in various publications can be used. The publication includes *Color Index*, compiled by The Society of Dyers and Colourists, *Kaitei Shin Han Ganryo Binran (Revised New Handbook of Pigments)*, compiled by Nippon Ganryo Gijutsu Kyokai (1989), *Saishin Ganryo Oyo Gijutsu (Newest Pigment Application Technology)*, CMC Shuppan (1986), *Insatsu Ink Gijutsu (Printing Ink Technique)*, CMC Shuppan (1984), and W. Herbst and K. Hunger, *Industrial Organic Pigments*, VCH Verlagsgesellschaft (1993). Specific examples of the organic pigment include azo pigments (e.g., azo lake pigment, insoluble azo pigment, condensed azo pigment, chelate azo pigment), polycyclic pigments (e.g., phthalocyanine-base pigment, anthraquinone-base pigment, perylene-base or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acidic or basic dye) and azine pigments. Specific examples of the inorganic pigment include yellow pigments such as C.I. Pigment Yellow 34, 37, 42 and 53, red-type pigments such as C.I. Pigment Red 101 and 108, blue-type pigments such as C.I. Pigment Blue 27, 29 and 17:1, black-type pigments such as C.I. Pigment Black 7 and magnetite, and white-type pigments such as C.I. Pigment White 4, 6, 18 and 21.

The pigment having a color tone preferred for the formation of an image includes the followings. As the blue to cyan pigment, phthalocyanine pigments, anthraquinone-type indanthrone pigments (for example, C.I. Pigment Blue 60)

and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-base C.I. Pigment 93, 94, 95, 128 and 155, and benzimidazolone-base C.I. Pigment Yellow 120, 151, 154, 156 and 180, and among these, those not using a benzidine-base compound as a raw material are more preferred), isoindoline•isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The ink for use in the ink set of the present invention is described below except for the above-described coloring agent such as dye and pigment.

The surfactant which can be contained in the ink for use in the ink set of the present invention is described below.

In the present invention, a surfactant is incorporated into the ink to control the liquid properties of ink, whereby excellent effects can be provided, such as improvement of ejection stability of the ink, elevation of water resistance of the image and prevention of bleeding of the printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 15 weight %, preferably from 0.005 to 10 weight %, more preferably from 0.01 to 5 weight %, based on the ink.

The ink for use in the ink set of the present invention can be prepared by dissolving and/or dispersing the above-described dye and surfactant in an aqueous medium. The term "aqueous medium" as used in the present invention means water or a mixture of water and a slight amount of water-miscible organic solvent, where additives such as wetting agent, stabilizer and antiseptic are added, if desired.

In preparing the ink solution for use in the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various systems known in the art can be used, such as flow stirring and stirring utilizing the shearing force by means of a reversal agitator or a dissolver. Also, a stirring method utilizing the shearing force with the bottom surface of a container, such as magnetic stirrer, can be advantageously used.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In the case where the above-described dye is an oil-soluble dye, the ink solution can be prepared by dissolving the oil-soluble dye in a high boiling point organic solvent and emulsion-dispersing it in an aqueous medium.

The high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis(2,4-di-tert-amylphenyl)isophthalate, bis(1,1-diethylpropyl)phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid), alkylphosphoric acids (e.g., di-(2-ethylhexyl) phosphoric acid, diphenylphosphoric acid). The high boiling point organic solvent can be used in an amount of, in terms of the mass ratio to the oil-soluble dye, from 0.01 to 3 times, preferably from 0.01 to 1.0 times. When a high boiling solvent is present, the dye and other nonvolatile components are less precipitated at the dispersion in the ink, as a result, the stability of ink is improved and good ejection stability is attained.

These high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly (N-tert-butylacrylamide)].

Examples of the high boiling point organic solvent for use in the present invention, other than the above-described compounds, and/or the synthesis method of the high boiling organic solvent include those described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147009, 157147, 159573 and 225240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338. The high boiling point organic solvent is used in an amount of, in terms of the mass ratio to the oil-soluble dye, from 0.01 to 3.0 times, preferably from 0.01 to 1.0 times.

In the present invention, the oil-soluble dye or high boiling point organic solvent is used by emulsion-dispersing it in an aqueous medium. Depending on the case, a low boiling point organic solvent may also be used at the emulsion-dispersion in view of emulsifiability. The low boiling point organic solvent is an organic solvent having a boiling point of about 30 to 150° C. at atmospheric pressure. Preferred examples thereof include esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofurane, dioxane), however, the present invention is not limited thereto.

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, however, a so-called phase inversion emulsification method of adding dropwise an aqueous phase in an oil phase can also be preferably used. The above-described emulsification method can be applied also when the azo dye used in the present invention is water-soluble and the additives are oil-soluble.

In performing the emulsion-dispersion, various surfactants can be used. Preferred examples thereof include anionic surfactants such as fatty acid salt, alkylsulfuric ester salt, alkylbenzenesulfonate, alkyl-naphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can be used.

For the purpose of stabilizing the dispersion immediately after the emulsification, a water-soluble polymer may also be added in combination with the surfactant. As the water-soluble polymer, polyvinyl alcohol, polyvinylpyrrolidone, polyethylene oxide, polyacrylic acid, polyacrylamide, and copolymers thereof are preferably used. Furthermore, natural water-soluble polymers such as polysaccharides, casein and gelatin are also preferably used. In addition, for the stabilization of the dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains —$SO_3^-$ or —$COO^-$. In the case of using this polymer which does not substantially dissolve in an aqueous medium, the polymer is preferably used in an amount of 20 weight % or less, more preferably 10 weight % or less, based on the high boiling point organic solvent.

In preparing an aqueous ink by dispersing an oil-soluble dye or a high boiling point organic solvent according to emulsion-dispersion, control of the particle size is important. In order to elevate the color purity or density of an image formed by the inkjet recording, it is essential to reduce the average particle size. The average particle size is, in terms of the volume average particle size, preferably 1 µm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417–418. For example, the ink solution is diluted with distilled water such that the particle concentration in the ink becomes from 0.1 to 1 weight %, then, the particle size can be easily measured by a commercially available volume average particle size measuring apparatus (for example, Microtrac UPA, manufactured by Nikkiso K.K.). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles with the volume of the particle and dividing the sum total of the obtained values by the total volume of the particles. The volume average particle size is described in Soichi Muroi, *Kobunshi Latex no Kagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about failure or slippage in the ejection of ink and this seriously affects the printing performance. In order to prevent these troubles, it is important to reduce the number of particles having a particle size of 5 µm or more to 10 or less and the number of particles having a particle size of 1 µm or more to 100 or less, in 1 µl of ink prepared.

For removing these coarse particles, a known method such as centrifugal separation or microfiltration can be used. This separation step may be performed immediately after the emulsion-dispersion or may be performed immediately before the filling in an ink cartridge after various additives such as wetting agent and surfactant are added to the emulsified dispersion.

A mechanically emulsifying apparatus is effective for reducing the average particle size and eliminating coarse particles.

As the emulsifying apparatus, known apparatuses such as simple stirrer, impeller stirring system, in-line stirring system, mill system (e.g., colloid mill) and ultrasonic system can be used, however, a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A.P. V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more-preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus and after adding additives such as wetting agent and surfactant, again passing the dispersion through a high-pressure homogenizer during the time of filling the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of solvent. Examples of the method include evaporation, vacuum evaporation and ultrafiltration. This removal of the low boiling point organic solvent is preferably performed as soon as possible immediately after the emulsification.

The preparation method of the inkjet ink is described in detail in JP-A-5-148436, JP-A-5-295312, JP-A-7-97541, JP-A-7-82515 and JP-A-7-118584 and the methods described in these patent publications can be utilized also in the preparation of ink used in the inkjet ink set of the present invention.

In the inkjet recording ink for use in the ink set of the present invention, additives such as drying inhibitor for preventing clogging due to drying of ink at the ejection port, permeation accelerator for attaining more successful permeation of ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent, can be appropriately selected and used in an appropriate amount.

The drying inhibitor is preferably a water-soluble organic solvent having a vapor pressure lower than water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl (or ethyl) ether, diethylene glycol monomethyl (or ethyl) ether and triethylene glycol monoethyl (or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 weight %.

Examples of the permeation accelerator include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 weight % of the permeation accelerator to the ink. The permeation accelerator is preferably used in an amount of causing no bleeding of printed letter or no print through.

In the ink for the ink set used in the present invention, an ultraviolet absorbent may be used for improving the preservability of image and examples of the ultraviolet absorbent which can be used include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure* No. 24239, and compounds of absorbing ultraviolet light and emitting fluorescent light, so-called fluorescent brightening agents, represented by stilbene-base compounds and benzoxazole-base compounds.

As the antioxidant which is used for improving the preservability of image, various organic discoloration inhibitors and metal complex-base discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide for use in the ink include sodium dehydroacetate, sodium benzoate, sodium pyridine-thione-1-oxide, ethyl p-hydroxybenzoate, 1,2-benziso-thiazolin-3-one and salts thereof. The fungicide is preferably used in the ink in an amount of 0.02 to 5.00 weight %.

The fungicide is described in detail in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammon thioglycolate, diisopropyl-ammonium nitrite, pentaerythritol tetranitrate, dicyclohexylammonium nitrite and benzotriazole. The rust inhibitor is preferably used in the ink in an amount of 0.02 to 5.00 weight %.

The pH adjusting agent added to the ink for the ink set of the present invention is suitably used for adjusting the pH and imparting dispersion stability. The pH of the ink is preferably adjusted to 4 to 11 at 25° C. If the pH is less than 4, the solubility of dye decreases to readily cause clogging of a nozzle, whereas if it exceeds 11, the water resistance is liable to deteriorate. Examples of the pH adjusting agent include, as basic one, organic bases and inorganic alkalis, and as acidic one, organic acids and inorganic acids.

Examples of the basic compound which can be used include inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate and sodium monohydrogenphosphate; and organic bases such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine.

Examples of the acidic compound which can be used include inorganic compounds such as hydrochloric acid, sulfuric acid, phosphoric acid, sodium hydrogensulfate, potassium hydrogensulfate, potassium dihydrogenphosphate and sodium dihydrogenphosphate; and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid and quinolinic acid.

Each constituent ink of the ink set preferably has a conductivity of 0.01 to 10 S/m. The conductivity is more preferably from 0.05 to 5 S/m.

The conductivity can be measured by an electrode method using a commercially available saturated potassium chloride.

The conductivity can be controlled mainly by the ion concentration in an aqueous solution. In the case where the salt concentration is high, desalting can be performed using ultrafiltration membrane or the like. Also, in the case of controlling the conductivity by adding a salt or the like, the conductivity can be controlled by adding various organic or inorganic salts.

Examples of the inorganic salt which can be used include inorganic compounds such as potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate. Also, organic compounds such as sodium acetate, potassium acetate, potassium tartrate, sodium tartrate, sodium benzoate, potassium benzoate, sodium p-toluenesulfonate, potassium saccharinate, potassium phthalate and sodium picolinate can be used.

The conductivity can also be controlled by selecting the components of the aqueous medium which is described later.

The ink of the present invention preferably has a viscosity at 25° C. of 1 to 20 mPa·s, more preferably from 2 to 15 mPa·s, still more preferably from 2 to 10 mPa·s. If the viscosity exceeds 30 mPa·s, the fixing rate of the recorded image decreases and the ejection performance also decreases, whereas if it is less than 1 mPa·s, the recorded image is blurred and therefore, decreased in the grade.

The viscosity can be freely adjusted by the amount of the ink solvent added. Examples of the ink solvent include glycerin, diethylene glycol, triethanolamine, 2-pyrrolidone, diethylene glycol monobutyl ether and triethylene glycol monobutyl ether.

A viscosity adjusting agent may also be used. Examples of the viscosity adjusting agent include celluloses, water-soluble polymers such as polyvinyl alcohol, and nonionic surfactants. The viscosity adjusting agent is described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*)—*Zairyo no Kaihatsu Doko•Tenbo Chosa*—(*Chemicals for Inkjet Printer (Enlarged Edition of* 98)—*Survey on Tendency•Prospect of Development of Materials*—), pp. 162–174, CMC (1997).

The method for measuring the viscosity of liquid is described in detail in JIS Z8803 but the viscosity can be simply and easily measured by a commercially available viscometer and examples of the rotational viscometer include B-type viscometer and E-type viscometer, manufactured by Tokyo Keiki Co. In the present invention, the viscosity is measured at 25° C. using a vibrating viscometer Model VM-100A-L manufactured by Yamaichi Denki. The unit of viscosity is pascal second (Pa·s) but usually, millipascal second (mPa·s) is used.

Whichever dynamic surface tension or static surface tension is used, the surface tension of the ink for use in the present invention is preferably from 20 to 50 mN/m, more preferably from 20 to 40 mN/m, at 25° C. If the surface tension exceeds 50 mN/m, ejection stability and printing quality are seriously deteriorated, for example, bleeding at color mixing or feathering is caused, whereas if the surface tension of ink is less than 20 mN/m, printing failure may occur due to, for example, attachment of ink to the hard surface at the ejection.

For the purpose of adjusting the surface tension, a cationic, anionic or nonionic surfactant of various types can be added. The surfactant is preferably used in the range from 0.01 to 20 weight %, more preferably from 0.1 to 10 weight %, based on the inkjet ink. The surfactants can be used in combination of two or more thereof.

As the method for measuring the static surface tension, a capillary elevation method, a dropping method, a suspended ring method and the like are known. In the present invention, a vertical plate method is used as the method for measuring the static surface tension.

When a glass or platinum thin plate is vertically hung while dipping a part of the plate in a liquid, a surface tension of the liquid acts downward along the length of contact between the liquid and the plate. This force is balanced with an upward force and thereby, the surface tension can be measured.

As the method for measuring the dynamic surface tension, a vibrating jet method, a meniscus dropping method, a maximum bubble pressure method and the like are known as described, for example, in *Shin Jikken Kagaku Koza, Kaimen to Colloid* (*New Lecture of Experimental Chemistry, Interface and Colloid*), Vol. 18, pp. 69–90, Maruzen (1977). Furthermore, a liquid film rupturing method described in JP-A-3-2064 is known. In the present invention, a differential bubble pressure method is used as the method for measuring the dynamic surface tension. The principle and method of the measurement are described below.

When a bubble is produced in a solution rendered uniform by stirring, a gas-liquid interface is newly produced and surfactant molecules in the solution gather to the water surface at a constant speed. When the bubble rate (bubble production rate) is changed, as the production rate decreases, a larger number of surfactant molecules gather to the bubble surface. Therefore, the maximum bubble pressure immediately before the bubble bursts becomes small and the maximum bubble pressure (surface tension) for the bubble rate can be detected. The dynamic surface tension is preferably measured by a method of producing a bubble in a solution using large and small two probes, measuring the differential pressure in the maximum bubble pressure state between two probes, and calculating the dynamic surface tension.

In view of ejection stability of ink, quality of printed image, various fastnesses of image and reduction in blurring of image after printing or in stickiness on the printed surface, the nonvolatile component in the ink for use in the present invention is preferably from 10 to 70 weight % based on the entire amount of the ink. In view of ejection stability of ink and reduction in blurring of image after printing, the nonvolatile component is more preferably from 20 to 60 weight %.

The nonvolatile component as used herein means a liquid or solid component having a boiling point of 150° C. or more at 1 atm or a high molecular weight component. The nonvolatile component in the inkjet ink includes a dye and a high boiling point solvent and also includes a polymer latex, a surfactant, a dye stabilizer, a fungicide and a buffering agent which are added, if desired. Many of these nonvolatile components except for the dye stabilizer reduce the dispersion stability of ink and even after printing, remain on the inkjet image-receiving paper to inhibit the aggregation and in turn stabilization of dye on the image-receiving paper and worsen various fastnesses of the image area or blurring of the image under high humidity condition.

In the present invention, a high molecular weight compound may also be contained. The high molecular weight compound as used herein means all polymer compounds having a number average molecular weight of 5,000 or more contained in the ink. Examples of the polymer compound include a water-soluble polymer compound which substantially dissolves in an aqueous medium, a water-dispersible polymer compound such as polymer latex and polymer emulsion, and an alcohol-soluble polymer compound which dissolves in a polyhydric alcohol used as an auxiliary solvent, however, the high molecular weight compound as used in the present invention includes any polymer compound which substantially dissolves or disperses uniformly in the ink solution.

Specific examples of the water-soluble polymer compound include water-soluble polymers such as polyvinyl alcohol, silanol-modified polyvinyl alcohol, carboxymethyl cellulose, hydroxyethyl cellulose, polyvinylpyrrolidone, polyalkylene oxide (e.g., polyethylene oxide, polypropylene oxide) and polyalkylene oxide derivatives; natural water-soluble polymers such as polysaccharides, starch, cationized starch, casein and gelatin; aqueous acrylic resins such as polyacrylic acid, polyacrylamide and copolymers thereof; aqueous alkyd resin; and water-soluble polymer compounds having a $-SO_3^-$ or $-COO^-$ group within the molecule and substantially dissolving in an aqueous medium.

Specific examples of the polymer latex include a styrene-butadiene latex, a styrene-acryl latex and a polyurethane latex, and specific examples of the polymer emulsion include an acryl emulsion.

These water-soluble polymer compounds can be used individually or in combination of two or more thereof.

As described above, the water-soluble polymer compound is used as the viscosity adjusting agent so as to adjust the viscosity of ink to a viscosity region of giving good ejection property, however, if the amount of the water-soluble polymer compound added is large, the viscosity of ink increases to reduce the ejection stability of ink solution and after aging of ink, the nozzle is readily clogged by the precipitate.

The amount added of the polymer compound as the viscosity adjusting agent varies depending on the molecular weight of the compound added (as the molecular weight is higher, the amount added can be smaller), but the amount added is from 0 to 5 weight %, preferably from 0 to 3 weight %, more preferably from 0 to 1 weight %, based on the entire amount of ink.

In the present invention, apart from the above-described surfactants, a nonionic, cationic or anionic surfactant is used as the surface tension adjusting agent. Examples of the anionic surfactant include a fatty acid salt, an alkylsulfuric ester salt, an alkylbenzenesulfonate, an alkylnaphthalenesulfonate, a dialkylsulfosuccinate, an alkylphosphoric ester salt, a naphthalenesulfonic acid formalin condensate and a polyoxyethylenealkylsulfuric ester salt. Examples of the nonionic surfactant include a polyoxyethylene alkyl ether, a polyoxyethylene alkylallyl ether, a polyoxyethylene fatty acid ester, a sorbitan fatty acid ester, a polyoxyethylene sorbitan fatty acid ester, a polyoxyethylene alkylamine, a glycerin fatty acid ester and an oxyethylene oxypropylene block copolymer. Also, SURFYNOLS (produced by Air Products & Chemicals), which is an acetylene-base polyoxyethylene oxide surfactant, is preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can be used.

The surface tension of the ink of the present invention is, with or without use of such a surfactant, preferably from 20 to 60 mN/m, more preferably from 25 to 45 mN/m.

In the present invention, if desired, various cationic, anionic or nonionic surfactants described above may be used as a dispersant or a dispersion stabilizer, and a fluorine- or silicone-base compound or a chelating agent represented by EDTA may be used as a defoaming agent.

The recording paper and recording film used in the inkjet recording to which the present invention is applied are described below. The support which can be used for the recording paper or film is produced, for example, from a chemical pulp such as LBKP and NBKP, a mechanical pulp such as GP, PGW, RMP, TMP, CTMP, CMP and CGP, a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film may be used. The thickness of the support is preferably from 10 to 250 μm and the basis weight is preferably from 10 to 250 g/m$^2$.

An image-receiving layer and a backcoat layer may be provided on the support as it is to produce an image-receiving material for the ink of the present invention, or after providing a size press or anchor coat layer using starch, polyvinyl alcohol or the like, an image-receiving layer and a backcoat layer may be provided to produce an image-receiving material. The support may be further subjected to a flattening treatment by a calendering device such as machine calender, TG calender and soft calender.

The support is preferably paper or plastic film of which both surfaces are laminated with polyolefin (for example, polyethylene, polystyrene, polybutene or a copolymer thereof) or polyethylene terephthalate. In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production method (gas phase method) or a silicic acid hydrate obtained by a wet production method.

Specific examples of the recording paper containing the pigment in the image-receiving layer include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivatives, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and peeling resistance of the ink-accepting layer.

The image-receiving layer may contain a mordant, a water-proofing agent, a light fastness enhancer, a gas resistance enhancer, a surfactant, a hardening agent and other additives in addition to the pigment and the aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallyl-ammonium chloride and cation polyacrylamide. The content of the cationic resin is preferably from 1 to 15 weight %, more preferably from 3 to 10 weight %, based on the entire solid content of the ink-accepting layer.

Examples of the light fastness enhancer and the gas resistance enhancer include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids, benzotriazole compounds, benzophenone compounds, triazine compounds, heterocyclic compounds, water-soluble metal salts, organic metal compounds and metal complexes.

Specific examples of these compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surfactant functions as a coating aid, a releasability improver, a slipperiness improver or an antistatic agent. The surfactant is described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, for example, the materials described in JP-A-1-161236 (page 222), JP-A-9-263036, JP-A-10-119423 and JP-A-2001-310547 can be used.

Other examples of the additive added to the image-receiving layer include a pigment dispersant, a thickener, a defoaming agent, a dye, a fluorescent brightening agent, an antiseptic, a pH adjusting agent, a matting agent and a hardening agent. The ink-accepting layer may be composed of one layer or two layers.

In the recording paper or film, a backcoat layer may also be provided. Examples of the component which can be added to this layer include a white pigment, an aqueous binder and other components.

Examples of the white pigment contained in the backcoat layer include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing dimension and preventing curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The ink set of the present invention is not limited in the inkjet recording system to which the ink set is applied, and is used in a known system, for example, an electric charge controlling system of jetting out the ink by utilizing the electrostatic induction force, a drop-on-demand system (pressure pulse system) utilizing an oscillation pressure of a piezoelectric device, an acoustic inkjet system of converting electric signals into acoustic beams, irradiating the beams on the ink and jetting out the ink using the radiation pressure, and a thermal inkjet (BUBBLE JET: registered trademark) system of heating the ink to form a bubble and utilizing the generated pressure.

The inkjet recording system includes a system of ejecting a large number of small-volume ink droplets of so-called photo ink having a low concentration, a system of improving the image quality by using a plurality of inks having substantially the same color hue but differing in the concentration, and a system using a colorless transparent ink The inkjet recording ink of the present invention can be used for uses other than the inkjet recording, such as a material for display image, an image-forming material for interior decoration and an image-forming material for outdoor decoration.

Examples of the material for display image include various materials such as poster, wall paper, ornamental goods (e.g., ornament, doll), handbill for commercial advertisement, wrapping paper, wrapping material, paper bag, vinyl bag, package material, billboard, image drawn on or attached to the side face of traffic (e.g., automobile, bus, electric car), and clothing with a logo. In the case of using the dye of the present invention as a material for forming a display image, the image includes, in addition to a strict image, all patterns by a dye, which can be acknowledged by a human, such as abstract design, letter and geometrical pattern.

Examples of the material for interior decoration include various materials such as wall paper, ornamental goods (e.g., ornament, doll), luminaire member, furniture member and design member of floor or ceiling. In the case of using the dye of the present invention as a material for forming an image, the image includes, in addition to a strict image, all patterns by a dye, which can be acknowledged by a human, such as abstract design, letter and geometrical pattern.

Examples of the material for outdoor decoration include various materials such as wall material, roofing material, billboard, gardening material, outdoor ornamental goods (e.g., ornament, doll) and outdoor luminaire member. In the case of using the dye of the present invention as a material for forming an image, the image includes, in addition to a strict image, all patterns by a dye, which can be acknowledged by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a dye in the form of a reactive dye having introduced thereinto a reactive group. Among these, preferred is dyeing by mordanting.

In the production of ink, sonic vibrations may be added, for example, in the step of dissolving additives such as dye.

The sonic vibration is added so as to prevent the ink from generation of bubbles due to a pressure applied in the recording head. More specifically, a sonic energy equal to or greater than the energy imposed in the recording head is previously applied in the process of producing the ink to eliminate the bubbles.

The sonic vibration is usually an ultrasonic wave having a frequency of 20 kHz or more, preferably 40 kHz or more, more preferably 50 kHz or more. The energy added to liquid by the sonic vibration is usually $2\times10^7$ J/m$^3$ or more, preferably $5\times10^7$ J/m$^3$ or more, more preferably $1\times10^8$ J/m$^3$ or more. The time period where the sonic vibration is applied is usually on the order from 10 minutes to one hour.

No matter when the step of adding sonic vibrations is performed, the effect can be attained as long as it is performed after the dye is charged into a medium. The effect is also provided even by adding sonic vibrations after the finished ink is once stored. However, the sonic vibration is preferably added at the time of dissolving and/or dispersing the dye in a medium, because the effect of removing bubbles is large and the dissolution and/or dispersion of a dye in a medium is accelerated by the sonic vibration.

That is, the step of adding at least sonic vibrations can be performed during or after the step of dissolving and/or dispersing the dye in a medium. In other words, the step of adding at least sonic vibrations can be optionally performed once or more after the preparation of ink until the ink is finished as a product.

In a practical mode, the step of dissolving and/or dispersing the dye in a medium preferably comprises a step of dissolving the dye in a partial medium out of the entire medium and a step of mixing the remaining medium. The sonic vibration is preferably added at least in either one of these steps, more preferably in the step of dissolving the dye in a partial medium out of the entire medium.

The step of mixing the remaining solvent may be a single step or a multiple step.

In the production of ink of the present invention, a degassing step under heating or reduced pressure is preferably used in combination, because the effect of removing bubbles in ink is enhanced. The degassing step under heating or reduced pressure is preferably performed simultaneously with or after the step of mixing the remaining medium.

Examples of the sonic vibration-generating means for use in the step of adding sonic vibrations include known devices such as ultrasonic disperser.

In the production of the ink of the present invention, the step of removing dusts as a solid content by filtration, which is performed after the preparation of ink solution, is important. This operation is performed using a filtration filter and the filtration filter used here is a filter having an effective size of 1 µm or less, preferably from 0.05 to 0.3 µm, more preferably from 0.25 to 0.3 µm. For the construction material of the filter, various materials can be used, however, in the case of an ink using a water-soluble dye, a filter produced for aqueous solvents is preferably used. In particular, a filter made of a polymer material, which less generates wastes, is preferred. The filtration may be performed by feeding and passing the solution through a filter and may be performed either under pressure or under reduced pressure.

After the filtration, air is often taken in into the solution. Bubbles ascribable to this air give rise to the disorder of image in the inkjet recording in many cases and therefore, a defoaming step is preferably provided separately. For the defoaming, the solution after filtration may be allowed to stand or various methods such as ultrasonic defoaming or reduced-pressure defoaming using a commercially available device may be used. In the case of defoaming by an ultrasonic wave, the defoaming operation is preferably performed for 30 seconds to 2 hours, more preferably on the order from 5 minutes to one hour.

This operation is preferably performed using a space such as clean room or clean bench so as to prevent mingling of dusts at the operation. In the present invention, this operation is preferably performed in a space having a cleanness degree of class 1,000 or less. The "cleanness degree" as used herein means a value measured by a dust counter.

In the present invention, the hitting volume of ink on a recording material is from 0.1 to 100 pl, preferably from 0.5 to 50 pl, more preferably from 2 to 50 pl.

The present invention is not limited in the inkjet recording system and is used for a known system, for example, an electric charge controlling system of jetting out the ink by using the electrostatic induction force, a drop-on-demand system (pressure pulse system) of using an oscillation pressure of a piezoelectric element, an acoustic inkjet system of converting electric signals into acoustic beams, irradiating the beams on the ink and jetting out the ink using the radiation pressure, and a thermal inkjet (BUBBLE JET: registered trademark) system of heating the ink to form a bubble and utilizing the generated pressure.

The inkjet recording system includes a system of ejecting a large number of small-volume ink droplets of so-called photo ink having a low concentration, a system of improving the image quality by using a plurality of inks having substantially the same color hue but differing in the concentration, and a system using a colorless transparent ink. The hitting volume of ink is controlled mainly by the printer head.

For example, in the case of a thermal inkjet system, the hitting volume can be controlled by the structure of printer head. That is, the ink can be hit in a desired size by changing the ink chamber, heating section and nozzle size. Also, even in the thermal inkjet system, the ink can be hit in a plurality of sizes by providing a plurality of printer heads differing in the heating section or nozzle size.

In the case of a drop-on-demand system using a piezoelectric element, the hitting volume can be changed by the structure of printer head similarly to the thermal inkjet system, however, by controlling the waveform of driving signals for driving the piezoelectric element, the ink can be hit in a plurality of sizes using printer heads having the same structure, as described later.

In the present invention, the ejection frequency on hitting the ink on a recording material is 1 KHz or more.

In order to record a high-quality image like a photograph, the hitting density must be 600 dpi (number of dots per inch) or more and with this hitting density, an image having high sharpness can be reproduced by small ink droplets.

In hitting an ink by a head having a plurality of nozzles, the number of heads which can be driven at the same time is restricted, that is, from a few tens to about 200 in the case of a type where a recording paper and a head are moved in the directions orthogonal to each other, and a few hundreds even in the case of a type called line head where the head is fixed. This is because the driving electric power is limited or due to the effect of heat generated in the head on the image, a large number of head nozzles cannot be simultaneously driven.

By increasing the driving frequency, the recording speed can be increased.

The hitting frequency can be controlled, in the case of a thermal inkjet system, by controlling the frequency of head-driving signal for heating the head.

In the case of a piezoelectric system, the hitting frequency can be controlled by controlling the frequency of signal for driving the piezoelectric element.

The driving of piezoelectric head is described. The hitting size, hitting speed and hitting frequency are determined in a printer control section based on the signal of an image to be printed, and a signal for driving a printer head is prepared. The driving signal is supplied to the printer head. The hitting size, hitting speed and hitting frequency are controlled by the signal for driving the piezoelectric element. Here, the hitting size and hitting speed are determined by the shape and amplitude of the driving waveform, and the frequency is determined by the cycle period of signal.

When the hitting frequency is set to 10 KHz, the head is driven every 100 micro-seconds and one-line recording is completed in 400 micro-seconds. When the travelling speed of recording paper is set such that the recording paper moves 1/600 inch, namely, about 42 micron per 400 micro-seconds, the printing can be attained at a speed of one sheet per 1.2 seconds.

With respect to the constitution of printing apparatus or printer used in practicing the present invention, the form disclosed, for example, in JP-A-11-170527 is suitably used. With respect to the ink cartridge, the form disclosed, for example, in JP-A-5-229133is suitably used. With respect to the suction and the constitution of cap or the like covering the printing head 28 at the suction, those disclosed, for example, in JP-A-7-276671 are suitably used. In the vicinity of head, a filter for eliminating bubbles, disclosed in JP-A-9-277552, is suitably provided.

Also, the surface of nozzle is suitably subjected to a water repellent treatment described in Japanese Patent Application No. 2001-016738. The present invention may be used for a printer connected to a computer or for an apparatus specialized for the printing of a photograph.

In the inkjet recording method of the present invention, the composition of inkjet recording ink is preferably hit on a recording material at an average hitting speed of 2 m/sec or more, more preferably 5 m/sec or more.

The hitting speed is controlled by controlling the shape and amplitude of the waveform for driving the head.

Furthermore, by using a plurality of driving waveforms and selecting appropriate waveforms, the ink composition can be hit in a plurality of sizes with the same printer head.

EXAMPLES

The present invention is described below by referring to Examples, however, the present invention is not limited thereto.

Example

<Preparation of Ink Sample>

Ultrapure water (resistance: 18 MΩ or more) was added to the following components to make 1 liter and the resulting solution was stirred for 1 hour under heating at 30 to 40° C. Thereafter, the solution was filtered under reduced pressure through a microfilter having an average pore size of 0.25 μm to prepare Black Ink Solution Bk-101.

[Formulation of Black Ink Bk-101]

(Solid Contents)

| Black Dye (BL-1) (L: long-wave side) of the present invention | 75 g/liter |
| Black Dye (BS-1) (S: short-wave side) of the present invention | 30 g/liter |
| Proxel (2-benzisothiazolin-3-one) | 5 g/liter |
| Urea | 10 g/liter |
| Benzotriazole | 3 g/liter |

(Liquid Components)

| Diethylene glycol monobutyl ether (DGB) | 120 g/liter |
| Glycerin (GR) | 125 g/liter |
| Diethylene glycol (DEG) | 100 g/liter |
| 2-Pyrrolidone | 35 g/liter |
| Triethanolamine (TEA) | 8 g/liter |
| Surfynol STG (SW) | 10 g/liter |

The black dyes (L: BL-1 and S: BS-1) used here each had an oxidation potential (Eox) of 1.0 V (vs SCE) or more.

More specifically, the oxidation potential of BL-1 was 3 V vs SCE.

The absorption maximum (λmax) of BL-1 was 590 nm and the half-value width was 115 nm.

With respect to the discoloration rate constant ratio R of Ink Bk-101, $K_R$: 0.0011 (hr$^{-1}$),
$K_G$: 0.00099 (hr$^{-1}$) and
$K_B$: 0.0011 (hr$^{-1}$), therefore, the discoloration rate constant ratio is calculated as follows:

$$R = K_R/K_G = 1.11 < 1.2.$$

BL-1:

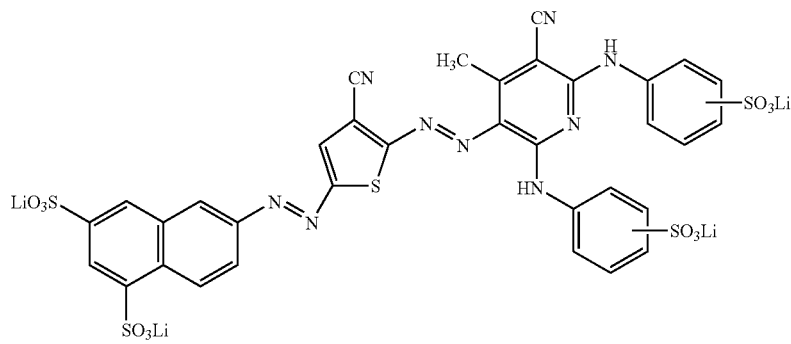

BS-1:

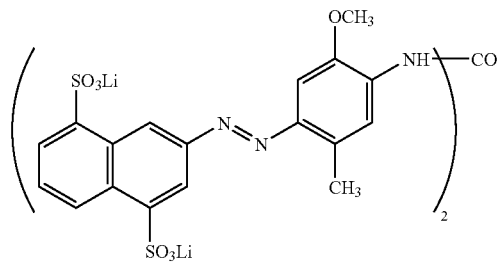

Also, black inks were prepared in the same manner using other dyes BL-2 and BS-2 of the present invention and the following three dyes A, B and C as comparative dyes (the additive composition was the same).

1) A long-wave black dye (A) having an oxidation potential (Eox) of 1.0 V (vs SCE) or less.
2) A long-wave black dye (B) having a half-value width of 100 nm or less in the spectrum of a standardized dilute solution and having an oxidation potential of 1.0 V (vs SCE) or less.
3) A short-wave black dye (C) having an oxidation potential (Eox) of 1.0 V (vs SCE) or less.

Here, the oxidation potential of BL-2 was 1.3 V vs SCE.

The absorption maximum ($\lambda$max) of BL-2 was 595 nm and the half-value width was 120 nm.

A

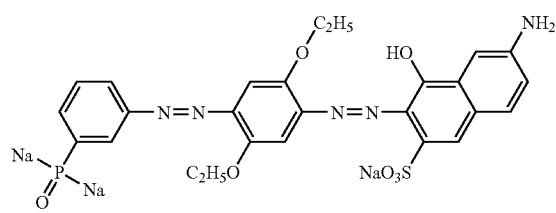

B

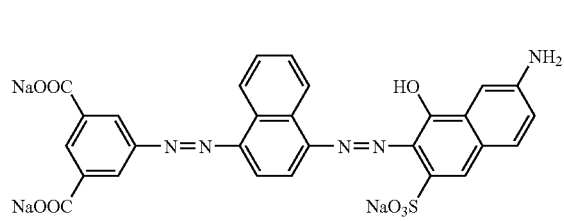

C

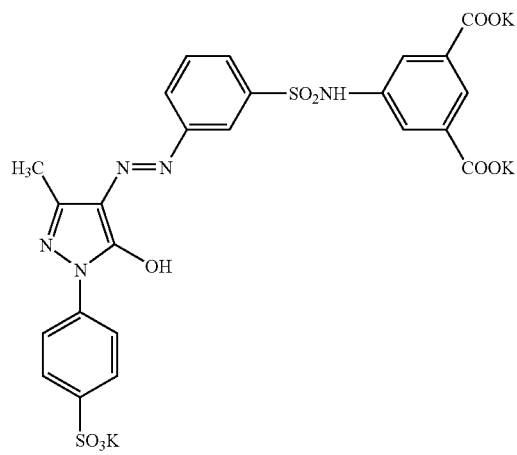

BL-2

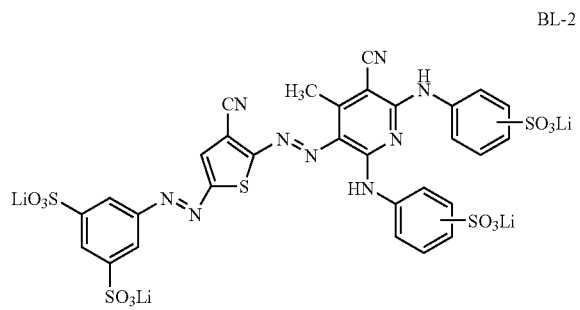

BS-2

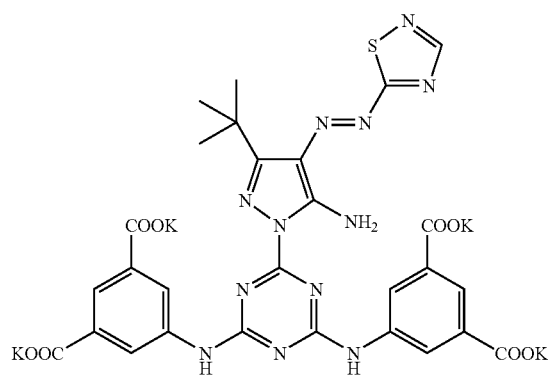

-continued

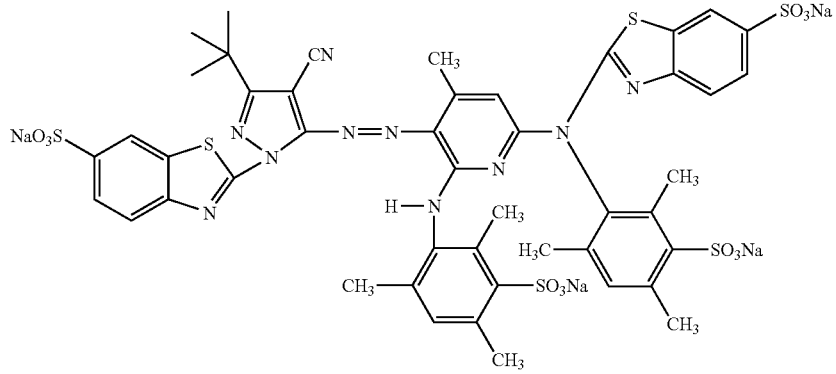

a-36

As an ink of comparative type, a black ink cartridge for PM-950C manufactured by Seiko Epson Corp. was used.

By using these dyes, black inks shown in Table 31 below were produced.

TABLE 31

| No. | Black Dye |
| --- | --- |
| PM-950C (Bk) (Reference Example) | — |
| Bk-101 (Invention) | BL-1, BS-1 |
| Bk-102 (Comparative Example) | A, C |
| Bk-103 (Comparative Example) | B, C |
| Bk-104 (Comparative Example) | B, BS-1 |
| Bk-105 (Invention) | BL-2, BS-1 |
| Bk-106 (Invention) | BL-1, BS-1 Magenta Dye (a-36) 10 g/liter Cyan Dye (154) 10 g/liter |
| Bk-107 (Invention) | BL-2, BS-2 |

The oxidation potential and the half-value width of the spectral absorption spectrum in an aqueous solution, of each long-wave dye used in Ink Samples Bk-101 to Bk-107, and the enforced discoloration rate constant $K_{vis}$ and the discoloration rate ratio R, of each of Ink Samples Bk-101 to Bk-107, are shown in Tables 32 and 33 below.

TABLE 32

| Dye | Oxidation Potential (V vs SCE) | Half-Value Width (nm) |
| --- | --- | --- |
| BL-1 | 1.32 | 105 |
| BL-2 | 1.34 | 110 |
| BS-1 | 1.21 | 92 |
| BS-2 | 1.26 | 98 |
| Dye A | 0.92 | 115 |
| Dye B | 0.94 | 120 |
| Dye C | 1.09 | 90 |

TABLE 33

| Ink Sample | $D_{vis}$ (hr$^{-1}$) | R |
| --- | --- | --- |
| Bk-101 | 0.021 | 1.05 |
| Bk-102 | 0.13 | 1.38 |
| Bk-103 | 0.21 | 1.41 |
| Bk-104 | 0.17 | 1.36 |
| Bk-105 | 0.018 | 1.07 |

TABLE 33-continued

| Ink Sample | $D_{vis}$ (hr$^{-1}$) | R |
| --- | --- | --- |
| Bk-106 | 0.015 | 1.02 |
| Bk-107 | 0.017 | 1.04 |

<Method for Characteristic Test of Dye and Ink>

The dyes used and the inks prepared each was subjected to characteristic tests by the following methods.

(1) Measurement of Oxidation-Reduction Potential

The oxidation potential of dye was measured in N,N-dimethylformamide (concentration of dye: $1 \times 10^{-3}$ mol·dm$^{-3}$) containing 0.1 mol·dm$^{-3}$ of tetrapropylammonium perchlorate as the supporting electrolyte by using SCE (saturated calomel electrode) as the reference electrode, a graphite electrode as the working electrode and a platinum electrode as the counter electrode.

(2) Enforced Discoloration Rate Constant ($K_{vis}$)

A black square symbol of JIS code 2223 was printed in a 48-point size on a recording paper by using the test ink and the visual reflection density ($D_{vis}$) of the printed part was measured by X-Rite Densitometer which is a reflection densitometer having mounted thereon a visual spectral distribution modulation filter, thereby determining the initial density. This printed matter was enforcedly discolored by using an ozone discoloration tester capable of always generating 5 ppm of ozone, which is described later in the item of ozone discoloration test, and the enforced discoloration rate constant ($k_{vis}$) was determined according the relational formula "$0.8=\exp(-k_{vis} \cdot t)$" from the time (t) until the reflection density ($D_{vis}$) decreases to 80% of the initial reflection density value.

(3) Enforced Discoloration Rate Constant Ratio (R)

A black square symbol of JIS code 2223 was printed in a 48-point size by using black ink and the densities of the printed part were measured through a status A filter by using X-Rite Densitometer and defined as the initial densities of reflection densities ($D_R$, $D_G$, $D_B$) of C, M and Y three primary colors. This printed matter was enforcedly discolored by using the ozone discoloration tester according to the above-described measuring method of enforced discoloration rate constant ($k_{vis}$) (except that $D_R$, $D_G$ and $D_B$ were measured in place of $D_{vis}$) and the enforced discoloration rate constants ($k_R$, $k_G$, $k_B$) were determined similarly from the reciprocal of time necessary for the reflections densities ($D_R$, $D_G$, $D_B$) to decrease to 80% of respective initial density values. The ratio (R) of the maximum value to the minimum value out of those three rate constants was determined (for example, when $k_R$ is a maximum value and $k_G$ is minimum value, $R=k_R/k_G$) and this was defined as the enforced discoloration rate constant ratio (R).

<Evaluation>

The obtained ink samples each was filled in a cartridge for the black ink of an inkjet printer PM-950C manufactured by Seiko Epson Corp. and by using the inks for PM-950C for other color inks, an image comprising a gray image pattern having integrated therein a letter pattern was printed. In the printing, a printed matter obtained by printing a black square symbol of JIS code 2223 in a 48-point size was included. Apart from this, a test image chart according to ISO/JIS 12640 was prepared and the color tone of image was evaluated with an eye. The image was printed on inkjet photo gloss paper "GASAI" produced by Fuji Photo Film Co., Ltd. as the image-receiving sheet and the image quality, ink ejection property and fastness of image were evaluated.

(Evaluation Tests)

1) In the evaluation of ejection stability, cartridges were set in the printer and after confirming the ejection of ink, the image was output on 20 sheets of A4-size paper. The rating was performed based on the following criteria:

A: Printing was not disordered from the start to the end of printing.

B: Printing was disordered in some outputs.

C: Printing was disordered from the start to the end of printing.

2) As for the image preservability of black dye, the following evaluations were performed by using a printing sample.

(a) In the evaluation of light fastness, the image density Ci immediately after printing was measured by X-rite 310, xenon light (85,000 lx) was irradiated on the image for 14 days by using a weather meter manufactured by Atlas, and the image density Cf was again measured. The dye residual percentage Cf/Ci*100 was determined and rated. The dye residual percentage was rated at three points having a reflection density of 1, 1.5 and 2. The rating was A when the dye residual percentage was 70% or more at all densities, B when less than 70% at two points, and C when less than 70% at all densities.

(b) In the evaluation of heat fastness, the density was measured by X-rite 310 before and after the sample was stored for 10 days under the conditions of 80° C. and 70% RH and the dye residual percentage was determined and rated. The dye residual percentage was rated at three points having a reflection density of 1, 1.5 and 2. The rating was A when the dye residual percentage was 90% or more at all densities, B when less than 90% at two points, and C when less than 90% at all densities.

(c) In the evaluation of ozone resistance, the photo gloss paper having formed thereon an image was left standing for 7 days in a box set to an ozone gas concentration of 0.5 ppm and the image density before and after standing in the ozone gas atmosphere was measured by a reflection densitometer (X-Rite 310TR) and rated as the dye residual percentage. The reflection density was measured at three points of 1, 1.5 and 2.0. The ozone gas concentration in the box was set by using an ozone gas monitor (Model OZG-EM-01) manufactured by APPLICS.

The evaluation was performed by a three-stage rating, namely, the rating was A when the dye residual percentage was 80% or more at all densities, B when less than 80% at one or two points, and C when less than 70% at all densities.

The results obtained are shown in Table 34 below.

TABLE 34

| No. | Ejection Property | Light Fastness | Heat Fastness | $O_3$ Fastness |
|---|---|---|---|---|
| PM-950C (Bk) (Reference Example) | A | B | B | C |
| Bk-101 (Invention) | A | A | A | A |
| Bk-102 (Comparative Example) | A | C | B | C |
| Bk-103 (Comparative Example) | A | C | B | C |
| Bk-104 (Comparative Example) | A | B | A | C |
| Bk-105 (Invention) | A | A | A | A |
| Bk-106 (Invention) | A | A | A | A |
| Bk-107 (Invention) | A | A | A | A |

As seen in the Table, Bk-101, Bk-105, Bk-106 and Bk-107 of the present invention are excellent in both the ejection property and the fastness to light, heat and oxidative atmosphere. On the other hand, in the case of inks of Comparative Examples and Reference Example, the ejection is satisfied, however, one or more of the items in the evaluation of fastness is inferior and particularly, the oxidation resistance is insufficient, revealing that the image quality (non-loosening of black) deteriorates by the change in the color balance.

Other than the results in the Table, the non-loosening of black image after the ozone discoloration test was compared, as a result, in the case of Bk-105, Bk-106 and Bk-107, an excellent black image was remaining as compared with the image using Bk-101.

It is seen from this fact and the results in the Table that the ink of the present invention is superior in all test items regarding the light fastness, to the ink of Comparative Example.

The inkjet ink of the present invention having an discoloration rate constant ($k_{vis}$) of $5.0 \times 10^{-2}$ [hour$^{-1}$] or less and containing in an aqueous medium at least two dyes and a specific dye, maintains non-loosening of black and color balance even in aging, causes less deterioration in the image quality and ensures excellent image durability.

All measurements of the enforced discoloration rate constant in the present invention were conducted at room temperature.

The entire disclosure of each and every foreign patent application: Japanese Patent Application No. 2002-333790, from which the benefit of foreign priority has been claimed in the present application is incorporated herein by reference, as if fully set forth.

What is claimed is:

1. An inkjet black ink comprising an aqueous medium having dissolved or dispersed therein two or more kind of dyes, wherein the inkjet black ink has an enforced discoloration rate constant ($k_{vis}$) of $5.0 \times 10^{-2}$ [hour$^{-1}$] or less, in which, when a visual reflection density ($D_{vis}$) in the printed part on printing by using said black ink is defined as an initial density, and the printed matter is enforcedly discolored by using an ozone discoloration tester capable of constantly generating 5 ppm of ozone, the enforced discoloration rate constant ($k_{vis}$) is defined as a reciprocal of the time necessary for the visual reflection density ($D_{vis}$) to reach 80% of the initial density, and the inkjet black ink contains at least one dye of an azo dye having a heterocyclic group and a phthalocyanine dye,
wherein the printing by using the inkjet black ink is a printing of a black square symbol of JIS Code 2223 in a 48-point size and the inkjet black ink contains at least one dye represented by the following formulae (1) to (4):

Formula (1):

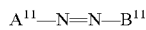

Formula (2):

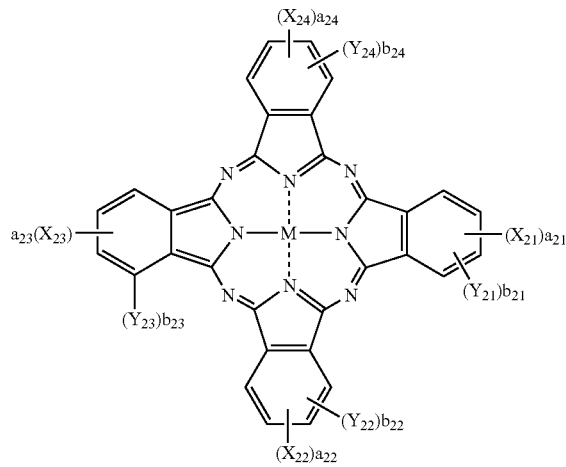

Formula (3):

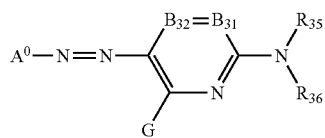

Formula (4):

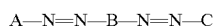

wherein in formula (1), $A^{11}$ and $B^{11}$ each independently represents a heterocyclic group which may be substituted;

in formula (2), $X_{21}$, $X_{22}$, $X_{23}$ and $X_{24}$ each independently represents —SO—Z, —SO$_2$—Z, —SO$_2$NR$_{21}$R$_{22}$, a sulfo group, —CONR$_{21}$R$_{22}$ or —COOR$_{21}$; each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $Y_{21}$, $Y_{22}$, $Y_{23}$ and $Y_{24}$ each independently represents a monovalent substituent; $a_{21}$ to $a_{24}$ and $b_{21}$ to $b_{24}$ represent the number of substituents $X_{21}$ to $X_{24}$ and $Y_{21}$ to $Y_{24}$, respectively; $a_{21}$ to $a_{24}$ each independently represents an integar of 0 to 4 but all are not 0 at the same time and $b_{21}$ to $b_{24}$ each independently represents an integar of 0 to 4, provided that when $a_{21}$ to $a_{24}$ and $b_{21}$ to $b_{24}$ each represents a number of 2 or more, the plurality of $X_{21}$s, $X_{22}$s, $X_{23}$s, $X_{24}$s, $Y_{21}$s, $Y_{22}$s, $Y_{23}$s or $Y_{24}$s may be the same or different; and M represents a hydrogen atom, a metal atom, or an oxide, hydroxide or halide thereof;

in formula (3), $A^O$ represents a 5-membered heterocyclic group; $B_{31}$ and $B_{32}$ each represents a nitrogen atom, =CR$_{31}$— or —CR$_{32}$=, and when either one of $B_{31}$ and $B_{32}$ represents a nitrogen atom, the other represents =CR$_{31}$— or —CR$_{32}$=; $R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; G, $R_{31}$ and $R_{32}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group an acylamino group, a ureido group, a sulfamoyl-amino group, an alkoxycarbonylamino group, an aryloxy-carbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an arylsulfinyl group, a heterocyclic sulfinyl group, a sulfamoyl group, a sulfo group or a heterocyclic thio group, and each group may be further substituted; and $R_{31}$ and $R_{35}$, or $R_{35}$ and $R_{36}$ may combine to form a 5- or 6-membered ring; and in formula (4), A, B and C each independently represents an aromatic group or a heterocyclic group which may be substituted.

2. The inkjet black ink as claimed in claim 1, wherein the dye represented by formula (2) is a dye represented by the following formula (5):

Formula (5):

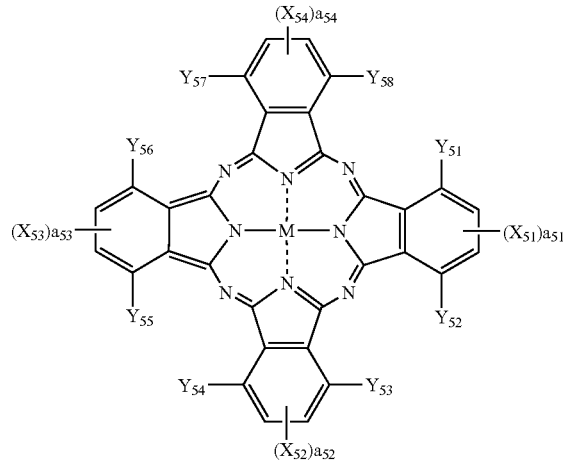

wherein $X_{51}$ to $X_{54}$, $Y_{51}$ to $Y_{54}$ and M have the same meanings as $X_{21}$ to $X_{24}$, $Y_{21}$ to $Y_{24}$ and M, respectively, and $a_{51}$ to $a_{53}$ each independently represents an integer of 1 or 2.

3. The inkjet black ink as claimed in claim 1, wherein a ratio (R) of the maximum value to the minimum value of three enforced discoloration rate constants ($k_R$, $k_G$, $k_B$) is 1.2 or less, in which, when reflection densities ($D_R$, $D_G$, $D_B$) of three colors of C, M and Y obtained by measuring the printed part through a status A filter on printing a black square symbol of JIS Code 2223 in a 48-point size are defined as initial densities, and the printed matter is enforcedly discolored by using an ozone discoloration tester capable of constantly generating 5 ppm of ozone, each of the enforced discoloration rate constants ($k_R$, $k_G$, $k_B$) is defined as a reciprocal of the time necessary for each of the reflection densities ($D_R$, $D_G$, $D_B$) to reach 80% of respective initial densities.

4. The inkjet black ink as claimed in claim 1, wherein each of the two or more kind of dyes has an oxidation potential of 1.0 V (vs SCE) or nobler.

5. The inkjet black ink as claimed in claim 1, wherein the two or more kind of dyes includes a dye (L) having: a λmax of 500 to 700 nm; and a half-value width of 100 nm or more in the absorption spectrum of a dilute solution standardized to an absorbance of 1.0.

6. The inkjet black ink as claimed in claim 1, wherein the two or more kind of dyes includes a dye (S) having: a λmax of 350 to 500 nm.

7. The inkjet black ink as claimed in claim 1, wherein the dye represented by formula (4) is a dye represented by the following formula (6):

Formula (6):

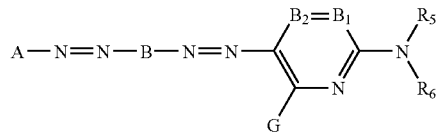

wherein $B_1$ and $B_2$ each represents a nitrogen atom, $=CR_1-$ or $-CR_2=$ and when either one of $B_1$ and $B_2$ represents a nitrogen atom, the other represents $=CR_1-$ or $-CR_2=$, G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted, $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_5$ and $R_6$ are not a hydrogen atom at the same time, and $R_1$ and $R_5$, or $R_5$ and $R_6$ may combine to form a 5- or 6-membered ring.

8. The inkjet black ink as claimed in claim 1, which contains the two or more dyes in an amount of 0.2 to 25 weight %, based on the entire ink.

9. The inkjet black ink as claimed in claim 1, which the enforced discoloration rate constant ($k_{vis}$) is $3.0 \times 10^{-2}$ [hour$^{-1}$] or less.

10. The inkjet black ink as claimed in claim 1, wherein the two or more kind of dyes include two or more dyes represented by the formulae (1), (3) and (4).

11. The inkjet black ink as claimed in claim 1, wherein in formula (3), $R_{31}$ and $R_{32}$ each independently represents an amino group selected from an arylamino group and a heterocyclic amino group.

12. The inkjet black ink as claimed in claim 7, wherein in formula (6), G, $R_1$ and $R_2$ each independently represents an amino group selected from an anilino group and a heterocyclic amino group.

* * * * *